US012153499B2

(12) United States Patent
Sontakke et al.

(10) Patent No.: US 12,153,499 B2
(45) Date of Patent: *Nov. 26, 2024

(54) SYSTEM AND METHOD FOR BACKING UP HIGHLY AVAILABLE SOURCE DATABASES IN A HYPERCONVERGED SYSTEM

(71) Applicant: Nutanix, Inc., San Jose, CA (US)

(72) Inventors: Sagar Sontakke, San Jose, CA (US); Kamaldeep Khanuja, San Jose, CA (US); Bakul Banthia, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/299,388

(22) Filed: Apr. 12, 2023

(65) Prior Publication Data

US 2023/0251938 A1     Aug. 10, 2023

Related U.S. Application Data

(63) Continuation of application No. 17/182,511, filed on Feb. 23, 2021, now Pat. No. 11,640,340.

(Continued)

(51) Int. Cl.
*G06F 11/14* (2006.01)
*G06F 11/20* (2006.01)

(52) U.S. Cl.
CPC ...... *G06F 11/1464* (2013.01); *G06F 11/1451* (2013.01); *G06F 11/1461* (2013.01);
(Continued)

(58) Field of Classification Search
CPC ............. G06F 11/1464; G06F 11/1451; G06F 11/1461; G06F 11/1471; G06F 11/2025; G06F 2201/84; G06F 2201/80
See application file for complete search history.

(56) References Cited

U.S. PATENT DOCUMENTS

| 625,315 A | 5/1899 | Bradford |
| 749,117 A | 1/1904 | Wagner |

(Continued)

FOREIGN PATENT DOCUMENTS

| CN | 104408071 A | 3/2015 |
| CN | 105446828 A | 3/2016 |

(Continued)

OTHER PUBLICATIONS

Actifio Enablement Team, "https://Awww.youtube.com/watch?v=7mCcJTXxFM3l", "Oracle Advanced Data Protection and Workflows", May 15, 2018 ) (Year: 2018).

(Continued)

*Primary Examiner* — Bryce P Bonzo
*Assistant Examiner* — Michael Xu
(74) *Attorney, Agent, or Firm* — Foley & Lardner LLP

(57) ABSTRACT

A system and method includes a plurality of nodes distributed between a first cluster and a second cluster, each of the plurality of nodes storing a copy of a source database and a processor executing computer-readable instructions stored on a memory to designate a first node of the plurality of nodes as a primary node, designate remaining ones of the plurality of nodes as secondary nodes to take over from the primary node upon failure of the primary node, designate a second node of the plurality of nodes as an initial active node, backup the source database from the initial active node, automatically designate, based on a switch over policy, a third node of the plurality of nodes as a next active node upon the initial active node becoming unavailable, and continue backups of the source database from the next active node upon the initial active node becoming unavailable.

30 Claims, 8 Drawing Sheets

Related U.S. Application Data

(60) Provisional application No. 63/094,245, filed on Oct. 20, 2020.

(52) U.S. Cl.
CPC ...... *G06F 11/1471* (2013.01); *G06F 11/2025* (2013.01); *G06F 2201/84* (2013.01)

(56) References Cited

U.S. PATENT DOCUMENTS

| | | |
|---|---|---|
| 5,594,859 A | 1/1997 | Palmer et al. |
| 6,064,975 A | 5/2000 | Moon et al. |
| 6,243,715 B1 | 6/2001 | Bogantz et al. |
| D508,248 S | 8/2005 | Ording |
| D521,521 S | 5/2006 | Jewitt et al. |
| 7,136,865 B1 | 11/2006 | Ra et al. |
| 7,225,189 B1 | 5/2007 | McCormack et al. |
| 7,389,300 B1 | 6/2008 | Shah et al. |
| 7,725,671 B2 | 5/2010 | Prahlad et al. |
| D625,315 S | 10/2010 | Jewitt et al. |
| 7,814,057 B2 | 10/2010 | Kathuria et al. |
| 7,840,533 B2 | 11/2010 | Prahlad et al. |
| 7,941,470 B2 | 5/2011 | Le et al. |
| 7,953,764 B2 | 5/2011 | Baffier et al. |
| 7,971,094 B1 * | 6/2011 | Benn ............... G06F 11/2025 714/13 |
| 8,117,165 B1 | 2/2012 | Winckelmann et al. |
| D656,948 S | 4/2012 | Kundsen et al. |
| 8,150,808 B2 | 4/2012 | Zha et al. |
| 8,250,033 B1 | 8/2012 | De Souter et al. |
| 8,291,409 B2 | 10/2012 | Winner et al. |
| 8,364,648 B1 | 1/2013 | Sim-Tang |
| 8,429,630 B2 | 4/2013 | Nickolov et al. |
| 8,447,728 B2 | 5/2013 | Prahlad et al. |
| 8,448,170 B2 | 5/2013 | Wipfel et al. |
| D684,160 S | 6/2013 | Truelove et al. |
| D684,161 S | 6/2013 | Truelove et al. |
| 8,468,174 B1 | 6/2013 | Yueh et al. |
| 8,549,518 B1 | 10/2013 | Aron et al. |
| 8,601,473 B1 | 12/2013 | Aron et al. |
| 8,612,396 B1 | 12/2013 | McAlister et al. |
| 8,635,421 B2 | 1/2014 | Gupta et al. |
| 8,656,123 B2 | 2/2014 | Lee |
| 8,677,085 B2 * | 3/2014 | Vaghani ............... G06F 3/061 711/161 |
| 8,762,335 B2 | 6/2014 | Prahlad et al. |
| 8,769,537 B1 | 7/2014 | Ruggiero et al. |
| 8,832,028 B2 | 9/2014 | Susairaj et al. |
| 8,849,850 B2 | 9/2014 | Baffier et al. |
| 8,850,130 B1 | 9/2014 | Aron et al. |
| 8,863,124 B1 | 10/2014 | Aron |
| 8,874,749 B1 | 10/2014 | Vittal et al. |
| 8,914,567 B2 | 12/2014 | Miroshnichenko et al. |
| 8,924,974 B1 | 12/2014 | Ruggiero et al. |
| 8,972,347 B1 | 3/2015 | Sim-Tang |
| 9,009,106 B1 | 4/2015 | Aron et al. |
| 9,069,708 B2 | 6/2015 | Gill et al. |
| D733,745 S | 7/2015 | Huang |
| 9,116,737 B2 | 8/2015 | Aswathanarayana et al. |
| 9,116,803 B1 | 8/2015 | Agrawal et al. |
| 9,213,727 B1 | 12/2015 | Esposito |
| 9,244,717 B2 | 1/2016 | Pissay et al. |
| D749,117 S | 2/2016 | Huang |
| 9,256,383 B2 | 2/2016 | De Spiegeleer et al. |
| 9,268,610 B2 | 2/2016 | Hegdal et al. |
| 9,270,521 B2 | 2/2016 | Tompkins |
| D753,135 S | 4/2016 | Vazquez |
| D753,140 S | 4/2016 | Kouvas et al. |
| 9,336,060 B2 | 5/2016 | Nori et al. |
| 9,336,132 B1 | 5/2016 | Aron et al. |
| 9,372,758 B2 * | 6/2016 | Ashutosh ............ G06F 11/1456 |
| D761,288 S | 7/2016 | Cianflone et al. |
| 9,384,254 B2 | 7/2016 | Tekade et al. |
| 9,389,962 B1 | 7/2016 | Yueh et al. |
| D763,890 S | 8/2016 | Pan |
| 9,413,810 B2 | 8/2016 | Rezvani et al. |
| 9,436,556 B2 | 9/2016 | Siden et al. |
| D771,102 S | 11/2016 | Protzman et al. |
| 9,495,435 B2 | 11/2016 | Zhang et al. |
| 9,507,579 B2 | 11/2016 | Gambardella et al. |
| 9,529,551 B2 | 12/2016 | Kesavan et al. |
| 9,529,808 B1 | 12/2016 | Sudarsanam et al. |
| D777,747 S | 1/2017 | Derby et al. |
| D778,296 S | 2/2017 | Belkin et al. |
| D779,514 S | 2/2017 | Baris et al. |
| D781,887 S | 3/2017 | Dziuba et al. |
| 9,600,193 B2 | 3/2017 | Ahrens et al. |
| 9,639,429 B2 | 5/2017 | Stewart et al. |
| 9,652,265 B1 | 5/2017 | Narayanasamy et al. |
| 9,659,080 B1 | 5/2017 | Drobychev et al. |
| 9,665,437 B2 | 5/2017 | Bhargava et al. |
| D794,666 S | 8/2017 | Havaldar et al. |
| D794,667 S | 8/2017 | Havaldar et al. |
| 9,733,958 B2 | 8/2017 | Cui et al. |
| 9,740,472 B1 | 8/2017 | Sohi et al. |
| 9,740,723 B2 | 8/2017 | Prahlad et al. |
| 9,747,287 B1 | 8/2017 | Bhardwaj et al. |
| D797,116 S | 9/2017 | Chapman et al. |
| 9,753,713 B2 | 9/2017 | Mani et al. |
| 9,760,396 B2 | 9/2017 | Apte et al. |
| 9,772,866 B1 | 9/2017 | Aron et al. |
| 9,778,992 B1 | 10/2017 | Yueh et al. |
| D802,608 S | 11/2017 | Hicks et al. |
| D803,231 S | 11/2017 | Guinness et al. |
| D807,902 S | 1/2018 | Cong et al. |
| 9,858,155 B2 * | 1/2018 | Ashutosh ............ G06F 11/1453 |
| 9,881,168 B2 | 1/2018 | Chari et al. |
| D809,530 S | 2/2018 | Matheson et al. |
| D815,652 S | 4/2018 | Protzman et al. |
| D817,976 S | 5/2018 | Shilwant et al. |
| 9,960,963 B2 | 5/2018 | Selvaraj et al. |
| 10,013,313 B2 | 7/2018 | Zhang et al. |
| 10,033,833 B2 | 7/2018 | Fu et al. |
| 10,055,300 B2 | 8/2018 | Zhang et al. |
| 10,057,279 B1 | 8/2018 | Balduzzi et al. |
| 10,108,496 B2 | 10/2018 | Hoobler et al. |
| 10,108,685 B2 | 10/2018 | Amdur et al. |
| 10,146,848 B2 | 12/2018 | Narayanan et al. |
| 10,162,715 B1 | 12/2018 | McAlister et al. |
| D838,288 S | 1/2019 | Sunshine et al. |
| 10,185,627 B2 | 1/2019 | Wong et al. |
| D839,913 S | 2/2019 | Chen et al. |
| 10,210,048 B2 | 2/2019 | Sancheti |
| 10,212,195 B2 | 2/2019 | Maskalik et al. |
| D843,388 S | 3/2019 | Protzman et al. |
| 10,248,657 B2 | 4/2019 | Prahlad et al. |
| 10,282,201 B2 | 5/2019 | Tekade et al. |
| 10,339,110 B2 | 7/2019 | Marinov et al. |
| 10,346,431 B1 | 7/2019 | Broda et al. |
| 10,372,329 B1 | 8/2019 | Ahrens et al. |
| 10,379,957 B2 | 8/2019 | Ngo |
| 10,379,963 B2 | 8/2019 | Bhargava et al. |
| D862,512 S | 10/2019 | Schubart |
| 10,445,298 B2 | 10/2019 | Ramu et al. |
| 10,447,806 B1 | 10/2019 | Sahay et al. |
| 10,476,955 B2 | 11/2019 | Mutalik et al. |
| D870,762 S | 12/2019 | Mendoza Corominas et al. |
| 10,503,612 B1 | 12/2019 | Wang et al. |
| 10,509,798 B2 | 12/2019 | Chow et al. |
| D875,108 S | 2/2020 | Chitalia et al. |
| D877,753 S | 3/2020 | Chitalia et al. |
| 10,579,364 B2 | 3/2020 | Doshi et al. |
| 10,599,423 B2 | 3/2020 | Coleman et al. |
| 10,606,578 B2 | 3/2020 | Kruglikov et al. |
| 10,613,938 B2 | 4/2020 | Blumenau et al. |
| 10,637,914 B2 | 4/2020 | Basavaiah et al. |
| 10,700,991 B2 | 6/2020 | Khinvasara et al. |
| 10,719,407 B1 * | 7/2020 | Chockalingam .... G06F 11/1461 |
| 10,725,866 B1 * | 7/2020 | Palaiah ............... G06F 9/45558 |
| 10,728,255 B2 | 7/2020 | Jindal et al. |
| 10,757,036 B2 | 8/2020 | Tung et al. |
| 10,776,329 B2 | 9/2020 | Ramohalli Gopala Rao et al. |
| 10,778,750 B2 | 9/2020 | Ringdahl |

(56) References Cited

U.S. PATENT DOCUMENTS

| | | |
|---|---|---|
| 10,785,029 B2 | 9/2020 | Gupta et al. |
| 10,785,255 B1 | 9/2020 | Otvagin et al. |
| 10,812,582 B2 | 10/2020 | Spillane et al. |
| 10,817,157 B2 | 10/2020 | Kuchibhotla et al. |
| 10,824,956 B1 | 11/2020 | Natanzon et al. |
| D911,356 S | 2/2021 | Varghese et al. |
| 10,922,957 B2 | 2/2021 | Rhoads et al. |
| 10,938,924 B1 | 3/2021 | Jensen et al. |
| 10,951,496 B2 | 3/2021 | Baker et al. |
| 10,959,098 B2 | 3/2021 | Cidon et al. |
| 10,999,165 B2 | 5/2021 | Cidon et al. |
| 11,010,336 B2 | 5/2021 | Kuchibhotla et al. |
| 11,010,487 B2 | 5/2021 | Noe et al. |
| D926,200 S | 7/2021 | Murphy et al. |
| 11,055,352 B1 | 7/2021 | Beitchman et al. |
| D927,507 S | 8/2021 | Norman |
| 11,108,629 B1 | 8/2021 | Cahyadi et al. |
| 11,126,426 B2 | 9/2021 | Zhu et al. |
| 11,243,971 B2 | 2/2022 | Geigel |
| D947,216 S | 3/2022 | Leininger |
| D947,239 S | 3/2022 | Rubin et al. |
| D947,240 S | 3/2022 | Rubin et al. |
| 11,275,573 B1 | 3/2022 | Javadekar |
| 11,308,114 B1 | 4/2022 | Moghe |
| 11,372,820 B1 | 6/2022 | Harjono et al. |
| 11,386,058 B2 | 7/2022 | Hung et al. |
| 11,561,864 B1 | 1/2023 | Brahmadesam et al. |
| 11,604,705 B2 | 3/2023 | Mehta et al. |
| 11,640,340 B2 | 5/2023 | Sontakke et al. |
| 11,860,818 B2 | 1/2024 | Kuchibhotla et al. |
| 12,019,523 B2 | 6/2024 | Mehta et al. |
| 2001/0014867 A1 | 8/2001 | Conmy |
| 2002/0073089 A1 | 6/2002 | Schwartz et al. |
| 2002/0104376 A1 | 8/2002 | Danyluk et al. |
| 2002/0174098 A1 | 11/2002 | Wu et al. |
| 2003/0147309 A1 | 8/2003 | Weisberg |
| 2005/0149757 A1 | 7/2005 | Corbett et al. |
| 2006/0143412 A1 | 6/2006 | Armangau |
| 2006/0161444 A1 | 7/2006 | Lubrecht et al. |
| 2006/0242189 A1 | 10/2006 | Leetaru et al. |
| 2007/0022065 A1 | 1/2007 | Hatano et al. |
| 2007/0100793 A1 | 5/2007 | Brown et al. |
| 2007/0183224 A1 | 8/2007 | Erofeev |
| 2007/0185852 A1 | 8/2007 | Erofeev |
| 2007/0185922 A1 | 8/2007 | Kapoor et al. |
| 2007/0185937 A1 | 8/2007 | Prahlad et al. |
| 2007/0234115 A1 | 10/2007 | Saika |
| 2007/0300221 A1 | 12/2007 | Hartz et al. |
| 2008/0126945 A1 | 5/2008 | Munkvold et al. |
| 2008/0239985 A1 | 10/2008 | Karve et al. |
| 2008/0256311 A1 | 10/2008 | Lee |
| 2009/0022285 A1 | 1/2009 | Swanburg et al. |
| 2009/0028082 A1 | 1/2009 | Wynn et al. |
| 2009/0037914 A1 | 2/2009 | Chagoly et al. |
| 2009/0112881 A1 | 4/2009 | Kodama |
| 2009/0125858 A1 | 5/2009 | Vishweshwara et al. |
| 2009/0132543 A1 | 5/2009 | Chatley et al. |
| 2009/0228669 A1 | 9/2009 | Slesarev et al. |
| 2010/0023564 A1 | 1/2010 | Yerneni et al. |
| 2010/0251242 A1 | 9/2010 | Sivasubramanian et al. |
| 2011/0004586 A1 | 1/2011 | Cherryholmes et al. |
| 2011/0022882 A1 | 1/2011 | Jaehde et al. |
| 2011/0071981 A1 | 3/2011 | Ghosh et al. |
| 2011/0093435 A1 | 4/2011 | Zha et al. |
| 2011/0252420 A1 | 10/2011 | Tung et al. |
| 2012/0011378 A1 | 1/2012 | Dalton et al. |
| 2012/0123999 A1 | 5/2012 | Ashutosh et al. |
| 2012/0271797 A1 | 10/2012 | Patil |
| 2012/0290714 A1 | 11/2012 | Cohen |
| 2013/0019015 A1 | 1/2013 | Devarakonda et al. |
| 2013/0091285 A1 | 4/2013 | Devarakonda et al. |
| 2013/0117441 A1 | 5/2013 | Kuchibhotla et al. |
| 2013/0263119 A1 | 10/2013 | Pissay et al. |
| 2013/0290180 A1 | 10/2013 | Baffier et al. |
| 2014/0006350 A1 | 1/2014 | Fukui et al. |
| 2014/0059226 A1 | 2/2014 | Messerli et al. |
| 2014/0101117 A1 | 4/2014 | Uzzaman |
| 2014/0189685 A1 | 7/2014 | Kripalani |
| 2014/0201171 A1 | 7/2014 | Vijayan et al. |
| 2014/0229698 A1 | 8/2014 | Sivasubramanian et al. |
| 2014/0250081 A1* | 9/2014 | Stewart ............... G06F 11/1471 707/649 |
| 2014/0282256 A1 | 9/2014 | Fish et al. |
| 2014/0359058 A1 | 12/2014 | Karnawat et al. |
| 2015/0019495 A1 | 1/2015 | Siden et al. |
| 2015/0039837 A1 | 2/2015 | Quan et al. |
| 2015/0052108 A1 | 2/2015 | Volk et al. |
| 2015/0074054 A1 | 3/2015 | Antony |
| 2015/0121453 A1 | 4/2015 | Gupta |
| 2015/0142610 A1 | 5/2015 | Manoharan et al. |
| 2015/0143064 A1 | 5/2015 | Bhargava et al. |
| 2015/0195347 A1 | 7/2015 | Luft |
| 2015/0227435 A1 | 8/2015 | Ashutosh et al. |
| 2015/0227602 A1 | 8/2015 | Ramu et al. |
| 2015/0301814 A1 | 10/2015 | Chen et al. |
| 2015/0331923 A1 | 11/2015 | Kim |
| 2015/0347987 A1 | 12/2015 | Ali |
| 2015/0358417 A1 | 12/2015 | Patil et al. |
| 2015/0370641 A1 | 12/2015 | Susairaj et al. |
| 2016/0041997 A1 | 2/2016 | Gokhale et al. |
| 2016/0048408 A1* | 2/2016 | Madhu ............... H04L 47/783 718/1 |
| 2016/0077923 A1 | 3/2016 | Zhang et al. |
| 2016/0078104 A1 | 3/2016 | Clifford et al. |
| 2016/0092535 A1 | 3/2016 | Kuchibhotla et al. |
| 2016/0094401 A1 | 3/2016 | Anwar et al. |
| 2016/0094410 A1 | 3/2016 | Anwar et al. |
| 2016/0125059 A1 | 5/2016 | Jain et al. |
| 2016/0127307 A1 | 5/2016 | Jain et al. |
| 2016/0162845 A1 | 6/2016 | Carroll et al. |
| 2016/0197835 A1 | 7/2016 | Luft |
| 2016/0224259 A1 | 8/2016 | Ahrens et al. |
| 2016/0267105 A1 | 9/2016 | Sun et al. |
| 2016/0274981 A1 | 9/2016 | Wilkinson |
| 2016/0292358 A1 | 10/2016 | Heger |
| 2016/0321339 A1 | 11/2016 | Tekade et al. |
| 2016/0335369 A1 | 11/2016 | Picard et al. |
| 2016/0337473 A1 | 11/2016 | Rao |
| 2016/0344582 A1 | 11/2016 | Shivanna et al. |
| 2016/0378622 A1 | 12/2016 | Ren et al. |
| 2016/0380809 A1 | 12/2016 | Hou et al. |
| 2017/0031775 A1 | 2/2017 | Arumugham et al. |
| 2017/0039236 A1 | 2/2017 | Li et al. |
| 2017/0060699 A1 | 3/2017 | Hohl et al. |
| 2017/0115978 A1 | 4/2017 | Modi et al. |
| 2017/0220777 A1 | 8/2017 | Wang et al. |
| 2017/0235758 A1* | 8/2017 | Gopalapura Venkatesh ............... H04L 41/06 707/625 |
| 2017/0235950 A1 | 8/2017 | Gopalapura Venkatesh et al. |
| 2017/0264684 A1 | 9/2017 | Spillane et al. |
| 2017/0286517 A1 | 10/2017 | Horowitz et al. |
| 2017/0286518 A1 | 10/2017 | Horowitz et al. |
| 2017/0344618 A1 | 11/2017 | Horowitz et al. |
| 2017/0351584 A1 | 12/2017 | Griffith et al. |
| 2017/0351716 A1 | 12/2017 | Higginson et al. |
| 2017/0374136 A1 | 12/2017 | Ringdahl |
| 2018/0025007 A1 | 1/2018 | Dai |
| 2018/0121494 A1 | 5/2018 | Antonopoulos et al. |
| 2018/0157561 A1 | 6/2018 | Venkatesh et al. |
| 2018/0181469 A1 | 6/2018 | Yueh et al. |
| 2018/0253676 A1 | 9/2018 | Sheth et al. |
| 2018/0270219 A1 | 9/2018 | Li |
| 2018/0275881 A1 | 9/2018 | Ashraf et al. |
| 2018/0285201 A1 | 10/2018 | Bangalore et al. |
| 2018/0300203 A1 | 10/2018 | Kathpal et al. |
| 2018/0307728 A1 | 10/2018 | Crupi et al. |
| 2019/0005407 A1 | 1/2019 | Harris et al. |
| 2019/0018738 A1 | 1/2019 | Chen |
| 2019/0034240 A1 | 1/2019 | Nabi et al. |
| 2019/0065322 A1 | 2/2019 | Chakankar et al. |
| 2019/0075031 A1 | 3/2019 | Skelton et al. |
| 2019/0087279 A1 | 3/2019 | Kumar et al. |
| 2019/0089597 A1 | 3/2019 | Pathak et al. |

(56) References Cited

U.S. PATENT DOCUMENTS

| | | |
|---|---|---|
| 2019/0102257 A1 | 4/2019 | Zhou et al. |
| 2019/0102411 A1 | 4/2019 | Hung et al. |
| 2019/0121671 A1 | 4/2019 | Guim Bernat |
| 2019/0125828 A1 | 5/2019 | Bortz |
| 2019/0129799 A1 | 5/2019 | Kumarasamy |
| 2019/0138631 A1 | 5/2019 | Crane |
| 2019/0155699 A1* | 5/2019 | Luo ............... G06F 11/1451 |
| 2019/0155936 A1 | 5/2019 | Du et al. |
| 2019/0158605 A1 | 5/2019 | Markuze et al. |
| 2019/0179711 A1 | 6/2019 | Luo et al. |
| 2019/0230156 A1 | 7/2019 | McLarty et al. |
| 2019/0235904 A1 | 8/2019 | Epping et al. |
| 2019/0238412 A1 | 8/2019 | Vohra et al. |
| 2019/0245704 A1 | 8/2019 | Pala |
| 2019/0266268 A1 | 8/2019 | Polinati |
| 2019/0310926 A1 | 10/2019 | Hashimoto et al. |
| 2019/0324865 A1* | 10/2019 | Weissman ........... G06F 11/1461 |
| 2019/0332582 A1 | 10/2019 | Kumar et al. |
| 2019/0339870 A1 | 11/2019 | Meiri et al. |
| 2019/0340091 A1 | 11/2019 | Chandrasekaran et al. |
| 2019/0362004 A1 | 11/2019 | Oks et al. |
| 2019/0370146 A1 | 12/2019 | Babu et al. |
| 2019/0384496 A1* | 12/2019 | Abdul Rasheed .... G06F 3/0619 |
| 2019/0391880 A1 | 12/2019 | Wang et al. |
| 2019/0394093 A1 | 12/2019 | Kulkarni et al. |
| 2020/0028932 A1 | 1/2020 | Yang et al. |
| 2020/0034178 A1 | 1/2020 | Gupta et al. |
| 2020/0034245 A1 | 1/2020 | Kohler |
| 2020/0050522 A1* | 2/2020 | Coleman ............. G06F 11/2041 |
| 2020/0059411 A1 | 2/2020 | Olmsted-Thompson et al. |
| 2020/0081704 A1 | 3/2020 | Bafna et al. |
| 2020/0097177 A1 | 3/2020 | Ashokkumar et al. |
| 2020/0099692 A1 | 3/2020 | Jindal et al. |
| 2020/0104375 A1 | 4/2020 | Earnesty et al. |
| 2020/0104376 A1* | 4/2020 | Earnesty, Jr. ......... G06F 16/285 |
| 2020/0104377 A1* | 4/2020 | Earnesty, Jr. ......... G06F 9/4843 |
| 2020/0106737 A1 | 4/2020 | Beedu et al. |
| 2020/0110675 A1* | 4/2020 | Wang .................. G06F 11/2028 |
| 2020/0137157 A1 | 4/2020 | Joseph et al. |
| 2020/0193388 A1 | 6/2020 | Tran-Kiem et al. |
| 2020/0201526 A1 | 6/2020 | Kuchibhotla et al. |
| 2020/0210378 A1 | 7/2020 | Kuchibhotla et al. |
| 2020/0210379 A1 | 7/2020 | Kuchibhotla et al. |
| 2020/0250046 A1 | 8/2020 | Wong et al. |
| 2020/0250059 A1 | 8/2020 | Bothello et al. |
| 2020/0285608 A1 | 9/2020 | Chakankar et al. |
| 2020/0285652 A1 | 9/2020 | Wang et al. |
| 2020/0349018 A1* | 11/2020 | Meadowcroft ......... G06F 11/20 |
| 2020/0379793 A1 | 12/2020 | Parihar et al. |
| 2021/0064512 A1 | 3/2021 | Sirov et al. |
| 2021/0117293 A1 | 4/2021 | Luo et al. |
| 2021/0133031 A1 | 5/2021 | Moldvai et al. |
| 2021/0141921 A1 | 5/2021 | Toplak |
| 2021/0141923 A1 | 5/2021 | Wu et al. |
| 2021/0144060 A1 | 5/2021 | Cencini et al. |
| 2021/0200643 A1 | 7/2021 | Luo et al. |
| 2021/0281428 A1 | 9/2021 | Kempf et al. |
| 2021/0391999 A1 | 12/2021 | Chilamakuri et al. |
| 2021/0406717 A1 | 12/2021 | Tauheed et al. |
| 2022/0066993 A1* | 3/2022 | Khanuja ............. G06F 16/2358 |
| 2023/0095814 A1 | 3/2023 | Sarkar |
| 2023/0096071 A1 | 3/2023 | Sarkar |
| 2023/0185823 A1 | 6/2023 | Chu et al. |
| 2023/0195529 A1 | 6/2023 | Luthra et al. |
| 2023/0231912 A1 | 7/2023 | Vohra et al. |
| 2023/0247087 A1 | 8/2023 | Nagaraja et al. |
| 2023/0251938 A1 | 8/2023 | Sontakke et al. |
| 2024/0045834 A1 | 2/2024 | Kuchibhotla et al. |
| 2024/0126777 A1 | 4/2024 | Tylik et al. |
| 2024/0134824 A1 | 4/2024 | Khanuja et al. |

FOREIGN PATENT DOCUMENTS

| | | |
|---|---|---|
| CN | 108664660 A | 10/2018 |
| CN | 113010599 A | 6/2021 |
| EP | 1 654 683 B1 | 5/2006 |
| EP | 2 980 707 A1 | 2/2016 |
| LU | 102236 B1 | 11/2020 |
| TW | 201600970 A | 1/2016 |
| WO | WO-2016/069029 A1 | 5/2016 |
| WO | WO-2020/026476 A1 | 2/2020 |
| WO | WO-2020/072338 A1 | 4/2020 |
| WO | WO-2021/108075 A1 | 6/2021 |

OTHER PUBLICATIONS

AWS. "Amazon EC2 M5 Instances" Amazon DocumentDB. Amazon EC2. Nov. 2017. Retrieved from https://aws.amazon.com/ec2/instance-types/m5/ (accessed Apr. 6, 2023).

AWS. "Amazon ECS clusters" Amazon Elastic Container Service. Dec. 2019. Retrieved from https://docs.aws.amazon.com/AmazonECS/latest/developerguide/clusters.html (accessed Apr. 6, 2023).

AWS. "AWS glossary" AWS General Reference Guide. Jan. 2013. Retrieved from https://docs.aws.amazon.com/general/latest/gr/glos-chap.html (accessed Apr. 6, 2023).

AWS. "Copy a snapshot" Amazon Elastic Compute Cloud. Dec. 2012. Retrieved from https://docs.aws.amazon.com/AWSEC2/latest/UserGuide/ebs-copy-snapshot.html#ebs-snapshot-copy (accessed Apr. 6, 2023).

AWS. "CopySnapshot" Amazon Elastic Compute Cloud. Dec. 2014. Retrieved from https://docs.aws.amazon.com/AWSEC2/latest/APIReference/API_CopySnapshot.html (accessed Apr. 6, 2023).

AWS. "Create a DB instance" Amazon Relational Database Service. Jan. 2016. Retrieved from https://docs.aws.amazon.com/AmazonRDS/latest/UserGuide/CHAP_Tutorials.WebServerDB.CreateDBInstance.html (accessed Jul. 26, 2023).

AWS. "CreateDBInstanceReadReplica" Amazon Relational Database Service. Jan. 16, 2013. Retrieved from https://docs.aws.amazon.com/AmazonRDS/latest/APIReference/API_CreateDBInstanceReadReplica.html (accessed Apr. 25, 2023).

AWS. "Creating an Amazon RDS DB instance" Amazon Relational Database Service. 2020. Retrieved from https://docs.aws.amazon.com/AmazonRDS/latest/UserGuide/USER_CreateDBInstance.html (accessed Jul. 26, 2023).

AWS. "Creating and connecting to a MySQL DB instance" Amazon Relational Database Service. May 2014. Retrieved from https://docs.aws.amazon.com/AmazonRDS/latest/UserGuide/CHAP_GettingStarted.CreatingConnecting.MySQL.html (accessed Jul. 26, 2023).

AWS. "Introducing Five New Amazon EC2 Bare Metal Instances" Amazon Web Services. Feb. 13, 2019. Feb. 2019. Retrieved from https://aws.amazon.com/about-aws/whats-new/2019/02/introducing-five-new-amazon-ec2-bare-metal-instances/ (accessed Apr. 6, 2023).

AWS. "Kubernetes on AWS" Amazon Web Services. Jun. 2018. Retrieved from https://aws.amazon.com/kubernetes/#:~:text=Kubernetes%20manages%20clusters%20of%20Amazon,premises%20and%20in%20the%20cloud (accessed Apr. 6, 2023).

AWS. "Regions and Availability Zones" About AWS. Apr. 2019. Retrieved from https://aws.amazon.com/about-aws/global-infrastructure/regions_az/?p=ngi&loc=2 (accessed Jul. 26, 2023).

AWS. "Storage" Amazon Elastic Compute Cloud. Sep. 14, 2014. Retrieved from https://docs.aws.amazon.com/AWSEC2/latest/WindowsGuide/Storage.html (accessed Apr. 6, 2023).

AWS. "Use EBS direct APIs to access the contents of an EBS snapshot" Amazon Elastic Compute Cloud. Apr. 27, 2020. Retrieved from https://docs.aws.amazon.com/AWSEC2/latest/UserGuide/ebs-accessing-snapshot.html (accessed Apr. 6, 2023).

AWS. "Working with DB instance read replicas" Amazon Relational Database Service. Jan. 18, 2013. Retrieved from https://docs.aws.amazon.com/AmazonRDS/latest/UserGuide/USER_ReadRepl.html (accessed Apr. 25, 2023).

AWS. "Working with read replicas for Microsoft SQL Server in Amazon RDS" Amazon Relational Database Service. Nov. 30, 2020. Retrieved from https://docs.aws.amazon.com/AmazonRDS/latest/UserGuide/SQLServer.ReadReplicas.html (accessed Apr. 25, 2023).

Barr, Jeff. "Amazon EC2 Bare Metal Instances with Direct Access to Hardware" AWS News Blog. Nov. 28, 2017. Retrieved from

(56) References Cited

OTHER PUBLICATIONS https://aws.amazon.com/blogs/aws/new-amazon-ec2-bare-metal-instances-with-direct-access-to-hardware/ (accessed Apr. 6, 2023).
Barr, Jeff. "New—Cross-Account Encrypted EBS Snapshots" AWS News Blog. Jun. 21, 2016. Retrieved from https://aws.amazon.com/blogs/aws/new-cross-account-copying-of-encrypted-ebs-snapshots/ (accessed Apr. 6, 2023).
DBInsight. "Turn your Database into a Service " A dbInsight white paper for Nutanix. Feb. 2020. Retrieved from https://nutanix.com/content/dam/nutanix/resources/white-papers/wp-turn-your-database-into-a-service.pdf (accessed Jul. 26, 2023).
Featonby, Malcolm. "Amazon ECS availability best practices" Containers. Nov. 8, 2019. Retrieved from https://aws.amazon.com/blogs/containers/amazon-ecs-availability-best-practices/ (accessed Apr. 6, 2023).
Final Office Action on U.S. Appl. No. 16/234,547 DTD May 11, 2023.
Final Office Action on U.S. Appl. No. 16/805,581 DTD Jul. 6, 2022.
Flexera. "How can I copy an EBS snapshot between different EC2 regions?" Flexera CMP Docs. Dec. 19, 2015. Retrieved from https://docs.rightscale.com/faq/clouds/aws/How_can_I_copy_an_EBS_snapshot_between_different_EC2_regions.html (accessed Apr. 6, 2023).
Google. "Create a MySQL database hosted in Google Cloud" AppSheet Help. 2020. Retrieved from https://support.google.com/appsheet/answer/10107301?hl=en&ref_topic=10102124&sjid=7557016717740597161-AP (accessed Jul. 26, 2023).
Jain, Viral. "How to Create SQL Database in AWS" C-Sharp Corner. May 4, 2018. Retrieved from https://www.c-sharpcorner.com/article/how-to-create-sql-database-in-aws/ (accessed Jul. 26, 2023).
Launier, Jeremy et al. "Introducing A New Era in Database Management" Nutanix. Oct. 6, 2020. Retrieved from https://www.nutanix.com/blog/introducing-new-era-in-database-management (accessed Jul. 26, 2023).
Non-Final Office Action on U.S. Appl. No. 16/805,581 DTD Jan. 14, 2022.
Non-Final Office Action on U.S. Appl. No. 16/805,581 DTD Oct. 12, 2022.
Non-Final Office Action on U.S. Appl. No. 17/337,197 DTD Jun. 6, 2023.
Nutanix Inc., "Prism 5.5, Prism Central Guide" (Jul. 7, 2020) pp. 1-618.
Nutanix, Inc. "Prism Central Guide", Acropolis 5.0, (Oct. 18, 2018), pp. 1-374.
Nutanix, Inc., "Acropolis Advance Administration Guide" Acropolis 5.0 Feb. 9, 2018, pp. 1-60.
Nutanix, Inc., "Acropolis Advanced Administration Guide" Acropolis 5.1, Jul. 11, 2018, pp. 1-63.
Nutanix, Inc., "Prism Central Guide", Acropolis 5.1, (Oct. 18, 2018), pp. 1-410.
Nutanix, Inc., "Prism Web Console Guide" Prism 5.8, (Mar. 19, 2019), pp. 1-808.
Nutanix. "Multi-Cluster Management" Nutanix Support and Insights. Oct. 2020. Retrieved from https://portal.nutanix.com/page/documents/details?targetId=Nutanix-Era-User-Guide-v2_0:era-era-multicluster-management-c.html (accessed Jul. 26, 2023).
PlanetScale. "PlanetScale is the world's most advanced serverless MySQL platform" PlanetScale. Retrieved from https://planetscale.com/ (accessed Apr. 6, 2023).
Sharma, Madhurkant. "Cloud Computing Platforms and Technologies" Geeks for Geeks. Sep. 8, 2018. Retrieved from https://www.geeksforgeeks.org/cloud-computing-platforms-and-technologies/ (accessed Jul. 26, 2023).
Singh, Deepak. "Cluster Management with Amazon ECS" AWS Compute Blog. Feb. 6, 2015. Retrieved from https://aws.amazon.com/blogs/compute/cluster-management-with-amazon-ecs/ (accessed Apr. 6, 2023).
Vogels, Werner. "Under the Hood of Amazon EC2 Container Service" All Things Distributed. Jul. 20, 2015. Retrieved from https://www.allthingsdistributed.com/2015/07/under-the-hood-of-the-amazon-ec2-container-service.html (accessed Apr. 6, 2023).
Westermann, Daniel. "pg_auto_failover: Failover and switchover scenarios" Application Integration & Middleware. Nov. 11, 2020. Retrieved from https://www.dbi-services.com/blog/pg_auto_failover-failover-and-switchover-scenarios/ (accessed Jul. 26, 2023).
YouTube Video screenshots for Alibaba Cloud. "How-to | Launch a MySQL Instance on Alibaba Cloud ApsaraDB for Relational Database Service" YouTube. Feb. 27, 2017. https://youtu.be/E5wGoIVFBuU [youtube.com].
YouTube Video screenshots for Alibaba Cloud. "How-to | Launch a MySQL Instance on Alibaba Cloud ApsaraDB for Relational Database Service" YouTube. Feb. 27, 2017. https://youtube.com/watch?v=E5wGoIVFBuU [youtube.com].
YouTube Video screenshots for Alibaba Cloud. "How-to | Set Up a Multi tier WordPress Site on Alibaba Cloud" YouTube. Jun. 25, 2018. https://youtu.be/yWXhibylW6M [youtube.com].
YouTube Video screenshots for Amazon Web Services. "Amazon ECS: Core Concepts" YouTube. Aug. 31, 2017. https://www.youtube.com/watch?app=desktop&v=eq4wL2MiNqo&feature=youtu.be [youtube.com].
YouTube Video screenshots for Nutanix University. "How To Provision a PostgreSQL cluster using Nutanix Era | Nutanix University" YouTube. Aug. 8, 2019. https://youtube.com/watch?v=FoDGtORWNnU [youtube.com].
"Amazon RDS Now Supports Setting Up Connectivity Between Your RDS Database and EC2 Compute Instance in 1-Click", Amazon Web Services, https://aws.amazon.com/rds.
"Azure Arc extends the Azure control plane", https://infohub.delltechnologies.com/l/techbook-dell-emc-integrated-system-for-microsoft-azure-stack-hci-2/azure-arc-extends-the-azure-control-plane-14.
"Configure cross-tenant access settings for B2B collaboration", Azure AD, Microsoft Entra, May 24, 2022, 21pp.
"Connected Machine Agent Prerequisites", Sep. 27, 2022, https://learn.microsoft.com/en-us/azure/azure-arc/servers/prerequisites.
"Control Plane", https://docs.controlplane.com.
"Exadata Database Service onCloud@Customer Administrator's Guide", https://docs.oracle.com/en/engineered-systems/exadata-cloud-at-customer/ecccm/ecc-network-requirements.html#GUID-F06BD75B-E971-48ED-8699-E1004D4B4AC1.
Features and Capabilities of Azure Arcenabled SQL Managed Instance:, Aug. 13, 2022, https://learn.microsoft.com/en-us/azure/azure-arc/data/managed-instance-features.
"Managing Cloud-Native Workloads with Anthos", https://authors.packtpub.com/wp-content/uploads/2021/10/Chapter-8-Professional-Cloud-Architect-1.pdf.
"Oracle Exadata Cloud@Customer X9M", Version 1.17, 2022, https://www.oracle.com/dk/a/ocom/docs/engineered-systems/exadata/exacc-x9m-ds.pdf.
"Overview of Azure Connected Machine Agent", Sep. 4, 2022, https://learn.microsoft.com/en-us/azure/azure-arc/servers/agent-overview.
"Row-Level Security", Sep. 17, 2022, https://learn.microsoft.com/en-us/sql/relational-databases/security/row-level-security?view=sql-server-ver16.
"Use Azure Private Link to Securely Connect Servers to Azure Arc", Jul. 28, 2022, https://learn.microsoft.com/en-us/azure/azure-arc/servers/private-link-security.
Alhamazani, et al., "Cross-Layer Multi-Cloud Real-Time Application QoS Monitoring and Benchmarking As-a-Service Framework", https://arxiv.org/ftp/arxiv/papers/1502/1502.00206.pdf.
Aluciani. "Provisioning PostgreSQL to be Highly Available and Resilient on Nutanix" Nutanix Community Blog. 2019. Retrieved from https://next.nutanix.com/community-blog-154/provisioning-postgresql-to-be-highly-available-and-resilient-on-nutanix-33726 (Year: 2019).
Amazon Web Services, "Amazon RDS Now Supports Setting up Connectivity Between You RDS Database and EC2 Compute Instance in 1-Click", https://aws.amazon.com/about-aws/whats-new/2022/08/amazon-rds-setting-up-connectivity-rds-database-ec2-compute-instance-1-click/.

(56) References Cited

OTHER PUBLICATIONS

Amazon Web Services, "Amazon RDS on Outposts", https://aws.amazon.com/rds/outposts/?pg=In&sec=hiw.

Amazon Web Services, "Configuring and Using Oracle Connection Manager on Amazon EC2 for Amazon RDS for Oracle", Jan. 12, 2021, https://aws.amazon.com/blogs/database/configuring-and-using-oracle-connection-manager-on-amazon-ec2-for-amazon-rds-for-oracle.

Amazon Web Services, "SaaS Tenant Isolation Strategies. Isolating Resources in a Multi-Tenant Environment", (Aug. 2020).

Amazon, "Amazon Aurora User Guide for Aurora: Overview of multi-master clusters" Amazon Aurora User Guide from https://docs.aws.amazon.com/AmazonRDS/latest/AuroraUserGuide/aurora-ug.pdf#aurora-multi-master (accessed Jun. 28, 2021).

Anjum, Maaz, "Database Provisioning in EM12c: Provision me a Database Now!" Slideshare, (Dec. 12, 2013) from https://www.slideshare.net/MaazAnjum/maaz-anjum-gouser-database-provisioning-in-em12c-provision-me-a-database-now (accessed Jun. 28, 2021).

Anthos Technical Overview, https://cloud.google.com/anthos/docs/concepts/overview.

ApexSQL, "Automated database provisioning using ApexSQL DevOps toolkit" ApexSQL Knowledgebase (2020) from https://knowledgebase.apexsql.com/automated-database-provisioning-using-apexsql-devops-toolkit/ (accessed Jun. 28, 2021).

Arslan, Erman, "Delphix—Notes vol. 1, my new toy for the upcoming months," Erman Arslan's Oracle Blog, published Aug. 8, 2016, retrieved on Jan. 2, 2023 from http://ermanarslan.blogspot.com/2016/08/delphix-notes-vol-1-my-new-toy-for.html.

Asanka, Dinesh, "Point in Time Recovery with SQL Server" SQL Shack, published Dec. 19, 2016, retrieved Feb. 11, 2022 from <https://www.sqlshack.com/point-in-time-recovery-with-sql-server/> (Year: 2016).

AWS Database Blog, "Configuring and Using Oracle Connection Manager on Amazon for EC2 for Amazon RDS for Oracle", Jan. 12, 2021, https://aws.amazon.com/blogs/database/configuring-and-using-oracle-connection-manager-on-amazon-ec2-for-amazon-rds-for-oracle/.

AWS Prescriptive Guidance, "PostgreSQL Pool Model", https://docs.aws.amazon.com/prescriptive-guidance/latest/saas-multitenant-managed-postgresql/pool.html.

AWS Prescriptive Guidance, "Row-Level Security Recommendations", https://docs.aws.amazon.com/prescriptive-guidance/latest/saas-multitenant-managed-postgresql/rls.html.

AWS Serverless SaaS Workshop—Lab4 : Isolating tenant data in a pooled model—Adding the missing code.

AWS Serverless SaaS Workshop—Lab4 : Isolating tenant data in a pooled model—Revisiting Authentication, Authorization, & Tenant Isolation.

AWS, "Working with Aurora multi-master clusters" User Guide for Aurora. 2020. Received from https://docs.aws.amazon.com/AmazonRDS/latest/AuroraUserGuide/aurora-multi-master.html (Year: 2020).

Ay, Neslisah. "How to Set Up a High Available PostgreSQL Cluster Using Patroni" Neslisah Ay Medium Page. Mar. 18, 2019. Received from https://medium.com/@neslisah.demirci/how-to-set-up-a-high-available-postgresql-cluster-using-patroni-d7044a754d2f (Year: 2019).

BackupAssist, "https://backupassist.com/support/en/backupassist/manage/calendar.htm", Jul. 1, 2017 (Year: 2017).

Balasubramanian, Sudhir, "Virtual Volumes for Database Backup and Recovery" VMware Virtualize Applications (Nov. 5, 2015) from https://blogs.vmware.com/apps/2015/11/virtual-volumes-for-database-backup-and-recovery-2.html (accessed Jun. 2, 2021).

Bolton, Dean et al. "Database-as-a-Service (DBaaS) Reference Architecture with VMware and Tintri" VMware Tintri VLSS (2015) from https://blogs.vmware.com/apps/files/2015/10/vRA_DBAAS_VLSS_Tintri.pdf (Jun. 2, 2021).

Brooks, Aaron, "19 Best A/B Testing Tools in 2021" (published Aug. 12, 2020) Venture Harbour, from https://www.ventureharbour.com/best-a-b-testing-tools/ (accessed Sep. 14, 2021).

Brull, Jim, "Oracle Cloud Database vs On-Premises—Understanding the Differences" Centroid—OCI, Oracle Cloud. 2020. Received from https://www.centroid.com/blog/oracle-cloud-database-vs-on-premises/ (Year: 2020).

Brummitt, Karis et al., "Database provisioning just got a lot easier—and a lot smarter" RealWire (Feb. 27, 2017) from https://www.realwire.com/releases/Database-provisioning-just-got-a-lot-easier-and-a-lot-smarter (accessed Jun. 28, 2021).

Bucur, et al., "Multi-Cloud Resource Management Techniques for Cyber-Physical Systems", MDPI, Dec. 15, 2021, https://www.ncbi.nlm.nih.gov/pmc/articles/PMC8706026/.

Cano, Ignacio, et al. "Curator: Self-Managing Storage for Enterprise Clusters" (Mar. 27, 2017), from https://www.usenix.org/conference/nsdi17/.

Cisco Public "Hyperconvergence for Databases" (2019) from https://www.cisco.com/c/dam/en/us/products/collateral/hyperconverged-infrastructure/hyperflex-hx-series/le-60303-hxsql-aag.pdf (accessed Dec. 18, 2019).

Cisco Public, "Cisco HyperFlex All-Flash Systems for Oracle Database Deployments" (Jun. 2017) from https://www.cisco.com/c/en/us/products/collateral/hyperconverged-infrastructure/hyperflex-hx-series/whitepaper_c11-739237.pdf (accessed Dec. 18, 2019).

Cisco Public, "Cisco HyperFlex All-NVMe Systems for Oracle Database: Reference Architecture" (2019) from https://www.cisco.com/c/en/us/products/collateral/hyperconverged-infrastructure/hyperflex-hx-series/hx-oracle-wp.html (accessed Dec. 18, 2019).

Cisco Public, "Cisco HyperFlex HX Data Platform" (2018) from https://www.cisco.com/c/dam/en/us/products/collateral/hyperconverged-infrastructure/hyperflex-hx-series/white-paper-c11-736814.pdf (accessed Dec. 18, 2019).

Cormac, "Virtual Volumes (VVols) and Replication/DR" cormachogan.com (Apr. 13, 2015) from https://cormachogan.com/2015/04/13/virtual-volumes-vvols-and-replicationdr/ (accessed Jun. 2, 2021).

Cunnhingham, "Introducing PlanetScale Managed Cloud", Nov. 3, 2021, https://planetscale.com/blog/introducing-planetscale-managed-cloud.

Delphix "Backup and Recovery Strategies for the Delphix Engine" (published 2017) Delphix Corp., from https://docs.delphix.com/docs/data-backup-and-recovery-solutions/backup-and-recovery-strategies-for-the-delphix-engine (accessed Dec. 19, 2019).

Delphix "Database Provisioning Overview" (published 2017) Delphix Corp., from https://docs.delphix.com/docs/introduction/database-virtualization-with-delphix/database-provisioning-overview (accessed Dec. 19, 2019).

Delphix "Quick Start Guides" (published 2017) Delphix Corp., from https://docs.delphix.com/docs52/quick-start-guides (accessed Dec. 19, 2019).

Delphix "Replication" (Published 2017) Delphix Corp., from https://docs.delphix.com/docs52/data-backup-and-recovery-solutions/replication (accessed Dec. 19, 2019).

Delphix Corp., "Delphix Engine User Guide," Delphix, published Dec. 2017, retrieved Jan. 2, 2023 from https://docs.delphix.com/docs52/files/83053093/83053098/2/1512670775673/Delphix Engine User Guide.pdf.

Delphix Corp., "Delphix Engine User Guide," Delphix, published Nov. 2018, retrieved Jan. 2, 2023 from https://docs.delphix.com/docs531/files/98113199/98116076/2/1542301179433/User Guide.pdf.

Delphix Corp., "Delphix Engine User Guide," Delphix, published Oct. 2017, retrieved Jan. 2, 2023 from https://docs.delphix.com/docs-old/files/74711255/74715951/5/1509647013871/Delphix Engine User Guide.pdf.

Delphix Corp., "FAQ: SnapShot and SnapSync (KBA1014)," Delphix, published March, 4 2022, retrieved Jan. 2, 2023 from https://support.delphix.com/Continuous_Data_Engine_(formerly_Virtualization_Engine)/Delphix_Admin/FAQ%3A_SnapShot_and_SnapSync_(KBA1014).

Delphix Corp., "Linking to a Database," Database Linking Overview, published Dec. 2017, retrieved on Jan. 2, 2023 from https://docs.delphix.com/docs52/introduction/database-virtualization-with-delphix/database-linking-overview.

Delphix Corp., "Understanding Timelines," Understanding Timelines and How to Preserve Data in a Point in Time, published Jun. 2018,

(56) References Cited

OTHER PUBLICATIONS retrieved Jan. 2, 2023 from https://docs.delphix.com/docs526/delphix-self-service/delphix-self-service-data-user-guide/understanding-timelines-and-how-to-preserve-data-in-a-point-in-time.
Delphix Corp., "What Does the Delphix Engine Do?," Delphix Engine Overview, published Dec. 2017, retrieved on Jan. 2, 2023 from https://docs.delphix.com/docs52/introduction/database-virtualization-with-delphix/delphix-engine-overview.
Delphix Corp., "What's New Guide for 5.2," Delphix, published Dec. 2017, retrieved on Jan. 2, 2023 from https://docs.delphix.com/docs52/files/83053093/83056028/2/1513184739765/What%27s New Guide for 5.2.pdf.
Delphix, "Provisioning and Managing Virtual Databases" Delphix Engine 6.0.8.0 Documentation (2020) from https://docs.delphix.com/docs/datasets/getting-started/provisioning-and-managing-virtual-databases (accessed Jun. 28, 2021).
Delphix, "Understanding SnapSync and LogSync for Oracle" (May 5, 2013) from https://www.delphix.com/blog/data-virtualization/understanding-snapsync-and-logsync-oracle (accessed Jan. 7, 2020).
Drake, Sam et al. "Architecture of Highly Available Databases" International Service Availability Symposium, pp. 1-16. Springer, Berlin, Heidelberg, 2004. (Year: 2004).
Dremio, "Multiple AWS Clusters" Dremio. 2020. Received from https://docs.dremio.com/deployment/provisioning-ec2.html (Year: 2020).
Ex Parte Quayle Action with Refs. on U.S. Appl. No. 29/733,571 DTD Feb. 11, 2022.
Extended European Search Report re EP21192308.1 DTD Jan. 24, 2022.
Extended European Search Report re EP21192379.2 DTD Jan. 26, 2022.
Fenton, Tom, "How To Create VMware Virtual Volumes" Virtualization & Cloud Review (Feb. 26, 2015) from https://virtualizationreview.com/articles/2015/02/26/how-to-create-vmware-virtual-volumes.aspx (accessed Jun. 2, 2021).
Final Office Action on U.S. Appl. No. 16/234,547 DTD Sep. 9, 2022.
Final Office Action on U.S. Appl. No. 16/234,547 DTD Oct. 5, 2021.
Final Office Action on U.S. Appl. No. 17/006,595 DTD Oct. 14, 2021.
Final Office Action on U.S. Appl. No. 17/182,511 DTD Dec. 6, 2022.
Final Office Action on U.S. Appl. No. 17/337,197 DTD Dec. 15, 2022.
Flecha, Pete, "Whats New in Virtual Volumes (vVols) 2.0" VMware vSAN Virtual Blocks Blog (Oct. 18, 2016) from https://blogs.vmware.com/virtualblocks/2016/10/18/whats-new-in-virtual-volumes-2-0/ (accessed Jun. 2, 2021).
Foreign Action other than Search Report on EP 21192308.1 DTD Apr. 6, 2022.
Foreign Action other than Search Report on EP 21192308.1 DTD Jun. 10, 2022.
Foreign Action other than Search Report on EP 21192379.2 DTD Jun. 15, 2022.
Friedman, Vitaly, "Designing the Perfect Date and Time Picker." Smashing Magazine, published Jul. 2017 (Retrieved from the Internet Apr. 7, 2020). Internet URL: <https://www.smashingmagazine.com/2017/07/designing-perfect-date-time-picker/> (Year: 2017).
Fritchey, Grant, "SQL Server Database Provisioning" Redgate, (Nov. 4, 2016) from https://www.red-gate.com/simple-talk/devops/database-devops/sql-server-database-provisioning/ (accessed Jun. 28, 2021).
Geek University, "VM snapshot files," VMware ESXi course, retrieved Sep. 11, 2022 from https://geek-university.com/vm-snapshot-files/.
Geier, Eric, "Using Static IP Addresses on Your Network" Cisco Press. Sep. 14, 2009. Received from https://www.ciscopress.com/articles/article.asp?p=1393495. (Year: 2009).
Google Cloud, "Architectures for high availability of PostgreSQL clusters on Compute Engine" Google Cloud Architecture Center, (Jan. 21, 2021) from https://cloud.google.com/architecture/architectures-high-availability-postgresql-clusters-compute-engine (accessed Dec. 14, 2021).
Grace, Cato, "What's New in SRM and vSphere Replication 8.3" VMware vSAN Virtual Blocks Blog (Mar. 10, 2020) from https://blogs.vmware.com/virtualblocks/2020/03/10/whats-new-srm-vr-83/ (accessed Jun. 2, 2021).
Guevara, Introducing PlanetScale Insights: Advanced query monitoring, May 26, 2022, https://planetscale.com/blog/introducing-planetscale-insights-advanced-query-monitoring.
Gui, Huan et al. "Network A/B Testing: From Sampling to Estimation" Proceedings of the 24th International Conference on World Wide Web (WWW 15), pp. 399-409, May 18, 2015. DOI: 10.1145/2736277.2741081 (Year: 2015).
Hammerspace, "Simplify Database Deployment Across Kubernetes Clusters" Hammerspace Solution Brief. 2020. Received from https://hammerspace.com/wp-content/uploads/2019/03/HS0107-USEN-Multi-Cluster-Database-Deployments.pdf (Year: 2020).
Hosterman, Cody, "Introducing vSphere Virtual Volumes on the FlashArray" Pure Storage (Jun. 13, 2017) from https://blog.purestorage.com/purely-technical/introducing-vsphere-virtual-volumes-on-the-flasharray/ (accessed Jun. 2, 2021).
Hosterman, Cody, "Introducing vSphere Virtual Volumes on the FlashArray" PureStorage, (Jun. 13, 2017) from https://blog.purestorage.com/purely-technical/introducing-vsphere-virtual-volumes-on-the-flasharray/ (accessed Jun. 28, 2021).
Hosterman, Cody, "Virtual Volumes and Array Snapshots Part I: Managed Snapshots" codyhosterman.com (Jul. 30, 2018) from https://www.codyhosterman.com/2018/07/virtual-volumes-and-array-snapshots-part-i-managed-snapshots/ (accessed Jun. 2, 2021).
Hosterman, Cody, "What's New in vSphere 7.0 Storage Part I: WVols are all over the place!" codyhosterman.com (Mar. 10, 2021) from https://www.codyhosterman.com/2020/03/whats-new-in-vsphere-7-0-storage-part-i-vvols-are-all-over-the-place/ (accessed Jun. 2, 2021).
Hu et al. "Architecture of Highly Available Databases" Lecture Notes in Computer Science (LCNS). vol. 3335, pp. 1-16. May 2004. DOI: 10.1007/978-3-540-30225-4_1. (Year: 2004).
IBM, "Creating a database deployment on the cluster" IBM Cloud Paks 2.1.0 (2021) from https://www.ibm.com/docs/en/cloud-paks/cp-data/2.1.0?topic=database-creating-deployment (accessed Jun. 28, 2021).
Invitation to File a Search Results on EP 21192308.1 DTD Apr. 6, 2022.
Katz, Jonathan S. "Multi-Kubernetes Cluster PostgreSQL Deployments" Crunchy Data. May, 7, 2020. Received from https://info.crunchydata.com/blog/multi-kubernetes-cluster-postgresql-deployments (Year: 2020).
Kohavi, Ron et al., "Online Controlled Experiments and A/B Testing" Encyclopedia of Machine Learning and Data Mining, vol. 7, No. 8, pp. 922-929. Jan. 2017. DOI: 10.1007/978-1-4899-7502-7 891-1 (Year: 2017).
Kolasa, Konrad, "Date Picker." Dribbble, published Feb. 28, 2017 (Retrieved from the Internet Apr. 7, 2020). Internet URL: <https://dribbble.com/shots/3326020-Date-Picker> (Year: 2017).
Kubernetes "Configure Access to Multiple Clusters" Kubernetes Documentation. Oct. 22, 2020. Retrieved from https://kubernetes.io/docs/tasks/access-application-cluster/configure-access-multiple-clusters/ (Year: 2020).
Kubernetes, "Configure Access to Multiple Clusters" Kubernetes Documentation. Oct. 22, 2020. Received from https://kubernetes.io/docs/tasks/access-application-cluster/configure-access-multiple-clusters/ (Year: 2020).
Kumar, Madan. "Managing High Availability in PostgreSQL—Part III: Patroni" ScaleGrid. Aug. 22, 2019. Retrieved from https://scalegrid.io/blog/managing-high-availability-in-postgresql-part-3/ (Year: 2019).
Lctree, "Lctree," Linked Clone Tree Visualizer for vCloud Director, published (Nov. 28, 2012).
Lee, Brandon, "VMware vSphere 7 vVols New Features" VirtualiztaionHowto (Jun. 3, 2020) from https://www.virtualizationhowto.com/2020/06/vmware-vsphere-7-vvols-new-features/ (accessed Jun. 2, 2021).

(56) References Cited

OTHER PUBLICATIONS

M. A. Metawai et al. "Load balancing in distributed multi-agent computing systems" Ain Shams Engineering Journal. ASEJ. May 23, 2012. p. 237-249. (Year: 2012).

Matijaca, Ante, "Dashboard" Dribble, published Dec. 21, 2015, retrieved Feb. 11, 2022 from <https://dribbble.com/shots/2417233-Dashboard> (Year: 2015).

Meadowcroft, Ben, "Virtual Volumes First Year in Review" VMware vSAN Virtual Blocks Blog (Mar. 14, 2016) from https://blogs.vmware.com/virtualblocks/2016/03/14/virtual-volumes-first-year-in-review/ (accessed Jun. 28, 2021).

Mehta, Siddharth, "Analytics with Bower BI Desktop Dynamic Line References" MSSQL Tips, published Oct. 2, 2017, retrieved Feb. 11, 2022 from <https://www.mssqltips.com/sqlservertip/5084/analytics-with-power-bi-desktop-dynamic-line-references/? (Year: 2017).

Mellor, Chris "Beam, Flow and Era: Not a yoga class, silly, Nutanix's move into copy data management" (published May 10, 2019) The Register, from https://www.theregister.co.uk/2018/05/10/nutanix_beam_flow_era/ (accessed Dec. 18, 2019).

Mellor, Chris "Delphix sends database virtualization sailing up the Amazon" (published Dec. 1, 2017) The Register, from https://www.theregister.co.uk/2017/12/01/delphix_database_virtualization_comes_to_aws/ (accessed Dec. 18, 2019).

Microsoft Docs, "Always on availability groups: a high-availability and disaster-recovery solution" Microsoft SQL Docs, Apr. 23, 2019 (2019), https://docs.microsoft.com/en-us/sql/database-engine/availability-groups/windows/always-on-availability-groups-sql-server?view=sql-server-ver15.

Microsoft Docs, "What is an Always on availability group?" Microsoft SQL Docs, Apr. 29, 2020 (2020) https://docs.microsoft.com/en-us/sql/database-engine/availability-groups/windows/overview-of-always-on-availability-groups-sql-server?view=sql-server-ver15.

Microsoft SQL, "Upgrading Always on Availability Group Replica Instances" Microsoft SQL Docs, Jan. 10, 2018, retrieved from https://docs.microsoft.com/en-us/sql/database-engine/availability-groups/windows/upgrading-always-on-availability-group-replica-instances?view=sql-server-ver15 (retrieved Feb. 15, 2021).

Microsoft, "Use a template to create an Access desktop database," Microsoft Office Support, retrieved Sep. 29, 2022 from https://support.microsoft.com/en-us/office/use-a-template-to-create-an-access-desktop-database-d9354d47-e4ce-4efb-878b-c48f3650fb73.

Microsoft, "Database Engine Instances (SQL Server)" Oct. 2, 2020, from https://docs.microsoft.com/en-us/sql/database-engine/configure-windows/database-engine-instances-sql-server?view=sql-server-ver15 (retrieved Jan. 25, 2022).

Mulford, Juan, "vSphere 7—Describe Instant Clone Architecture and Use Cases," Mulcas Cloudy Infrastructures, published Dec. 28, 2021, retrieved Sep. 11, 2022 from https://mulcas.com/vsphere-7-describe-instant-clone-architecture-and-use-cases/.

Murugan, Palani, "Delphix Dynamic Data Platform on VMware vSAN," VMware Virtual Blocks Blog, published Nov. 20, 2017, retrieved on Jan. 2, 2023 from https://blogs.vmware.com/virtualblocks/2017/11/20/delphix-vsan/.

Mvware, "Horizon Architecture", https://techzone.vmware.com/resource/horizon-architecture#introduction.

Net App Support, "Data replication from one destination to another in a series (cascading)" Net App. 2015. Received from https://library.netapp.com/ecmdocs/ECMP1635994/html/GUID-25C143ED-C369-4129-B055-C532FDB8AB79.html (Year: 2015).

Netapp Support, "Cloning databases using SnapManager" (Aug. 2013) from, https://library.netapp.com/ecmdocs/ECMP1217281/html/GUID-EAA4950A-C186-423D-9574-6EA12A92E53D.html (accessed Dec. 17, 2019).

Netapp Support, "Types of SnapManager restore operations" (Aug. 2013) from, https://library.netapp.com/ecmdocs/ECMP1217281/html/GUID-599DF5AE-C49F-4BF0-A96C-E6E71FAFF102.html (accessed Dec. 17, 2019).

Nizhegolenko, Alexey. "High-Availability MySQL cluster with load balancing using HAProxy and Heartbeat." Towards Data Science. Dec. 3, 2018. Retrieved from https://towardsdatascience.com/high-availability-mysql-cluster-with-load-balancing-using-haproxy-and-heartbeat-40a16e134691 (Year: 2018).

Non-Final Office Action on U.S. Appl. No. 16/228,728 DTD Mar. 24, 2020.

Non-Final Office Action on U.S. Appl. No. 16/234,547 DTD Feb. 22, 2022.

Non-Final Office Action on U.S. Appl. No. 16/234,547 DTD Apr. 15, 2021.

Non-Final Office Action on U.S. Appl. No. 16/234,547 DTD Nov. 7, 2022.

Non-Final Office Action on U.S. Appl. No. 16/234,553 DTD Jan. 6, 2021.

Non-Final Office Action on U.S. Appl. No. 17/122,740 DTD Aug. 19, 2022.

Non-Final Office Action on U.S. Appl. No. 17/181,586 DTD Jul. 1, 2022.

Non-Final Office Action on U.S. Appl. No. 17/182,511 DTD Jul. 21, 2022.

Non-Final Office Action on U.S. Appl. No. 17/237,599 DTD Oct. 14, 2022.

Non-Final Office Action on U.S. Appl. No. 17/337,197 DTD Sep. 8, 2022.

Notion, "Database templates," Notion Help Center, retrieved Sep. 29, 2022 from https://www.notion.so/help/database-templates.

Nutanix "Nutanix announces Flow, Era and Beam and . Next 2018" (published May 9, 2018) Nutanix Youtube, from https://www.youtube.com/watch?v=w40asaGtrkU (accessed Dec. 19, 2019).

Nutanix, "Blueprints Usage," Nutanix Support and Insights, retrieved Sep. 29, 2022 from https://portal.nutanix.com/page/documents/details?targetId=Nutanix-Calm-Admin-Operations-Guide-v3_2_7:nuc-nucalm-blueprints-intro-c.html.

Nutanix, "Creating a Playbook," Nutanix Support and Insights, retrieved Sep. 29, 2022 from https://portal.nutanix.com/page/documents/details?targetId=Nutanix-Beam-User-Guide:bea-playbook-create-t.html.

Nutanix, "Creating a ServiceNow Template in Beam," Nutanix Support and Insights, retrieved Sep. 29, 2022 from https://portal.nutanix.com/page/documents/details?targetId=Nutanix-Beam-User-Guide:bea-servicenow-template-create-cg-t.html.

Nutanix, "Nutanix Hybrid Cloud Infrastructure Now Available on Amazon Web Services" Nutanix Press Release. Aug. 11, 2020. Received from https://www.nutanix.com/press-releases/2020/nutanix-clusters-on-aws?icid=111AJW0ZPW22N (Year: 2020).

Nyffenegger et al., "SQL Server Instance" 2017, from https://renenyffenegger.ch/notes/development/databases/SQL-Server/architecture/instance (retrieved Jan. 25, 2022).

Opster, "High Availability in Elasticsearch—Cross Cluster Replication and Alternatives" Opster. 2020. Received from https://opster.com/blogs/elasticsearch-cross-cluster-replication-overview/ (Year: 2020).

Opster, "Multi-Cluster Load Balancer—An Alternative to Cross Cluster Replication" Opster. 2020. Received from https://opster.com/elasticsearch-multi-cluster-load-balancer/ (Year: 2020).

Or, Andrew, "Understanding your Apache Spark Application Through Visualization" Data Bricks, published Jun. 22, 2015, retrieved Feb. 11, 2022 from <https://databricks.com/blog/2015/06/22/understanding-your-spark-application-through-visualization.html> (Year: 2015).

Oracle Cloud, "Using Oracle Autonomous Database on Shared Exadata Infrastructure" published Dec. 2022.

Oracle Communications, "Provisioning Database Interface User's Guide, Release 16.0" (Sep. 2014) Oracle, p. 1-174.

Oracle Help Center, "Enterprise Manager Lifecycle Management Administrator's Guide, 4. Overview of Database Provisioning" (2019) from, https://docs.oracle.com/cd/E24628_01/em.121/e27046/prov_db_overview.htm#EMLCM12206, (accessed Dec. 17, 2019).

Oracle, "Creating Databases Using Database Template," Cloud Administration Guide, retrieved Sep. 29, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.

Oracle, "Creating Databases Using Database Template," Cloud Administration Guide, retrieved on Oct. 17, 2022 from https://docs.oracle.com/en/enterprise-manager/cloud-control/enterprise-manager-

(56) References Cited

OTHER PUBLICATIONS cloud-control/13.4/emclo/creating-databases-using-database-template. html#GUID-BB3923BE-192D-40A2-9C5D-AAC5BA3326C0.
Oracle, "Creating Databases Using Database Template," Enterprise Manager Cloud Administration Guide, retrieved Sep. 29, 2022 from https://docs.oracle.com/cd/E91266_01/EMCLO/GUID-BB3923BE-192D-40A2-9C5D-AAC5BA3326C0.htm#EMCLO2097.
Oracle, "Creating Databases Using Database Template," Enterprise Manager Cloud Administration Guide, retrieved on Oct. 17, 2022 from https://docs.oracle.com/cd/E91266_01/EMCLO/GUID-BB3923BE-192D-40A2-9C5D-AAC5BA3326C0.htm#EMCLO2097.
Oracle, "Exadata Cloud@Customer Security Controls", Version 2.18, Jul. 27, 2022, https://www.oracle.com/a/ocom/docs/engineered-systems/exadata/exadata-cloud-at-customer-security-controls.pdf.
Oracle, "Introduction to Blueprints," Enterprise Manager Cloud Administration Guide, retrieved Sep. 29, 2022 from https://docs.oracle.com/cd/E63000_01/EMCLO/blueprint.htm#EMCLO1910.
Oracle, "Oracle Exadata Cloud@Customer X9M", Version 1.17, 2022, https://www.oracle.com/dk/a/ocom/docs/engineered-systems/exadata/exacc-x9m-ds.pdf.
Oracle, "Oracle Gen 2 Exadata Cloud@Customer Security Controls", version 2.18, Jul. 27, 2022, https://www.oracle.com/a/ocom/docs/engineered-systems/exadata/exadata-cloud-at-customer-security-controls.pdf.
Oracle, "Using the DBaaS Self Service Portal," Cloud Administration Guide, retrieved Sep. 29, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
Oracle, "Using the DBaaS Self Service Portal," Cloud Administration Guide, retrieved on Oct. 17, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
Oracle, "Part III: Database Provisioning" Enterprise Manager Lifecycle Management Administrator's Guide (2012) from https://docs.oracle.com/cd/E24628_01/em.121/e27046/part_db_prov.htm#CHDBHBCE (accessed Jun. 28, 2021).
Oracle, "Webinar: Automate your database provisioning to increase efficiency and standardization" (published Jul. 14, 2020) Oracle Youtube, from https://www.youtube.com/watch?v=nUMdekXyqr4 (accessed Jun. 28, 2021).
Palmer, Brent, "Date Range." Dribbble, published Oct. 21, 2015 (Retrieved from the Internet Apr. 7, 2020). Internet URL: <https://dribbble.com/shots/2306949-Date-Range> (Year: 2015).
Patil, Manoj E. et al. "Design and Implementation of Graphical User Interface for Relational Database Management System" (2012), International Jounral of Computer Science and Information Technologies (IJCSIT), vol. 3 (3), p. 3871-3874.
PlanetScale, Deployment Options Documentation, Aug. 1, 2022, https://planetscale.com/docs/concepts/deployment-options#cloud.
PlanetScale, Query Insights Documentation, 2022, https://planetscale.com/docs/concepts/query-insights#insights-page-overview.
PlanetScale, The MySQL—compatible serverless database platform, 2022, https://planetscale.com.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Principled Technologies, "VMware vCloud Automation Center DBaaS: Provision databases in minutes" A Principled Technologies Test Report (Aug. 2014) from https://www.principledtechnologies.com/vmware/vCAC_DBaaS_0914.pdf (accessed Jun. 2, 2021).
Raffic, Mohammed, "Creating Linked Clone Desktop Pools in VMware Horizon View 6.X," VMware Arena, published Mar. 15, 2017, retrieved Sep. 11, 2022 from http://www.vmwarearena.com/creating-linked-clone-desktop-pools-in-vmware-horizon-view-6-x/.
Red Hat "Chapter 4. Configuring The Haproxy Load Balancer" Red Hat Customer Portal. 2020. Retrieved on Dec. 22, 2020 from https://access.redhat.com/documentation/en-us/red_hat_cloudforms/4.6/html/high_availability_guide/configuring_haproxy (Year: 2020).
Reed, Kate "Nutanix Introduces Database Services with Era" (published May 9, 2018) Business Wire, from https://www.businesswire.com/news/home/20180509005397/en/ (accessed Dec. 18, 2019).
Reed, Kate "Nutanix Introduces Database Services with Era" (published May 9, 2018) Nutanix Press Releases, from https://ir.nutanix.com/company/press-releases/press-release-details/2018/Nutanix-Introdu/ (accessed Dec. 18, 2019).
Rocheleau, Jake, "30 Best Free Calendar & Datepicker jQuery Plugins." Vandelay Design, published Aug. 29, 2018 (Retrieved from the Internet Apr. 7, 2020). Internet URL: <https://www.vandelaydesign.com/30-best-free-jquery-plugins/> (Year: 2018).
Rubrik, "Exploring the Depth of Simplicity: Protecting Microsoft SQL Server with Rubrik," Technical White Paper, published Mar. 2017, retrieved on Jan. 2, 2023 from https://www.rubrik.com/content/dam/rubrik/en/resources/white-paper/Protecting-Microsoft-SQLServer-with-Rubrik.pdf.
Rubrik, "Hyperconverged Infrastructure with the Simplest Data Protection," published Jan. 2016, retrieved on Jan. 2, 2023 from https://web.archive.org/web/20210117100439/https://www.rubrik.com/wp-content/uploads/2015/12/Joint-Solution-Brief-Nutanix-and-Rubrik.pdf.
Sanglaji, Maryam et al. "Nutanix Era: Databases Made Simple" (published 2018) Nutanix, from https://www.nutanix.com/blog/nutanix-era-databases-made-simple (accessed Dec. 18, 2019).
Sanglaji, Maryam et al. "Nutanix Era: One-click Database Management (London)" (published 2018) .Next Conference 2018, from https://next.nutanix.com/next-conference-2018-54/nutanix-era-one-click-database-manag (accessed Dec. 18, 2019).
Sanglaji, Maryam et al. "Nutanix Era: One-click Database Management" (published 2018) .Next Conference 2018, from https://www.dropbox.com/s/tfhw1nbOrcvexg3/NEXTEURO2018%20-%20Nutanix%20Era-One%20click%20Database%20Management.pdf?dl=0 (accessed Dec. 18, 2019).
Savjani, Parikshit, "Automate your Azure Database for MySQL deployments using ARM templates," Microsoft Azure, published Nov. 1, 2018, retrieved Sep. 29, 2022 from https://azure.microsoft.com/en-us/blog/automate-your-azure-database-for-mysql-deployments-using-arm-templates/.
Sharif, Ashraf. "Making Your Database Components Highly Available (HA) via Load Balancers". Several Nines. Mar. 20, 2018. Retrieved from https://severalnines.com/blog/become-clustercontrol-dba-making-your-db-components-ha-load-balancers (Year: 2018).
Stack Exchange Users. "PostgreSQL High Availability/Scalability using HAProxy and PGBouncer" Stack Exchange. Nov. 2020. Retrieved from https://dba.stackexchange.com/questions/56559/postgresql-high-availability-scalability-using-haproxy-and-pgbouncer (Year: 2020).
Stepan, "How to Set Up Multi-Cluster Load Balancing with GKE", DoiT International. Aug. 17, 2020. Received from https://blog.doit-intl.com/how-to-setup-multi-cluster-load-balancing-with-gke-4b407e1f3dff (Year: 2020).
Stone, "Cross Tenant Access", LoanPro Help, https://help.loanpro.io/article/vyy37c5bhd-cross-tenant-access, accessed Jun. 29, 2022.
Storti, Brian "A Primer on Database Replication" Brianstorti.com (May 23, 2017) from https://www.brianstorti.com/replication/ (accessed Jun. 28, 2021).

(56) References Cited

OTHER PUBLICATIONS

Tang, "Multi-tenant access control for cloud services", Aug. 2014, The University of Texas at San Antonio College of Sciences.

Tarvo, Alexander et al., "CanaryAdvisor: a statistical-based tool for canary testing (demo)" Proceedings of the 2015 International Symposium on Software Testing and Analysis (ISSTA 2015), pp. 418-422, Jul. 13, 2015, DOI: 10.1145/2771783.2784770 (Year: 2015).

Tessel for Oracle, "Fully-managed, high-performance Oracle databases with enterprise-grade data protection, security, and compliance@ your terms", 2022, https://www.tessell.io/services/oracle.

The Nutanix Bible; from https://nutanixbible.com/; accessed on Jan. 12, 2016.

The Nutanix Bible; from https://nutanixbible.com/; accessed on Jun. 25, 2018.

The Nutanix Bible; from https://nutanixbible.com/; accessed on Jan. 3, 2017.

The Nutanix Bible; from https://nutanixbible.com/; accessed on Jan. 3, 2018.

The Nutanix Bible; from https://nutanixbible.com/; accessed on Sep. 4, 2015.

The Nutanix Bible; from https://nutanixbible.com/; accessed on Jan. 8, 2019.

The Nutanix Bible; from https://nutanixbible.com/; accessed on Jun. 8, 2017.

The Nutanix Bible; from https://nutanixbible.com/; accessed on Jun. 9, 2016.

US Office Action on U.S. Appl. No. 17/006,595 DTD Aug. 27, 2021.

Virtualization Works, "VMware vFabric Data Director" Virtualization Works: VMware Authorized Online Reseller, (Jun. 2021) from https://www.virtualizationworks.com/vFabric-Data-Director.asp#:~:text=VMware%C2%AE%20vFabric%E2%84%A2%20Data,agility%20and%20reducing%20database%20TCO (accessed Jun. 28, 2021).

VMware "VMware vFabric Data Director Administrator and User Guide: Clone a Database" (2012) from https://pubs.vmware.com/datadirector/index.jsp?topic=%2Fcom.vmware.datadirector.admin.doc%2FGUID-426EEA1E-BF44-462F-B400-E2421F53144D.html (accessed Dec. 17, 2019).

VMware Horizon, "Horizon Control Plane Services Architecture", Sep. 2021, https://images.techzone.vmware.com/sites/default/files/resource/horizon_control_plane_services_architecture_noindex.pdf.

VMware Tanzu, "Innovate and grow your business on any and many clouds-fast", 2022.

Vmware, "Clone a Virtual Machine," VMware Fusion, published Sep. 3, 2020, retrieved Sep. 11, 2022 from https://docs.vmware.com/en/VMware-Fusion/12/com.vmware.fusion.using.doc/GUID-482C606F-0143-4466-A64A-F64116BC5430.html.

Vmware, "Create a Workload Cluster Template," VMware Telco Cloud Automation, published Apr. 6, 2021, retrieved on Sep. 29, 2022 from https://docs.vmware.com/en/VMware-Telco-Cloud-Automation/1.9/com.vmware.tca.userguide/GUID-E33A228F-4FB6-41BB-BC8E-AB0D3642B788.html.

Vmware, "Deploy a Virtual Machine from a Template in the vSphere Web Client," VMware vSphere, published Apr. 8, 2021, retrieved Sep. 29, 2022 from https://docs.vmware.com/en/VMware-vSphere/6.7/com.vmware.vsphere.vm_admin.doc/GUID-8254CD05-CC06-491D-BA56-A773A32A8130.html.

Vmware, "Getting Started with Database Ingestion," VMware vFabric Data Director 2.0, retrieved Sep. 11, 2022 from https://www.vmware.com/pdf/vfabric-data-director-20-database-ingestion-guide.pdf.

VMware, "Horizon 7 Administration," VMware Horizon 7 7.13, published Oct. 2020, retrieved Sep. 11, 2022 from https://docs.vmware.com/en/VMware-Horizon-7/7.13/horizon-administration.pdf.

VMware, "Horizon Cloud on Microsoft Azure Architcture", https://techzone.vmware.com/resource/horizon-cloud-on-microsoft-azure-architecture#introduction.

VMware, "Horizon Cloud Pods in Microsoft Azure—Create a VDI Multi-Cloud Assignment in Your Horizon Cloud Tenant Environment", Aug. 8, 2022, https://docs.vmware.com/en/VMware-Horizon-Cloud-Service/services/hzncloudmsazure.admin15/GUID-9EE86FC9-49CB-4995-8346-3AA76CCE96F8.html.

VMware, "Horizon Control Plane Services Architecture", Sep. 2021, https://images.techzone.vmware.com/sites/default/files/resource/horizon_control_plane_services_architecture_noindex.pdf.

VMware, "Horizon Messaging", https://docs.vmware.com/en/VMware-Horizon-7/7.13/horizon-architecture-planning/GUID-39B5D03B-F619-4355-A30A-F8544D95539C.html.

VMware, "Learn More About Network Profiles in vRealize Automation Cloud", https://docs.vmware.com/en/vRealize-Automation/services/Using-and-Managing-Cloud-Assembly/GUID-01E442EE-4004-4ED1-AA32-9CF73F24CB09.html.

VMware, "Managing Virtual Machines in VMware Cloud on AWS," VMware Cloud on AWS, published Feb. 11, 2021, retrieved on Sep. 29, 2022 from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html.

VMware, "Setting Up Virtual Desktops in Horizon Console," VMware Horizon 7 7.13, published Oct. 2020, retrieved Sep. 11, 2022 from https://docs.vmware.com/en/VMware-Horizon-7/7.13/virtual-desktops.pdf.

VMware, "Snapshot Files," VMware vSphere, published Jul. 29, 2022, retrieved Sep. 11, 2022 from https://docs.vmware.com/en/VMware-vSphere/7.0/com.vmware.vsphere.vm_admin.doc/GUID-38F4D574-ADE7-4B80-AEAB-7EC502A379F4.html.

VMware, "Understanding Clones in VMware vSphere 7," Performance Study, published May 27, 2021, retrieved on Sep. 11, 2022 from https://www.vmware.com/content/dam/digitalmarketing/vmware/en/pdf/techpaper/performance/cloning-vSphere7-perf.pdf.

VMware, "Using VMware Workstation Pro," VMware Workstation Pro 16.0, published 2021, retrieved Sep. 11, 2022 from https://docs.vmware.com/en/VMware-Workstation-Pro/16.0/workstation-pro-16-user-guide.pdf.

VMware, "VMware Horizon 7 Instant-Clone Desktops and RDSH Servers," VMware Horizon 7.x, published Jul. 2017, retrieved Sep. 11, 2022 from https://www.vmware.com/content/dam/digitalmarketing/vmware/en/pdf/techpaper/vmware-horizon-view-instant-clone-technology.pdf.

VMware, "VMware Horizon on VMware vSAN Best Practices," Technical White Paper, published Dec. 2020, retrieved Sep. 11, 2022 from https://www.vmware.com/content/dam/digitalmarketing/vmware/en/pdf/products/vsan/vmware-horizon-7-on-vmware-vsan-best-practices.pdf.

VMware, "VMware vFabric Data DirectorAdministrator and User Guide," vFabric Data Director 1.0, retrieved Sep. 11, 2022 from https://usermanual.wiki/vmware/vfabricdatadirector10ag.715740134/view.

VMware, "VMware vStorage Virtual Machine File System," Vmware Technical White Paper Updated for VMware Vsphere 4 Version 2.0, retrieved Sep. 11, 2022 from https://www.vmware.com/content/dam/digitalmarketing/vmware/en/pdf/techpaper/vmware-vmfs-tech-overview-white-paper.pdf.

VMware, "vRealize Automation Cloud and VMware Cloud on AWS", https://www.vmware.com/content/dam/digitalmarketing/vmware/en/pdf/vrealize-automation/vmw-vrealize-automation-cloud-on-aws-solution-brief.pdf.

VMware, "Create a Workload Cluster Template" (published Apr. 6, 2021) from https://docs.vmware.com/en/VMware-Telco-Cloud-Automation/1.9/com.vmware.tca.userguide/GUID-E33A228F-4FB6-41BB-BC8E-AB0D3642B788.html (accessed Sep. 10, 2021).

VMware, "Deploy a Virtual Machine from a Template in the vSphere Web Client" (published Apr. 8, 2021) from https://docs.vmware.com/en/VMware-vSphere/6.7/com.vmware.vsphere.vm_admin.doc/GUID-8254CD05-CC06-491D-BA56-A773A32A8130.html (accessed Sep. 10, 2021).

VMware, "Getting Started with Database-as-a-Service" VMware vFabric Data Director 2.0 (2012) from https://www.vmware.com/pdf/vfabric-data-director-20-database-as-a-service-guide.pdf (accessed Jun. 2, 2021).

(56) References Cited

OTHER PUBLICATIONS

VMware, "Managing Virtual Machines in VMware Cloud on AWS" (published Feb. 11, 2021) from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html (accessed Sep. 10, 2021).
VMware, "Virtual Volumes and Replication" VMware Docs (May 31, 2019) from https://docs.vmware.com/en/VMware-vSphere/6.5/com.vmware.vsphere.storage.doc/GUID-6346A936-5084-4F38-ACB5-B5EC70AB8269.html (accessed Jun. 2, 2021).
VMware, "VMware vFabric Data Director 2.0: Getting Started with Database Provisioning" (2012) from https://www.vmware.com/pdf/vfabric-data-director-20-database-provision-guide.pdf (accessed Dec. 18, 2019).
VMware, "What's New in vSphere 7 Core Storage" VMware The Cloud Platform Tech Zone (May 17, 2021) from https://core.vmware.com/resource/whats-new-vsphere-7-core-storage#sec2-sub5 (accessed Jun. 2, 2021).
VMware, "What's New: vSphere Virtual Volumes" VMware Storage Business Unit Documentation (Aug. 2015) from https://www.vmware.com/content/dam/digitalmarketing/vmware/en/pdf/products/virtualvolumes/vmwar e-whats-new-vsphere-virtual-volumes.pdf (accessed Jun. 2, 2021).
VMware, Cloud Control Plane Management, "Horizon Control Plane Services", https://www.vmware.com/in/products/horizon/controlplane.html.
VMware, Create Network Profiles, https://vdc-repo.vmware.com/vmwb-repository/dcr-public/e07569a6-6154-45d7-acdf-595e0b089892/44bb2e01-dd74-44e8-98da-b16f257b9a8d/GUID-35DF1889-6E34-449E-915A-3BC5C4DA172C.html.
Warner, Alex et al., "Chapter 16—Canarying Releases" (published 2018) Google Workbook published by O'Reilly Media, Inc., from https://sre.google/workbook/canarying-releases/ (accessed Sep. 14, 2021).
Warren, "Internet Archive Wayback Machine Introduces New Beta Version With Calendar View." warren's blog, published Jan. 23, 2011 (Retrieved from the Internet Apr. 7, 2020). Internet URL: <warrenduecker.blogspot.com/2011/01/internet-archive-wayback-machine.html> (Year: 2011).
WebDeveloper Juice, "7 Beatiful Web Based Timeline Using Javascript and CSS," WebDeveloper Juice, published Sep. 28, 2011, retrieved Feb. 11, 2022 from <https://www.webdeveloperjuice.com/2011/09/28/7-beautiful-web-based-timeline-using-javascript-and-css/> (Year: 2011).
Wickstrom, Frank, "Keeping personal data personal with database sanitization" Anders. (Jun. 26, 2019) from https://www.anders.com/en/blog/keeping-personal-data-personal-with-database-sanitization/ (accessed Jun. 28, 2021).
YouTube Video for Delphix Corp., "How To Create Database Copies with Delphix," YouTube, Apr. 3, 2018, https://www.youtube.com/watch?v=1EjR-k4EJ68 [youtube.com].
YouTube Video for Rubrik, "Item-level Recovery with Rubrik SQL Server Live Mount," YouTube, Jul. 12, 2018, https://www.youtube.com/watch?app=desktop&v=Upp4Ume03P0&feature=youtu.be [youtube.com].
YouTube Video screenshots for "Bala Kuchibhotla, Nutanix | Nutanix .Next EU 2019," YouTube, Oct. 10, 2019, https://www.youtube.com/watch?v =_0Ma-2092Y0 [youtube.com].
YouTube Video screenshots for "Nutanix Business Critical Applications & Databases—.Next Europe 2019," YouTube, Oct. 16, 2019, https://www.youtube.com/watch?v=KI7IEmm6j60 [youtube.com].
YouTube Video screenshots for "Nutanix Era .Next 2019 Demo," YouTube, May 10, 2019, https://www.youtube.com/watch?v=PAWHHdCEArc&t=267s [youtube.com].
YouTube Video screenshots for Nutanix , "Nutanix Era .Next 2019 Demo", YouTube, May 10, 2019, https://youtu.be/PAWHHdCEArc [youtube.com].
YouTube Video screenshots for Nutanix , "Unify Private and Public Clouds with Nutanix Clusters", YouTube, Jul. 31, 2020, https://www.youtube.com/watch?v=xuw4F4wBDoc [youtube.com].
Zhang, Junchi, "vFabric Data Director 2.7 customer deck," published May 17, 2013, retrieved Sep. 11, 2022 from https://www.slideshare.net/harryaya/vfabric-data-director-27-customer-deck.
"About Snapshots and Clones", Administering Oracle Java Cloud Service, https://docs.oracle.com/en/cloud/paas/java-cloud/jscag/snapshots-and-clones1.html#GUID-28871F48-A458-41C1-86F8-566ED842C3D5.
"Cloning a volume for an Amazon Aurora DB cluster", https://docs.aws.amazon.com/AmazonRDS/latest/AuroraUserGuide/Aurora.Managing.Clone.html.
"Dell PS Series Snapshots and Clones: Best Practices and Sizing Guidelines", Dell Storage Engineering, Nov. 2019, https://dl.dell.com/manuals/common/ps-series-snapshots-clones-bp1027_en-us.pdf.
"Enterprise Manager Cloud Administration Guide", Oracle Help Center, 2024, https://docs.oracle.com/cd/E24628_01/doc.121/e28814/cloud_db_clonesnap.htm#CEGCJCBC.
"Protecting Microsoft SQL Server with Rubrik", Rubrik Technical Marketing, Sep. 2023, https://www.rubrik.com/content/dam/rubrik/en/resources/white-paper/rwp-protecting-microsoft-sql-server-with-rubrik.pdf.
Maruthachalam, et al., "A Distributed System Design for Next Generation Storage and Remote Replication", 2014, https://ieeexplore.ieee.org/abstract/document/6814686.
AWS. "Amazon RDS Backup and Restore" AWS. Sep. 18, 2020. Retrieved from https://aws.amazon.com/rds/features/backup/ (accessed Dec. 7, 2023).
AWS. "Backup with AWS" Aws. Jun. 2019. Retrieved from https://pages.awscloud.com/rs/112-TZM-766/images/AWS004%20B%26R%20eBook%20R4i.pdf (accessed Dec. 7, 2023).
AWS. "Getting started 3: Create a scheduled backup" AWS Backup. Oct. 21, 2019. Retrieved from https://docs.aws.amazon.com/aws-backup/latest/devguide/create-a-scheduled-backup.html (accessed Dec. 7, 2023).
AWS. "Tagging Amazon RDS resources" Amazon Relational Database Service. Jan. 16, 2013. Retrieved from https://docs.aws.amazon.com/AmazonRDS/latest/UserGuide/USER_Tagging.html (accessed Dec. 7, 2023).
AWS. "Working with backups" Amazon Relational Database Service. Jan. 16, 2013. Retrieved from https://docs.aws.amazon.com/AmazonRDS/latest/UserGuide/USER_WorkingWithAutomatedBackups.html (accessed Dec. 7, 2023).
Hussain, Sadequl. "Running SQL Server Databases in the Amazon Cloud—RDS Backup and Restore (Part 3)" MSSQL Tips. Jul. 2014. Retrieved from https://www.mssqltips.com/sqlservertip/3290/running-sql-server-databases-in-the-amazon-cloud-rds-backup-and-restore-part-3/ (accessed Dec. 7, 2023).
Sommer, Chris. "Beware the automated backup window when running native SQL Server backups in RDS" SQL Server Central. Aug. 4, 2017. Retrieved from https://www.sqlservercentral.com/blogs/beware-the-automated-backup-window-when-running-native-sql-server-backups-in-rds (accessed Dec. 7, 2023).
Foreign Search Report on PCT DTD Sep. 7, 2023.
Github. "Multi-tenancy & Row-level Security" Tableau Embedding Playbook. Jul. 7, 2020. Retrieved from https:/tableau.github.io/embedding-playbook/pages/04_multitenancy_and_rls (accessed Sep. 28, 2023).
Kubernetes. "Access Clusters Using the Kubernetes API" Kubernetes Documentation. Apr. 11, 2019. Retrieved from https://kubernetes.io/docs/tasks/administer-cluster/access-cluster-api/ (accessed Oct. 11, 2023).
Kubernetes. "Authenticating" Kubernetes Documentation. Jul. 12, 2018. Retrieved from https://kubernetes.io/docs/reference/access-authn-authz/authentication/ (accessed Oct. 11, 2023).
Kubernetes. "Communication between Nodes and the Control Plane" Kubernetes Documentation. May 1, 2020. Retrieved from https://kubernetes.io/docs/concepts/architecture/control-plane-node-communication/ (accessed Oct. 9, 2023).

(56) References Cited

OTHER PUBLICATIONS

Kubernetes. "Nodes" Kubernetes Documentation. Jul. 14, 2017. Retrieved from https://kubernetes.io/docs/concepts/architecture/nodes/ (accessed Oct. 11, 2023).
Kubernetes. "Operating etcd clusters for Kubernetes" Kubernetes Documentation. Sep. 27, 2018. Retrieved from https://kubernetes.io/docs/tasks/administer-cluster/configure-upgrade-etcd/ (accessed Oct. 11, 2023).
Kubernetes. "PKI certificates and requirements" Kubernetes Documentation. Jun. 16, 2019. Retrieved from https://kubernetes.io/docs/setup/best-practices/certificates/ (accessed Oct. 11, 2023).
Melo, Gilson. "Overview of the Interconnect Between Oracle and Microsoft" Oracle Cloud Infrastructure Blog. Jun. 5, 2019 Retrieved from https://blogs.oracle.com/cloud-infrastructure/post/overview-of-the-interconnect-between-oracle-and-microsoft (accessed Sep. 28, 2023).
Progress. "Multi-tenant features" Progress Documentation. Apr. 12, 2017. Retrieved from https://docs.progress.com/bundle/openedge-database-management-117/page/Multi-tenant-features.html (accessed Sep. 28, 2023).
Progress. "Simple tenancy" Progress Documentation. Apr. 12, 2017. Retrieved from https://docs.progress.com/bundle/openedge-database-management-117/page/Simple-tenancy.html (accessed Sep. 28, 2023).
Progress. "Tenant ID" Progress Documentation. Apr. 12, 2017. Retrieved from https://docs.progress.com/bundle/openedge-database-multitenancy-117/page/Tenant-ID.html (accessed Sep. 28, 2023).
Progress. "Tenant-ID() method" Progress Documentation. Jun. 2011. Retrieved from https://docs.progress.com/bundle/abl-reference/page/TENANT-ID-method.html# (accessed Sep. 28, 2023).
Progress. "What is multi-tenancy?" Progress Documentation. Apr. 12, 2017. Retrieved from https://docs.progress.com/bundle/openedge-database-multitenancy-117/page/What-is-multi-tenancy.html (accessed Sep. 28, 2023).
Tabbara, Bassam, et al. "Introducing Crossplane—An Open Source Multi-Cloud Control-Plane" Dec. 4, 2018. Retrieved from https://docs.google.com/document/d/1whncqdUeU2cATGEJhHvzXWC9xdK29Er45NJeoemxebo/mobilebasic (accessed Sep. 28, 2023).
Ten Six. "How to Assign a Task Calendar in Microsoft Project" Ten Six Consulting. Feb. 27, 2018. Retrieved from https://tensix.com/how-to-assign-a-task-calendar-in-microsoft-project/ (accessed Sep. 28, 2023).
YouTube Video screenshots for Progress User Assistance. "Creating tenants, domains, and users in a Progress OpenEdge multi tenant database" YouTube. May 23, 2016. Retrieved from https://youtu.be/3kGL2afVV_E [youtube.com] (accessed Sep. 28, 2023).
YouTube Video screenshots for Progress. "Data Management: Table Partitioning and Multi-tenancy" YouTube. Oct. 8, 2018. Retrieved from https://www.youtube.com/watch?v=NbEuNmSazh8 [youtube.com] (accessed Sep. 28, 2023).
YouTube Video screenshots for Progress. "Evolving Your OpenEdge Architecture" YouTube. Apr. 26, 2019. Retrieved from https://youtu.be/-7r7xISRe3U [youtube.com] (accessed Sep. 28, 2023).
Amudala, Rajasekhar. "Add Targets Manually on EM Cloud Control 13c" Oracle DBA—Tips and Techniques. Jul. 13, 2020. Retrieved from http://www.br8dba.com/add-targets-manually-on-em-cloud-control-13c/ (accessed Aug. 30, 2023).
AWS. "Amazon Relational Database Service (RDS)" Amazon Relational Database Service. Dec. 24, 2017. Retrieved from https://web.archive.org/web/20171224182936/https:/aws.amazon.com/rds/#features (accessed Sep. 6, 2023).
AWS. "Create a custom Windows AMI" Amazon Elastic Compute Cloud. Jan. 15, 2013. Retrieved from https://docs.aws.amazon.com/AWSEC2/latest/WindowsGuide/Creating_EBSbacked_WinAMI.html (accessed Aug. 30, 2023).
AWS. "Creating a MySQL DB Instance and Connecting to a Database on a MySQL DB Instance" Amazon Relational Database Service. Dec. 22, 2017. Retrieved from https://web.archive.org/web/20171222204154/https:/docs.aws.amazon.com/AmazonRDS/latest/UserGuide/CHAP_GettingStarted.CreatingConnecting.MySQL.html (accessed Sep. 6, 2023).
AWS. "Creating an Amazon RDS DB instance" Amazon Relational Database Service. May 13, 2020. Retrieved from https://docs.aws.amazon.com/AmazonRDS/latest/UserGuide/USER_CreateDBInstance.html#USER_CreateDBInstance.Settings (accessed Aug. 30, 2023).
AWS. "Creating and connecting to an Oracle DB instance" Amazon Relational Database Service. Jun. 6, 2014. Retrieved from https://docs.aws.amazon.com/AmazonRDS/latest/UserGuide/CHAP_GettingStarted.CreatingConnecting.Oracle.html (accessed Aug. 30, 2023).
AWS. "Maintaining a DB instance" Amazon Relational Database Service. Sep. 5, 2015. Retrieved from https://docs.aws.amazon.com/AmazonRDS/latest/UserGuide/USER_UpgradeDBInstance.Maintenance.html#OS_Updates (accessed Aug. 30, 2023).
AWS. "Regions and Availability Zones" Amazon Relational Database Service. Dec. 22, 2017. Retrieved from https://web.archive.org/web/20171222195304/http:/docs.aws.amazon.com/AmazonRDS/latest/UserGuide/Concepts.RegionsAndAvailabilityZones.html (accessed Sep. 6, 2023).
AWS. "What is AWS CloudFormation?" AWS CloudFormation. Feb. 18, 2020. Retrieved from https://docs.aws.amazon.com/AWSCloudFormation/latest/UserGuide/Welcome.html (accessed Sep. 6, 2023).
Barr, Jeff. "New—Cross-Account Copying of Encrypted EBS Snapshots" AWS News Blog. Jun. 21, 2016. Retrieved from https://aws.amazon.com/blogs/aws/new-cross-account-copying-of-encrypted-ebs-snapshots/ (accessed Apr. 6, 2023).
Bhrara, Raminder. "Oracle Cloud Infrastructure OCI Gen-2 Cloud Security—Part II (Identity and Access Management)" RedThunder.Blog. Dec. 31, 2018. Retrieved from https://redthunder.blog/2018/12/31/oracle-cloud-infrastructure-oci-gen-2-cloud-security-part-ii-identity-and-access-management/ (accessed Sep. 14, 2023).
CloudThat. "Virtualization in Amazon Web Services" CloudThat. Oct. 16, 2014. Retrieved from https://www.cloudthat.com/resources/blog/virtualization-in-amazon-web-services (accessed Aug. 30, 2023).
Commvault. "Adding a Database Group for Alibaba Cloud ApsaraDB RDS for MySQL" Essential. Sep. 22, 2020. Retrieved from https://documentation.commvault.com/v11/essential/122970_adding_database_group_for_alibaba_cloud_apsaradb_rds_for_mysql.html (accessed Aug. 30, 2023).
Donchovski, Igor. "Maintenance for MongoDB Replica Sets" SlideShare. Oct. 2, 2019. Retrieved from https://www.slideshare.net/IgorLE/maintenance-for-mongodb-replica-sets (accessed Aug. 30, 2023).
Duvuri, Aditya. "Policies in Oracle Cloud Infrastructure (OCI) Data Integration" Oracle Cloud Infrastructure Blog. Aug. 17, 2020. Retrieved from https://blogs.oracle.com/dataintegration/post/policies-in-oracle-cloud-infrastructure-oci-data-integration (accessed Sep. 14, 2023).
Erwin, Danyelle. "What's New in SAP HANA Cockpit 2.0 SP 12" SAP Community. Jun. 22, 2020. Retrieved from https://blogs.sap.com/2020/06/22/whats-new-in-sap-hana-cockpit-2.0-sp-12/ (accessed Aug. 30, 2023).
Google Cloud. "Creating Instances" Database Products. Sep. 18, 2018. Retrieved from https://web.archive.org/web/20180918103721/https:/cloud.google.com/sql/docs/mysql/create-instance (accessed Sep. 6, 2023).
Google Cloud. "Rest Resource: subnetworks" Compute Engine. Jul. 1, 2019. Retrieved from https://cloud.google.com/compute/docs/reference/rest/beta/subnetworks (accessed Sep. 6, 2023).
Google. "Create a MySQL database hosted in Google Cloud" AppSheet Help. 2020. Retrieved from https://support.google.com/appsheet/answer/10107301?hl=en&ref_topic=10102124&sjid=7557016717740597161-AP (accessed Jul. 26, 23).
Havewala, Porus. "Back Up a Thousand Databases Using Enterprise Manager Cloud Control 12c" Technical Article. Jan. 2014. Retrieved from https://www.oracle.com/technical-resources/articles/enterprise-manager/havewala-rman-em12c.html (accessed Aug. 30, 2023).
Hinker, Stefan. "A Patch Train Solution for OCI OS Management" A-Team Chronicles. Jul. 17, 2020. Retrieved from https://www.

(56) References Cited

OTHER PUBLICATIONS ateam-oracle.com/post/a-patch-train-solution-for-oci-os-management (accessed Aug. 30, 2023).
Matijaca, Ante, "Dashboard" Dribbble, published Dec. 21, 2015, retrieved Feb. 11, 2022 from <https://dribbble.com/shots/2417233-Dashboard> (Year: 2015).
Melo, Gilson. "Overview of the Interconnect Between Oracle and Microsoft" Oracle Cloud Infrastructure Blog. Jun. 5, 2019. Retrieved from https://blogs.oracle.com/cloud-infrastructure/post/overview-of-the-interconnect-between-oracle-and-microsoft (accessed Sep. 14, 2023).
Mongodb. "mongo Shell Methods" Reference. Aug. 2019. Retrieved from https://www.mongodb.com/docs/v4.2/reference/method/ (accessed Aug. 30, 2023).
Mongodb. "mongodb" GitHub. Mar. 2015. Retrieved from https://github.com/mongodb/docs/blob/v4.2/source/core/replica-set-priority-0-member.txt (accessed Aug. 30, 2023).
Mongodb. "Priority 0 Replica Set Members" MongoDB Manual. Aug. 2019. Retrieved from https://www.mongodb.com/docs/manual/core/replica-set-priority-0-member/ (accessed Aug. 30, 2023).
Mongodb. "Replica Set Elections" MongoDB Manual. Aug. 2019. Retrieved from https://www.mongodb.com/docs/manual/core/replica-set-elections/ (accessed Aug. 30, 2023).
Mongodb. "Replica Set Members" Replication. Aug. 2019. Retrieved from https://www.mongodb.com/docs/v4.2/core/replica-set-members/#replica-set-secondary-members (accessed Aug. 30, 2023).
Mongodb. "The mongo Shell" MongoDB. Aug. 2019. Retrieved from https://www.mongodb.com/docs/v4.2/mongo/ (accessed Aug. 30, 2023).
Mongodb. "Troubleshoot Replica Sets" MongoDB Manual. Aug. 2019. Retrieved from https://www.mongodb.com/docs/manual/tutorial/troubleshoot-replica-sets/ (accessed Aug. 30, 2023).
Mongodb. "Upgrade a Replica Set to 4.2" Replication. Aug. 2019. Retrieved from https://www.mongodb.com/docs/v4.2/release-notes/4.2-upgrade-replica-set/ (accessed Aug. 30, 2023).
MySQL. "Creating a MySQL Server Deployment" Documentation. Mar. 13, 2017. Retrieved from https://web.archive.org/web/20170313043247/http:/docs.oracle.com/cloud/latest/mysql-cloud/UOMCS/GUID-D03FE523-AD8D-4C53-935C-D5D6513D2A24.htm#GUID-D03FE523-AD8D-4C53-935C-D5D6513D2A24 (accessed Sep. 6, 2023).
Non-Final Office Action on U.S. Appl. No. 17/694,964 DTD Aug. 9, 2023.
Non-Final Office Action on U.S. Appl. No. 17/951,632 DTD Sep. 14, 2023.
Oracle. "About Managed Targets" Enterprise Manager Cloud Control Extensibility Programmer's Guide. May 2014. Retrieved from https://docs.oracle.com/cd/E24628_01/doc.121/e25159/managed_targets.htm#EMPRG140 (accessed Aug. 30, 2023).
Oracle. "Managing Groups" Enterprise Manager Cloud Control Administrator's Guide. Feb. 2016. Retrieved from https://docs.oracle.com/cd/E24628_01/doc. 121/e24473/group_management.htm#EMADM9216 (accessed Aug. 30, 2023).
Oracle. "Update Your Database Homes and Grid Infrastructure via the OCI Web Console on the Exadata Cloud Service" Oracle Database Insider. May 2, 2020. Retrieved from https://blogs.oracle.com/database/post/update-your-database-homes-and-grid-infrastructure-via-the-oci-web-console-on-the-exadata-cloud-service (accessed Aug. 30, 2023).
Oracle. "User Guide" Oracle Cloud Infrastructure. Nov. 26, 2019. Retrieved from https://docs.oracle.com/cd/E97706_01/pdf/ug/OCI_User_Guide.pdf (accessed Aug. 30, 2023).
Oracle. "Using DBMS_Rolling to Perform a Rolling Upgrade" Concepts and Administration. Sep. 2020. Retrieved from https://docs.oracle.com/en/database/oracle/oracle-database/19/sbydb/using-DBMS_ROLLING-to-perform-rolling-upgrade.html#GUID-70C09F5B-90BE-4C8C-96A5-45A52E05D380 (accessed Aug. 30, 2023).
Quest. "Creating custom User-defined Database Groups" Support. Aug. 16, 2017. Retrieved from https://support.quest.com/kb/4229519/creating-custom-user-defined-database-groups (accessed Aug. 30, 2023).
Reinero, Bryan. "Your Ultimate Guide to Rolling Upgrades" MongoDB. May 1, 2018. Retrieved from https://www.mongodb.com/blog/post/your-ultimate-guide-to-rolling-upgrades (accessed Aug. 30, 2023).
Shah, Manish. "Gen 2 Exadata Cloud at Customer New Features: Shared Oracle_Home" Exadata Database Machine. Jun. 2, 2020. Retrieved from https://blogs.oracle.com/exadata/post/gen-2-exadata-cloud-at-customer-new-features-shared-oracle-home (accessed Aug. 30, 2023).
Steven Tom, Idaho National Laboratory, "Recommended Practice for Patch Management of Control Systems", Dec. 2008, Cybersecurity Infrastructure Security Agency (CISA), U.S. Department of Homeland Security. (Year: 2008).
Tudip Digital. "What is Deployment Manager?" Tudip. Jun. 24, 2019. Retrieved from https://tudip.com/blog-post/what-is-deployment-manager/ (accessed Sep. 6, 2023).
Wong, Julie. "OS Management with Oracle Cloud Infrastructure" Oracle Cloud Infrastructure Blog. Mar. 11, 2020. Retrieved from https://blogs.oracle.com/cloud-infrastructure/post/os-management-with-oracle-cloud-infrastructure (accessed Aug. 30, 2023).
YouTube Video screenshots for "Nutanix Era .Next 2019 Demo," YouTube, May 10, 2019, https://www.youtube.com/watch?v=8hbpfrOSw0U [youtube.com].
YouTube Video screenshots for Cloud Advocate. "Google Cloud Deployment Manager—Getting Started" YouTube. Aug. 28, 2020. https://youtu.be/qVKp7W1bfrE [youtube.com].
AWS. "Amazon DocumentDB elastic clusters: how it works" Amazon DocumentDB. Retrieved from https://docs.aws.amazon.com/documentdb/latest/developerguide/elastic-how-it-works.html (accessed Apr. 6, 2023).
AWS. "Amazon EC2 M5 Instances" Amazon DocumentDB. Amazon EC2. Retrieved from https://aws.amazon.com/ec2/instance-types/m5/ (accessed Apr. 6, 2023).
AWS. "Amazon ECS clusters" Amazon Elastic Container Service. Retrieved from https://docs.aws.amazon.com/AmazonECS/latest/developerguide/clusters.html (accessed Apr. 6, 2023).
AWS. "Amazon Virtual Private Cloud" User Guide. Retrieved from https://docs.aws.amazon.com/pdfs/vpc/latest/userguide/vpc-ug.pdf#what-is-amazon-vpc (accessed Apr. 6, 2023).
AWS. "AWS glossary" AWS General Reference Guide. Retrieved from https://docs.aws.amazon.com/general/latest/gr/glos-chap.html (accessed Apr. 6, 2023).
AWS. "Copy a snapshot" Amazon Elastic Compute Cloud. Retrieved from https://docs.aws.amazon.com/AWSEC2/latest/UserGuide/ebs-copy-snapshot.html#ebs-snapshot-copy (accessed Apr. 6, 2023).
AWS. "CopySnapshot" Amazon Elastic Compute Cloud. Retrieved from https://docs.aws.amazon.com/AWSEC2/latest/APIReference/API_CopySnapshot.html (accessed Apr. 6, 2023).
AWS. "CreateDBInstanceReadReplica" Amazon Relational Database Service. Retrieved from https://docs.aws.amazon.com/AmazonRDS/latest/APIReference/API_CreateDBInstanceReadReplica.html (accessed Apr. 25, 2023).
AWS. "Introducing Five New Amazon EC2 Bare Metal Instances" Amazon Web Services. Feb. 13, 2019. Retrieved from https://aws.amazon.com/about-aws/whats-new/2019/02/introducing-five-new-amazon-ec2-bare-metal-instances/ (accessed Apr. 6, 2023).
AWS. "Kubernetes on AWS" Amazon Web Services. Retrieved from https://aws.amazon.com/kubernetes/#:~: text=Kubernetes%20manages%20clusters%20of%20Amazon,premises%20and%20in%20the%20cloud (accessed Apr. 6, 2023).
AWS. "Storage" Amazon Elastic Compute Cloud. Retrieved from https://docs.aws.amazon.com/AWSEC2/latest/WindowsGuide/Storage.html (accessed Apr. 6, 2023).
AWS. "Use EBS direct APIs to access the contents of an EBS snapshot" Amazon Elastic Compute Cloud. Retrieved from https://docs.aws.amazon.com/AWSEC2/latest/UserGuide/ebs-accessing-snapshot.html (accessed Apr. 6, 2023).

(56) References Cited

OTHER PUBLICATIONS

AWS. "User Guide for Linux Instances" Amazon Elastic Compute Cloud. 2023. Retrieved from https://docs.aws.amazon.com/pdfs/AWSEC2/latest/UserGuide/ec2-ug.pdf#ebs-accessing-snapshot (accessed Apr. 6, 2023).

AWS. "What is an Instance in Cloud Computing?" Amazon Web Services. Retrieved from https://aws.amazon.com/what-is/cloud-instances/#:~:text=You%20can%20run%20multiple%20virtual,of%20sharing%20and%20scaling%20resources (accessed Apr. 6, 2023).

AWS. "Working with DB instance read replicas" Amazon Relational Database Service. Retrieved from https://docs.aws.amazon.com/AmazonRDS/latest/UserGuide/USER_ReadRepl.html (accessed Apr. 25, 2023).

AWS. "Working with read replicas for Microsoft SQL Server in Amazon RDS" Amazon Relational Database Service. Retrieved from https://docs.aws.amazon.com/AmazonRDS/latest/UserGuide/SQLServer.ReadReplicas.html (accessed Apr. 25, 2023).

Flexera. "How can I copy an EBS snapshot between different EC2 regions?" Flexera CMP Docs. Retrieved from https://docs.rightscale.com/faq/clouds/aws/How_can_I_copy_an_EBS_snapshot_between_different_E C2_regions.html (accessed Apr. 6, 2023).

Microsoft. "Basic Always on availability groups for a single database" SQL Server. Mar. 3, 2023. Retrieved from https://learn.microsoft.com/en-us/sql/database-engine/availability-groups/windows/basic-availability-groups-always-on-availability-groups?view=sql-server-ver16 (accessed Apr. 25, 2023).

Microsoft. "What is BareMetal Infrastructure on Azure?" BareMetal Infrastructure. Apr. 10, 2023. Retrieved from https://learn.microsoft.com/en-us/azure/baremetal-infrastructure/concepts-baremetal-infrastructure-overview (accessed Apr. 20, 2023).

Notice of Allowance on U.S. Appl. No. 16/805,581 DTD Apr. 3, 2023.

Polovyi, Ivan. "AWS ECSCluster using the EC2 Launch Type" AWS in Plain English. Jul. 25, 2021. Retrieved from https://aws.plainenglish.io/aws-ecs-cluster-using-the-ec2-launch-type-cb5ae2347b46 (accessed Apr. 6, 2023).

Tahir, Saqlain. "Field Notes: SQL Server Deployment Options on AWS Using Amazon EC2" AWS Architecture Blog. Jun. 18, 2021. Retrieved from https://aws.amazon.com/blogs/architecture/field-notes-sql-server-deployment-options-on-aws-using-amazon-ec2/ (accessed Apr. 6, 2023).

Tessell. "Differentiated Infrastructure. Delightful Management." Tessell. Retrieved from https://query.prod.cms.rt.microsoft.com/cms/api/am/binary/RW13XNT (accessed Apr. 6, 2023).

Tessell. "Multi-AZ High Availability for Oracle Standard Edition 2" Tessell. Retrieved from https://query.prod.cms.rt.microsoft.com/cms/api/am/binary/RW13XNV (accessed Apr. 6, 2023).

Tessell. "The Tessell platform provides unparalleled security for your data and users" Tessell. Retrieved from https://query.prod.cms.rt.microsoft.com/cms/api/am/binary/RW13XNU (accessed Apr. 6, 2023).

\* cited by examiner

SYSTEM AND METHOD FOR BACKING UP HIGHLY AVAILABLE SOURCE DATABASES IN A HYPERCONVERGED SYSTEM

CROSS-REFERENCE TO RELATED PATENT APPLICATIONS

This application is a continuation of U.S. patent application Ser. No. 17/182,511, filed Feb. 23, 2021, which claims the benefit and priority to U.S. Provisional Patent Application No. 63/094,245, filed Oct. 20, 2020, both of which are incorporated herein by reference in their entireties.

BACKGROUND

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present day virtual computing systems have limitations due to their configuration and the way they operate.

SUMMARY

In accordance with some aspects of the present disclosure, a system is disclosed. The system includes system includes a plurality of nodes distributed between a first cluster and a second cluster, each of the plurality of nodes storing a copy of a source database, and a processor executing computer-readable instructions stored on a memory to designate a first node of the plurality of nodes as a primary node, designate remaining ones of the plurality of nodes as secondary nodes to take over from the primary node upon failure of the primary node, designate a second node of the plurality of nodes as an initial active node, backup the source database from the initial active node, automatically designate, based on a switch over policy, a third node of the plurality of nodes as a next active node upon the initial active node becoming unavailable, and continue backups of the source database from the next active node upon the initial active node becoming unavailable.

In accordance with some other aspects of the present disclosure, a non-transitory computer-readable media having computer readable instructions stored thereon is disclosed. The computer readable instructions when executed by a processor causes the processor to designate a first node of a plurality of nodes as a primary node. The plurality of nodes are distributed between a first cluster and a second cluster, and each of the plurality of nodes stores a copy of a source database. The processor further executes the computer-readable instructions to designate remaining ones of the plurality of nodes as secondary nodes to take over from the primary node upon failure of the primary node, designate a second node of the plurality of nodes as an initial active node, backup the source database from the initial active node, automatically designate, based on a switch over policy, a third node of the plurality of nodes as a next active node upon the initial active node becoming unavailable, and continue backups of the source database from the next active node upon the initial active node becoming unavailable.

In accordance with yet other aspects of the present disclosure, a method is disclosed. The method includes designating, by a processor executing computer-readable instructions stored on a memory, a first node of a plurality of nodes as a primary node. The plurality of nodes are distributed between a first cluster and a second cluster, and each of the plurality of nodes stores a copy of a source database. The method also includes designating, by the processor, remaining ones of the plurality of nodes as secondary nodes to take over from the primary node upon failure of the primary node, designating, by the processor, a second node of the plurality of nodes as an initial active node, backing up, by the processor, the source database from the initial active node, automatically designating, by the processor, based on a switch over policy, a third node of the plurality of nodes as a next active node upon the initial active node becoming unavailable, and continuing backups, by the processor, of the source database from the next active node upon the initial active node becoming unavailable.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
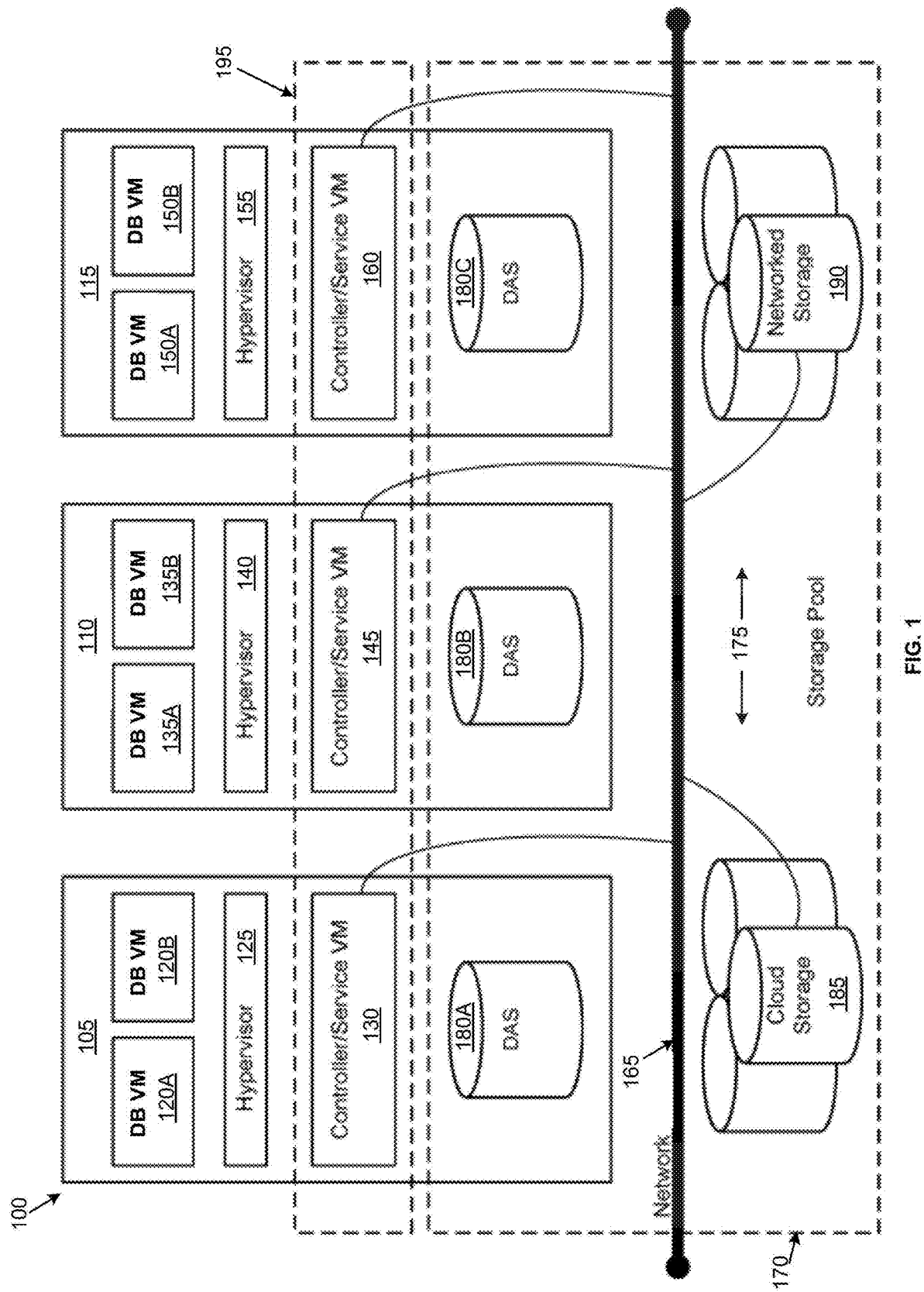
FIG. 1 is an example block diagram of a cluster of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a hyperconverged virtual computing system having a plurality of clusters, with each of the plurality of clusters having a plurality of nodes. Each of the plurality of nodes includes one or more virtual machines and other entities managed by an instance of a monitor such as a hypervisor. These and other components may be part of a datacenter, which may be managed by a user (e.g., an administrator or other authorized personnel). A distributed storage system, for providing storage and protection capabilities, is associated with and shared by each of the plurality of clusters in the virtual computing system. The virtual computing system may include a database management system configured for providing database management services. Database management services may involve management of databases stored within the virtual computing system. For example, at least some of the one or more virtual machines within the virtual computing system may be configured as database virtual machines that store one or more databases. These databases may be managed by the database management system. One example database management service provided by the database management system may include copy data management services.

Copy data management services involve protecting a database. Protecting a database means replicating a state of the database to enable creating a fully functional copy of the database, as well as restoring a database from the replicated state of the database. Such a fully functional copy of the database may be considered a clone of the database or a cloned database. The database from which the cloned database is created may be considered an original or source or production database. Since the cloned databases are fully functional copies of the source database, a user may perform operations (e.g., read, write, etc.) on the cloned database that may otherwise be performed on the source database. In some embodiments, a cloned database may be used for purposes other than what the source database is used for. For example, in some embodiments, a cloned database may be used for reporting, auditing, testing, data analysis, etc., while the production database may be used for performing normal day-to-day operations. In some embodiments, a cloned database may have masked data. In other words, the cloned database may be a point in time copy of the production database and may include data from the production database at that point in time. Not all data of the production database may be made available on the cloned database.

Protecting a database may also include restoring a source or original or production database. In some embodiments, the production database may become corrupted (e.g., bad data). Restoring the production database may involve fixing the corruption by using the replicated state of the production database.

To enable creation of a cloned or restored database, copy data management services provide for periodically capturing snapshots of the source database. In other words, a cloned database may be created from a snapshot captured from the source database. A snapshot stores the state of the source database at the point in time at which the snapshot is captured. The snapshot is thus a point in time image of the source database. The snapshot may include a complete encapsulation of the virtual machine on which the source database is stored, including the configuration data of the virtual machine, the user data stored within the database, and any metadata associated with the virtual machine/source database. Any of a variety of snapshotting techniques may be used. For example, in some embodiments, copy-on-write, redirect-on-write, near-sync, or other snapshotting methods may be used to capture snapshots. From the snapshot, the source database may be recreated as the cloned database to the state at which the snapshot was captured.

However, the number of snapshots that are captured on a given day may be limited. Specifically, because capturing a snapshot requires quiescing (e.g., pausing) the source database and entering a safe mode in which user operations are halted, it is desirable to take only a few snapshots a day. Thus, choices of state that may be recreated from a snapshot may be limited. If a state is desired that falls between the capture of two snapshots, the user is generally out of luck. Thus, the desire to limit the number of snapshots in a day results in a significant technical problem that results in losing changes made to the source database since the last snapshot capture or between two snapshot captures.

To avoid losing changes in state between two snapshot captures or since the last snapshot capture, the database management system may capture transactional logs. A transactional log may be a text, image, disk, or other type of file that records every transaction or change that occurs on the source database since a last snapshot capture. Thus, by using the snapshots or a combination of snapshots and transactional logs, any state of the source database down to the last second (or even fractions of seconds or other time granularities) may be recreated. Specifically, states of the source database that fall between the capture of two snapshots may be recreated by using a combination of snapshots and transactional logs.

As indicated above, snapshots of a source database may be captured by creating a snapshot of the source database virtual machine (e.g., database server) and a snapshot of the source database itself. Thus, a snapshot may be an image/copy of the location of the storage files associated with the virtual disks of the source database and an image/copy of the location of the configuration files associated with the source database virtual machine. The virtual disk(s) on which the source database is stored may be composed of or divided into one or more memory blocks. The snapshot may capture images or copies of the memory blocks. A copy of the memory blocks may be made by identifying the memory pointer (e.g., location) assigned to each memory block and copying the memory pointer to a repository. During a first snapshot of the memory blocks, the contents of all the memory blocks may be copied. After the first snapshot is captured, transactional logs may be captured to record all transactions or changes in the memory blocks of the source database after the capture of the first snapshot and before the capture of a second snapshot. Capturing a transactional log may be referred to herein as a log catch up operation.

The frequency of capturing transactional logs may be higher than the frequency of capturing snapshots in a day. For example, in some embodiments, by default, a transactional log may be captured every 30 minutes. In other embodiments, the user may define the frequency of capturing transactional logs. Further, since the source database is not quiesced (paused) for capturing the transactional log, user operations may continue while the transactional logs are being captured. Further, since the transactional logs only capture the changes in the database since the last snapshot capture, the transactional logs do not consume a lot of space. Thus, cloned databases of the source database may be created to a point in time by using a combination of transactional logs and snapshots (e.g., between two snapshot captures), or based upon available snapshots (e.g., at the point of snapshot capture). Capturing snapshots and/or transactional logs are collectively referred to herein as taking "backups." In other words, creating or taking a "backup" of a source database means capturing one or more snapshots and/or one or more transactional logs of the source database. From the "backup" or "backups," one or more cloned databases of the source database may be created.

Further, the frequency with which the snapshots and transactional logs are captured may depend upon the level of protection desired by the user for a particular source database. The database management system may solicit a protection schedule and definition of a Service Level Agreement ("SLA") from the user for each source database. The protection schedule may allow the user to define the frequency of capturing snapshots and transactional logs based upon the SLA. Upon defining the protection schedule and the SLA, backups of the source database may be automatically created and stored within the virtual computing system without further input from the user. For convenience, the database management system may include built-in defaults of the protections schedule and SLA levels that the user may select from. The user may modify the defaults or define new parameters for the protection schedule and SLA. By virtue of defining a protection schedule and SLA for each source database, the level of protection accorded to each source database may be individually tailored based upon the requirements of the user.

Further, in some cases, the source database may be stored on a single node of a cluster of the virtual computing system. Such a source database may be considered a "single instance" source database. If the node on which the source database is hosted becomes unavailable (e.g., fails), access to the source database may be hindered until the node recovers and becomes available again. Further, if the node on which the source database is hosted becomes unavailable, backups may not be created of that source database until the node becomes available again. To avoid or prevent such single-point failures, in some embodiments, a "highly available" source database may be desirable. High availability of a source database may be obtained by maintaining redundant instances or copies of the source database in the virtual computing system. Such redundant instances or copies of the source database are not considered "cloned" databases. Rather, each redundant instance or copy of a source database is also a source database. From each of these redundant instances or copies, one or more cloned databases may be created.

In some embodiments, the redundant instances or copies of the source database may be stored on separate nodes of the virtual computing system to create a highly available source database. By virtue of storing the redundant instances or copies of the source database on different nodes, if one node becomes unavailable, the source database may be accessed from another node, thereby ensuring continuity of operation. In some embodiments, a user may define how many redundant instances or copies of the source database are desired. To further ensure continuity of operation, the redundant instances or copies of the source database need to be protected. However, protecting a highly available source database is more complicated than protecting a single instance source database. In some embodiments, to protect a highly available source database, backups may be created from each of the redundant instances or copies of the source database.

However, since each redundant instance or copy of the source database is same or substantially similar, creating such multiple backups of the same source databases may be redundant, consume a lot of system resources, require a lot of space to store, may be costly to implement, and therefore, generally undesirable. To avoid such redundancy, in some embodiments, backups may be created from one copy of the source database. However, if the node from which the backups are being created becomes unavailable, the creation of backups is halted and the source database is left without any protection. Thus, technical problems exist in protecting highly available source databases in an efficient and reliable manner.

Further, in some embodiments, user intervention may be required to enable capturing of backups. For example, in some embodiments, a user may be required to manually designate a node from which the backups are to be captured. When the node from which backups are being created becomes unavailable, the user may be required to again manually designate another node from which to capture the backups. Thus, in some embodiments, the reliability of protection of a highly available source database is contingent upon the diligence of a user in monitoring all copies of the source databases, monitoring the node from which backups are being created, and designating a new node from which to capture backups from. Alternatively, the user may capture backups from all nodes on which a copy of the source database exists to avoid the monitoring and the designating operations. However, as discussed above, capturing backups from all or multiple nodes is inefficient, wasteful, and undesirable.

Problems with protecting source databases may be compounded if the various nodes on which the copies of the source databases are stored are spread across different clusters of the virtual computing system. Specifically, when the copies of the source database are spread across multiple clusters, the database management system needs a way to keep track of the multiple clusters, which further increases the complexity of the database management system.

The present disclosure provides technical solutions to protecting a highly available source database regardless of whether the copies of the source database are spread across various nodes of a single cluster or multiple clusters. The present disclosure also provides a mechanism to protect a source database in a highly available system by designating one node as an active node. A database controller of the database management system of the present disclosure facilitates capturing backups from the active node. When the active node becomes unavailable, the database controller automatically selects another node as the active node and automatically starts capturing backups from the newly selected active node, thereby requiring no user intervention. The selection of the new active node may be based upon a user defined switch over policy. Thus, the present disclosure provides a technique to effectively, reliably, and conveniently protect a highly available source database.

Referring now to FIG. 1, a cluster 100 of a virtual computing system in a hyperconverged system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes database virtual machines ("database VMs") 120A and 120B (collectively referred to herein as "database VMs 120"), a hypervisor 125 configured to create and run the database VMs, and a controller/service VM 130 configured to manage, route, and otherwise handle workflow requests between the various nodes of the cluster 100. Similarly, the second node 110 includes database VMs 135A and 135B (collectively referred to herein as "database VMs 135"), a hypervisor 140, and a controller/service VM 145, and the third node 115 includes database VMs 150A and 150B (collectively referred to herein as "database VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container engine).

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two database VMs (e.g., the database VMs 120, the database VMs 135, the database VMs 150) are shown on each of the first node 105, the second node 110, and the third node 115, in other embodiments, the number of the database VMs on each of the first, second, and third nodes may vary to include other numbers of database VMs. Further, the first node 105, the second node 110, and the third node 115 may have the same number of database VMs (e.g., the database VMs 120, the database VMs 135, the database VMs 150) or different number of database VMs.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processing units may execute instructions without first copying the instructions to the RAM. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the database VMs 120, the database VMs 135, and the database VMs 150.

Each of the database VMs 120, the database VMs 135, the database VMs 150 is a software-based implementation of a computing machine. The database VMs 120, the database VMs 135, the database VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the database VMs 120, the database VMs 135, the database VMs 150 that may run its own operating system and applications on the underlying physical resources just like a real computer. By encapsulating an entire machine, including CPU, memory, operating system, storage devices, and network devices, the database VMs 120, the database VMs 135, the database VMs 150 are compatible with most standard operating systems (e.g. Windows, Linux, etc.), applications, and device drivers. In some embodiments, one or more of the database VMs 120, the database VMs 135, the database VMs 150 maybe configured to host one or more databases. In some embodiments, one or more of the database VMs 120, the database VMs 135, the database VMs 150 may also be configured to host workloads other than or in addition to databases.

Each of the hypervisor 125, the hypervisor 140, and the hypervisor 155 is a virtual machine monitor that allows a single physical server computer (e.g., the first node 105, the second node 110, third node 115) to run multiple instances of the database VMs 120, the database VMs 135, and the database VMs 150 with each VM sharing the resources of that one physical server computer, potentially across multiple environments. For example, each of the hypervisor 125, the hypervisor 140, and the hypervisor 155 may allocate memory and other resources to the underlying VMs (e.g., the database VMs 120, the database VMs 135, the database VMs 150A, and the database VMs 150B) from the storage pool 170 to perform one or more functions.

By running the database VMs 120, the database VMs 135, and the database VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new database VMs are created (e.g., installed) on the first node 105, the second node 110, and the third node 115, each of the new database VMs may be configured to be associated with certain hardware resources, software resources, storage resources, and other resources within the cluster 100 to allow those virtual VMs to operate as intended.

The database VMs 120, the database VMs 135, the database VMs 150, and any newly created instances of the database VMs may be controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the database VMs 120, the database VMs 135, and the database VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the database VMs 120, the database VMs 135, the database VMs 150A, and the database VMs 150B, respectively, and for managing the interactions between those VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular database VM (e.g., the database VMs 120, the database VMs 135, or the database VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
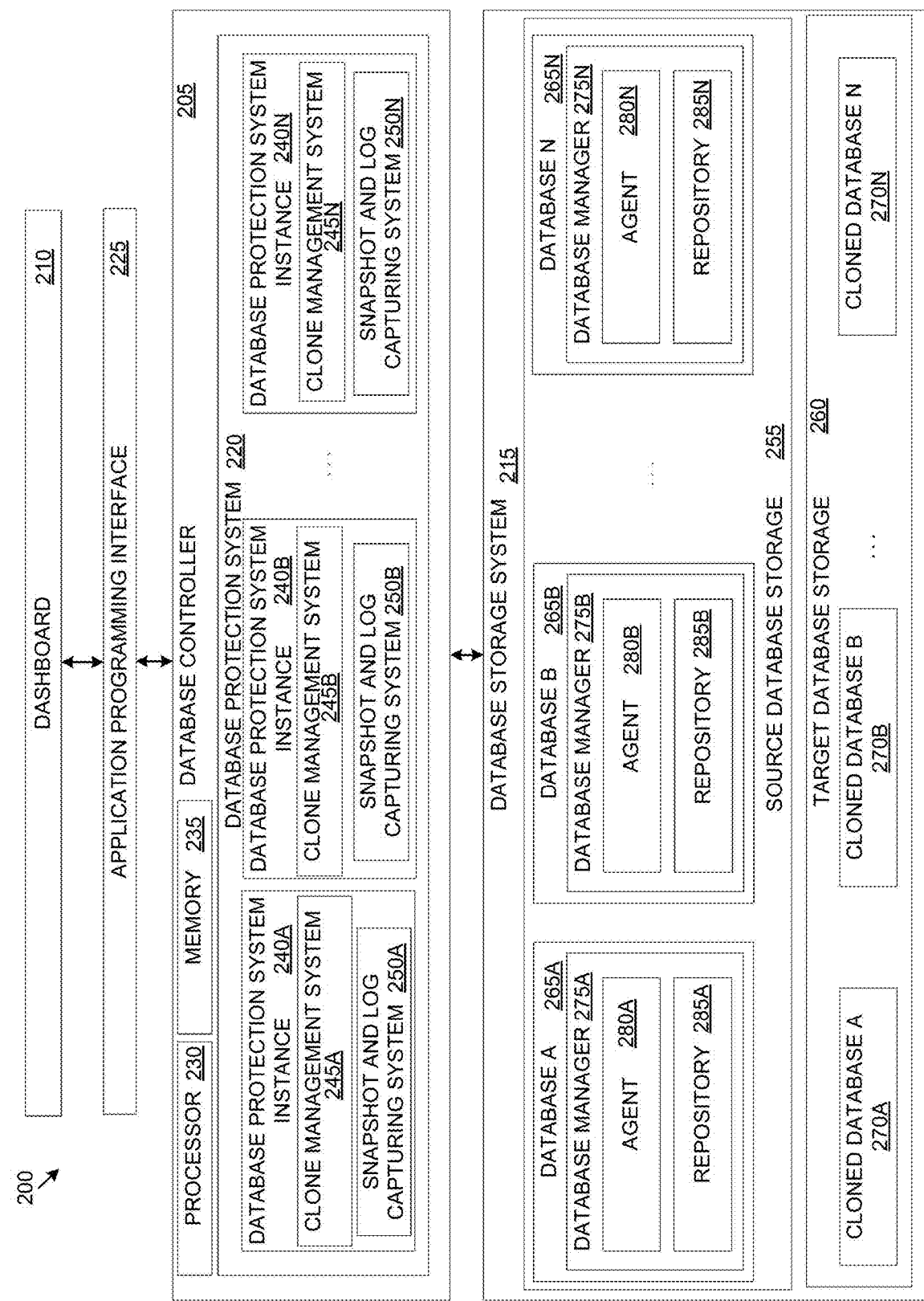
FIG. 2 is an example block diagram of a database management system of the virtual computing system of FIG. 1, in accordance with some embodiments of the present disclosure.

Referring now to FIG. 2, an example block diagram of a database management system 200 is shown, in accordance with some embodiments of the present disclosure. FIG. 2 is discussed in conjunction with FIG. 1. The database management system 200 or portions thereof may be configured as utility software for creating and implementing database management services. The database management system 200 may be configured to facilitate, among other things, protection of the databases associated therewith. The various elements of the database management system 200 described below may be part of a single cluster (e.g., the cluster 100) or may span across multiple clusters of a virtual computing system. When part of a single cluster, the various elements discussed below may be associated with one or more nodes of the single cluster. When part of multiple clusters, in some embodiments, some elements of the database management system 200 may be located on one or more nodes of one cluster, while other elements may be located on one or more nodes of at least one other cluster.

The database management system 200 includes a database controller 205 (e.g., also referred to herein as Era server) that is configured to receive input from and provide output to a user via a dashboard 210. The database controller 205 is also associated with a database storage system 215 that is configured to store one or more databases (e.g., customer databases) under management of the database management system 200. In association with the dashboard 210 and the database storage system 215, the database controller 205 is configured to implement one or more database management services of the database management system 200. For example, the database controller 205 is configured to provide copy data management services, or in other words, services to protect databases provisioned (e.g., created or registered) by the database management system 200. Thus, the database controller 205 may include a database protection system 220 to protect the databases of the database management system 200. In some embodiments, the database controller 205 may be located on one cluster and may be configured to provide copy data management services to databases stored on the same cluster as the database controller and/or to databases located on other clusters as well.

The database management system 200 may be installed on a database VM (e.g., the database VMs 120, the database VMs 135, the database VMs 150 of FIG. 1). The database management system 200 may be installed via the controller/service VM (e.g., the controller/service VM 130, the controller/service VM 145, the controller/service VM 160) of the node (e.g., the first node 105, the second node 110, and the third node 115) on which the database management system is to be installed. For example, an administrator desiring to install the database management system 200 may download a copy on write image file (e.g., qcow or qcow2 image file) on the controller/service VM to define the content and structure of a disk volume to be associated with the database management system. In some embodiments, instead of a copy on write image file, another type of disk image file, depending upon the type of underlying hypervisor, may be installed. Further, the administrator may create or one or more new database VMs on which the database management system 200 is to reside. As part of creating the database VMs, the administrator may allocate a particular number of virtual central processing units (vCPU) to each of the database VMs, define the number of cores that are desired in each vCPU, designate a specific amount of memory to each of the database VMs, and attach a database storage device (e.g., a virtual disk from the storage pool 170) with each of the database VMs. In some embodiments, at least a portion of the database storage device attached to the database management system 200 may form the database storage system 215. The administrator may also create a new network interface (e.g., associate a virtual local area network (VLAN), assign an Internet Protocol ("IP") address to access the database management system 200, etc.) with each of the database VMs. The administrator may perform additional and/or other actions to create the database VMs on which the database management system 200 resides upon creation and installation of the disk image file.

In some embodiments, the database VMs on which the database management system 200 resides may all be located on a single node (e.g., one of the first node 105, the second node 110, and the third node 115). In other embodiments, the database VMs on which the database management system 200 resides may be spread across multiple nodes within a single cluster, or possibly amongst multiple clusters. When spread across multiple clusters, each of the associated multiple clusters may be configured to at least indirectly communicate with one another to facilitate operation of the database management system 200. Upon installing the database management system 200, a user (e.g., the administrator or other user authorized to access the database management system) may access the dashboard 210. The dashboard 210, thus, forms the front end of the database management system 200 and the database controller 205 and the database storage system 215 form the backend of the database management system.

The database management system 200 may be accessed via a computing device associated with the cluster 100. In other embodiments, instead of or in addition to being accessible via a particular computing device, the database management system 200 may be hosted on a cloud service and may be accessed via the cloud. In some embodiments, the database management system 200 may additionally or alternatively be configured as a mobile application suitable for access from a mobile computing device (e.g., a mobile phone). In some embodiments, the database management system 200 and particularly the dashboard 210 may be accessed via an Application Programming Interface ("API") 225. To access the dashboard 210 via the API 225, a user may use designated devices such as laptops, desktops, tablets, mobile devices, other handheld or portable devices, and/or other types of computing devices that are configured to access the API. These devices may be different from the computing device on which the database management system 200 is installed.

In some embodiments and when the dashboard 210 is configured for access via the API 225, the user may access the dashboard via a web browser and upon entering a uniform resource locator ("URL") for the API such as the IP address of the database management system 200 or other web address. Using the API 225 and the dashboard 210, the users may then send instructions to the database controller 205 and receive information back from the database controller. In some embodiments, the API 225 may be a representational state transfer ("REST") type of API. In other embodiments, the API 225 may be any other type of web or other type of API (e.g., ASP.NET) built using any of a variety of technologies, such as Java, .Net, etc., that is capable of accessing the database controller 205 and facilitating communication between the users and the database controller. In some embodiments, the API 225 may be configured to facilitate communication via a hypertext transfer protocol ("HTTP") or hypertext transfer protocol secure ("HTTPS") type request. The API 225 may receive an HTTP/HTTPS request and send an HTTP/HTTPS response back. In other embodiments, the API 225 may be configured to facilitate communication using other or additional types of communication protocols. In other embodiments, the database management system 200 may be configured for access in other ways.

The dashboard 210 provides a user interface that facilitates human-computer interaction between the users and the database controller 205. The dashboard 210 is configured to receive user inputs from the users via a graphical user interface ("GUI") and transmit those user inputs to the database controller 205. The dashboard 210 is also configured to receive outputs/information from the database controller 205 and present those outputs/information to the users via the GUI of the management system. The GUI may present a variety of graphical icons, windows, visual indicators, menus, visual widgets, and other indicia to facilitate user interaction. In other embodiments, the dashboard 210 may be configured as other types of user interfaces, including for example, text-based user interfaces and other man-machine interfaces. Thus, the dashboard 210 may be configured in a variety of ways.

Further, the dashboard 210 may be configured to receive user inputs in a variety of ways. For example, the dashboard 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the database management system 200. The dashboard 210 may also be configured to present outputs/information to the users in a variety of ways. For example, the dashboard 210 may be configured to present information to external systems such as users, memory, printers, speakers, etc. Therefore, although not shown, dashboard 210 may be associated with a variety of hardware, software, firmware components, or combinations thereof. Generally speaking, the dashboard 210 may be associated with any type of hardware, software, and/or firmware component that enables the database controller 205 to perform the functions described herein.

Thus, the dashboard receives a user request (e.g., an input) from the user and transmits that user request to the database controller 205. In some embodiments, the user request may be to request a database management service. For example, in some embodiments, the user request may be to request a copy data management service. In response to the user request for a copy data management service, the database controller 205 may activate the database protection system 220. The database protection system 220 is configured to protect databases associated with the database management system 200. Thus, the database protection system 220 implements a copy data management service of the database management system 200. During provisioning of a database with the database management system 200, an instance of the database protection system 220 is created for the database. In some embodiments, the database protection system 220 is referred to as a "time machine" and provides a mechanism to achieve/facilitate copy data management services. In particular, in some embodiments, the "time machine" takes automated database backups (e.g., snapshots, transactional logs) for creating clones of these databases (e.g., from the backups) for various purposes like testing, staging, etc.

Thus, upon provisioning of a database with the database management system 200, that database may be protected by the associated instance of the database protection system 220 by automatically creating backups of the database, as well for facilitating creation of cloned databases using the backups. Each instance of the database protection system 220 may receive a variety of user defined constraints in accordance with which the associated database is protected. The database protection system 220 is discussed in greater detail below.

The database controller 205, including the database protection system 220, may be configured as, and/or operate in association with, hardware, software, firmware, or a combination thereof. Specifically, the database controller 205 may include a processor 230 configured to execute instructions for implementing the database management services of the database management system 200. In some embodiments, the database protection system 22 may have its own separate instance of the processor 230. The processor 230 may be implemented in hardware, firmware, software, or any combination thereof "Executing an instruction" means that the processor 230 performs the operations called for by that instruction. The processor 230 may retrieve a set of instructions from a memory for execution. For example, in some embodiments, the processor 230 may retrieve the instructions from a permanent memory device like a read only memory (ROM) device and copy the instructions in an executable form to a temporary memory device that is generally some form of random access memory (RAM). The ROM and RAM may both be part of the storage pool 170 and/or provisioned separately from the storage pool. In some embodiments, the processor 230 may be configured to execute instructions without first copying those instructions to the RAM. The processor 230 may be a special purpose computer, and include logic circuits, hardware circuits, etc. to carry out the instructions. The processor 230 may include a single stand-alone processing unit, or a plurality of processing units that use the same or different processing technology. The instructions may be written using one or more programming language, scripting language, assembly language, etc.

The database controller 205 also includes a memory 235. The memory 235 may be provisioned from or be associated with the storage pool 170. In some embodiments, the memory 235 may be separate from the storage pool 170. The memory 235 may be any of a variety of volatile and/or non-volatile memories that may be considered suitable for use with the database controller 205. In some embodiments, the memory 235 may be configured to store the instructions that are used by the processor 230. Further, although not shown, in some embodiments, the database protection system 220 may, additionally or alternatively, have its own dedicated memory.

Further, the database controller 205 may be configured to handle a variety of types of database engines. For example, in some embodiments, the database controller 205 may be configured to manage PostgreSQL, Oracle, Microsoft SQL server, and MySQL database engines. In other embodiments, the database controller 205 may be configured to manage other or additional database engines. Each database that is provisioned with the database management system 200 may be of a particular "database engine." The database engine may identify the type of database management system (e.g., Oracle, PostgreSQL, etc.) of a particular database. By virtue of provisioning a database with a particular database engine, that database is managed in accordance with the rules of that database engine. Thus, the database controller 205 is configured to be operable with and manage databases associated with a variety of database engines.

It is to be understood that only some components of the database controller 205 are shown and discussed herein. In other embodiments, the database controller 205 may also include other components that are considered necessary or desirable in implementing the copy data management services discussed herein.

Referring still to FIG. 2, as discussed above, an instance of the database protection system 220 is created for each database when that database is provisioned within the database management system 200. Thus, the database protection system 220 may include multiple instances of the database protection system—one for each database that is provisioned. For example, the database protection system 220 may include database protection system instances 240A-240N (collectively referred to herein as database protection system instances 240). In other embodiments, each instance of the database protection system (e.g., the database protection system instances 240A-240N) may be configured to protect more than one database. Each of the database protection system instances 240A-240N may respectively include a clone management system 245A-245N (collectively referred to herein as clone management systems 245) and a snapshot/log capturing system 250A-250N (collectively referred to herein as snapshot/log capturing systems 250).

Each of the database protection system instances 240 may be associated with a "source database" stored within a source database storage 255. The source database storage 255 is configured to store the original instances of the databases (also referred to herein as source databases) that are provisioned within the database management system 200. The database storage system 215 may also include a target database storage 260. The target database storage 260 is configured to store the clones of the source databases (also referred to herein as cloned databases). In some embodiments, the source database storage 255 and the target database storage 260 may be provisioned from the storage pool 170 and may include virtual disk storage that is associated with the database VMs (e.g., the database VMs 120, the database VMs 135, the database VMs 150) on which the database management system 200, the source databases, and the cloned databases reside. For example, in some embodiments, the source database storage 255 may be associated with one or more database VMs (referred to herein as source database VMs or database servers) and the source databases stored within the source database storage may be stored within the virtual disks associated with the source database VMs. Similarly, in some embodiments, the target database storage 260 may be associated with one or more database VMs (referred to herein as target database VMs) and the databases stored within the target database storage may be stored within the virtual disks associated with the target database VMs. In some embodiments, each source database VM may be configured to store one or more source databases and each target database VM may be configured to store one or more target databases. In other embodiments, the source database storage 255 and the target database storage 260 may additionally or alternatively be provisioned from other types of storage associated with the database management system 200.

Further, depending upon the size of a particular database and the size of the virtual disk associated with a particular source database VM, a source database may be stored in its entirety on a single source database VM or may span multiple source database VMs on the same node, different nodes of the same cluster, and/or node(s) of another cluster. Further, as the size of that source database increases, the source database may be moved to another source database VM, may be stored onto multiple source database VMs, and/or additional storage may be provisioned to the source database VMs to house the increased size of the source database. Similarly, depending upon the size of a cloned database and the size of the virtual disk associated with a particular target database VM, the cloned database may be stored on a single or multiple target database VMs on the same node, different nodes of the same cluster, and/or on different clusters. Further, as the size of the cloned database increases (e.g., by virtue of updating the cloned database to incorporate any changes in the source database), the cloned database may be moved to another target database VM of appropriate size, may be divided amongst multiple target database VMs, and/or additional virtual disk space may be provisioned to the target database VM. Thus, the database storage system 215 is structured with the flexibility to expand and adapt to accommodate databases of various sizes.

Additionally, as indicated above, each of the database protection system instances 240 may be associated with a source database stored within the source database storage 255. For example, the database protection system instance 240A may be associated with a source database 265A stored within the source database storage 255, the database protection system instance 240B may be associated with a source database 265B of the source database storage, the database protection system instance 240N may be associated with a source database 265N, and so on. Thus, the clone management system 245A and the snapshot/log capturing system 250A of the database protection system instance 240A may be configured to protect the source database 265A, the clone management system 245B and the snapshot/log capturing system 250B may be configured to protect the source database 265B, the clone management system 245N and the snapshot/log capturing system 250N may be configured to protect the source database 265N, and so on. By virtue of having the database protection system instances 240 for each of the source databases 265A-265N (collectively referred to herein as the source databases 265), the protection of each of those databases may be customized and tailored to suit the user's needs.

To protect the source databases 265, the database protection system instances 240 may take snapshots and transactional logs to allow creating clones of those source databases. The clones of the source databases 265 (e.g., cloned databases) may be stored within the target database storage 260. For each source database (e.g., the source databases 265) that is stored within the source database storage 255, one or more clones of that source database may be created and stored within the target database storage 260. For example, when a clone of the source database 265A is created, a cloned database 270A is created and stored within the target database storage 260. Similarly, clones of the source databases 265B and 265N may be created as cloned databases 270B and 270N, respectively, and stored within the target database storage 260. The cloned databases 270A-270N are collectively referred to herein as the cloned databases 270. Although each of the source databases 265 in the source database storage 255 has been shown as having a corresponding instance of the cloned databases 270 in the target database storage 260, it is to be understood that in some embodiments, clones of only some of the source databases stored in the source database storage may be made. The source databases 265 that have not been cloned may not have a cloned database within the target database storage 260.

Further, similar to the source databases 265, which reside on a database VM (e.g., the source database VMs or database servers), the cloned databases 270 also reside on a database VM. The database VMs on which the cloned databases 270 reside are referred to herein as target database VM. Each of the cloned databases 270 may reside entirely on one target database VM or may span across multiple target database VMs on a single cluster or multiple clusters. In some embodiments, the source database VMs and the target database VMs may be created on the same node or different nodes of the same cluster or across multiple clusters.

Thus, the database protection system instances 240, and particularly the clone management systems 245 of the database protection system instances creates the cloned databases 270 from the source databases 265 stored within the source database storage 255, and stores the cloned databases within the target database storage 260. The cloned databases 270 may be of a variety of types. Each of the source databases 265 is created or registered on a source database VM. Thus, each of the cloned databases 270 may include a clone of the source database VM only (e.g., to create the target database VM) and/or may include the clone of the source database VM plus the database that resides on that source database VM. When both the source database VM and the source database 265A are cloned, the cloned database 270A may include a target database VM created on the target database storage 260 with a similar or different configuration as the source database VM and the clone of the source database may be stored on the target database VM. When only the source database VM is cloned, a target database VM may be created for that source database VM and stored on the target database storage 260. The target database VM may be used at a later point to store the clone of the source database that resides on the associated source database VM. Thus, the cloned databases 270 may include the source database VM only, the source database VM plus the source database, or the source database only (which is to be stored on a previously created target database VM).

The cloned databases 270 may be considered operationally same (or substantially similar) to the source databases 265. Each of the cloned databases 270 may be refreshed/updated to incorporate any changes that may have occurred in the source databases 265 since the cloned databases were created. In some embodiments, the operations that are performed on the source databases 265 may be performed on the cloned databases 270 as well. Thus, in some embodiments, instead of using the source databases 265, the cloned databases 270 may be used for performing operations (e.g., analyzing data). The cloned databases 270 may be created from snapshots and transactional logs captured from the source databases 265. The cloned databases 270 may be created upon receiving a user request. The user may request to clone a particular one of the source databases 265 to a point in time or to a specific snapshot. For example, the user may request a cloned database of a particular one of the source databases 265 as that source database existed at 11:00 AM on a particular date. Alternatively, the user may specifically identify a snapshot and request a cloned database of the source databases 265 based on that snapshot. Creating a cloned database (e.g., the cloned databases 270) involves replicating a state of the source databases 265. The "state" of the source databases 265 may include the configuration of the source database, the user data stored within the source database, metadata stored within the source database, and any other information associated with the source database. In other words, a cloned database may be an exact or substantially exact copy of the source database.

Thus, upon receiving a user request to create a cloned database (e.g., the cloned database 270A) from a source database (e.g., the source database 265A), the clone management system (e.g., the clone management system 245A) associated with the source database may retrieve snapshots and transactional logs of the source database from a repository where the snapshots and transactional logs are stored. If the user request is to clone the source database to a point in time, the clone management system (e.g., the clone management system 245A) may retrieve all snapshots and transactional logs captured of the source database at that point in time (or up to that point in time) and create a cloned database (e.g., the cloned database 270A) from those snapshots and transactional logs. The cloned database (e.g., the cloned database 270A) represents the state of the source database at the requested point in time. If the user request is to clone the source database based on a particular available snapshot, the clone management system (e.g., the clone management system 245A) may retrieve that particular snapshot and create a cloned database (e.g., the cloned database 270A) from that particular snapshot. The cloned database (e.g., the cloned database 270A) represents the state of the source database (e.g., the source database 265A) at the time the requested snapshot was captured. Thus, the clone management systems 245 are configured to create the cloned databases 270. The clone management systems 245 may also be configured to refresh the cloned databases 270, as well as manage/perform any operations performed on the cloned databases.

To be able to create the cloned databases 270, snapshots and transactional logs or backups are needed of the source databases 265. The snapshots and transactional logs may be captured via the snapshot/log capturing systems 250. The snapshot/log capturing systems 250 may be configured with a protection schedule in accordance with an SLA defined by the user when the source databases 265 are provisioned with the database management system 200. The protection schedule defines, among other things, the frequency of capturing snapshots and transactional logs each day. Thus, based upon the protection schedule, the snapshot/log capturing systems 250 may capture snapshots and transactional logs automatically. Specifically, in some embodiments, an instance of a database manager may be associated with each source database that is provisioned within the source database storage 255. For example, the source database 265A may be associated with a database manager 275A, the source database 265B may be associated with a data manager 275B, and the source database 265N may be associated with a database manager 275N. The database managers 275A-275N are collectively referred to herein as database managers 275. In other embodiments, a single instance of the database manager 275 may manage multiple or all source databases. Although not shown, in some embodiments, the cloned databases 270 may each be associated with a database manager as well.

Although not shown, one or more of the database managers 275 may include a processing unit (e.g., similar to the processor 230), a memory (e.g., similar to the memory 235), and other hardware, software, and/or firmware components that are necessary or considered desirable for performing the functions described herein. The database managers 275 may be configured to capture the snapshots and the transactional logs upon instruction from the snapshot/log capturing systems 250. The database managers 275 may include an agent that captures the snapshots and the transactional logs based on the protection schedule received from the snapshot/log capturing systems 250. Thus, the database manager 275A may include an agent 280A, the database manager 275B may include an agent 280B, and the database manager 275N may include an agent 280N. The agents 280A-280N are collectively referred to herein as agents 280. Each of the agents 280 is an autonomous software program that is configured for performing one or more specific and approved operations. For example, each of the agents 280 may be configured to capture snapshots and transactional logs based upon the protection schedule, and store the captured snapshots and transactional logs in a repository associated therewith. The clone management systems 245 may retrieve the snapshots and transactional logs from the repositories when creating a clone of the source databases 265. For example, the agent 280A may be configured to store the captured snapshots and transactional logs in a repository 285A that is configured for the source database 265A, the agent 280B may be configured to store the captured snapshots and transactional logs in a repository 285B that is configured for the source database 265B, and the agent 280N may be configured to store the captured snapshots and transactional logs in a repository 285N that is configured for the source database 265N. The repositories 285A-285N are collectively referred to herein as repositories 285.

For example, if the protection schedule specifies capturing 2 snapshot every day and capturing a transactional log every 2 hours for the source database 265A, the agent 280A may capture 2 snapshots of the source database and a transactional log every 2 hours such that in a 24-hour period, the agent captures 2 snapshots and 12 transactional logs. Further, depending upon a protection parameter defined in the protection schedule, the amount of time for which the captured snapshots and transactional logs are stored may vary. For example, if the protection parameter includes a continuous protection parameter that specifies a continuous protection of the source database 265A for 30 days, the agent 280A may be configured to save all snapshots and transactional logs captured in the previous 30 days. Thereafter, the agent 280A may purge (e.g., delete) some of the snapshots and transactional logs based upon the protection parameters defined in the protection schedule. Similarly, if the protection parameter includes a daily protection parameter of 30 days after the duration of the continuous protection parameter expires, the agent 280A may be configured to delete all but one snapshot that were captured before the previous 30 days, as well as delete all the transaction logs captured before the previous 30 days. The snapshot that is saved as the daily snapshot may be the snapshot that is closest to the daily snapshot time specified in the protection schedule. For example, if the time specified in the protection schedule is 11:00 AM for the daily snapshot, the snapshot that is captured at 11:00 AM or closest to 11:00 AM is saved and all other snapshots captured on that day may be deleted. Thus, the agent 280A is configured to capture and manage snapshots and transactional logs. The protection parameter and the protection schedule are defined in greater detail below.

Figure 3:
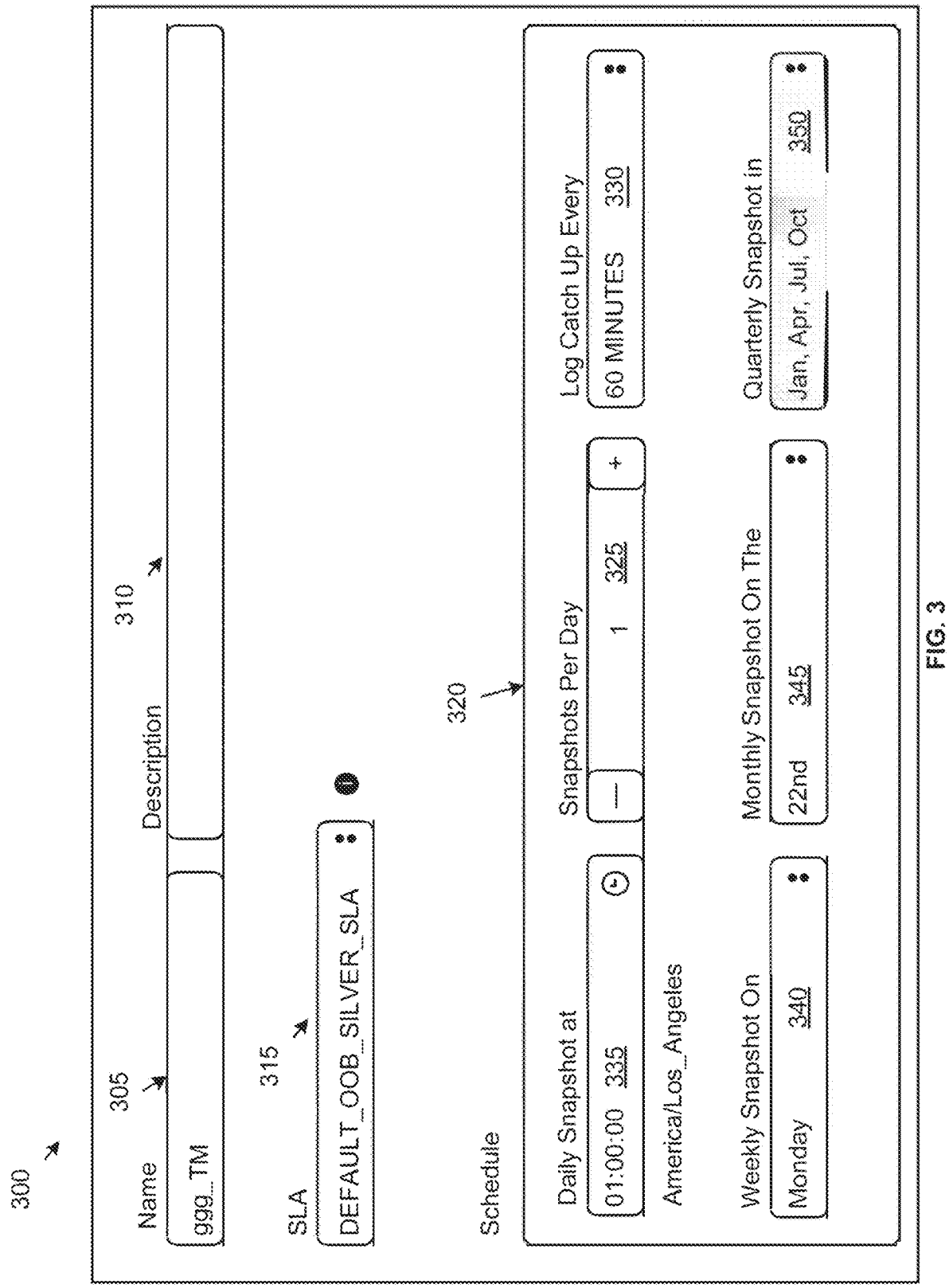
FIG. 3 is an example user interface of a time machine for creating backups of a source database in the database management system of FIG. 2, in accordance with some embodiments of the present disclosure.

Turning now to FIG. 3, an example user interface 300 of a time machine (e.g., the database protection system 220) for configuring a copy data management service is shown, in accordance with some embodiments of the present disclosure. For each source database that is provisioned (e.g., created or registered) in the database management system 200, an instance of a time machine may be created (e.g., at the time of provisioning). To configure an instance of the time machine, the database management system 200 may request inputs from a user via the user interface 300. For example, in some embodiments, the database management system 200 may request a name 305 and description 310 for the time machine, a level of a Service Level Agreement ("SLA") 315, and a protection schedule 320 to define rules based on which backups of the associated database are captured.

The SLA 315 represents an agreement between a service provider (e.g., the owner of the database management system 200) and the user (e.g., the owner of the database) that outlines, among other things, the protection scope of the database. The protection scope defines how frequently backups (e.g., snapshots and transactional logs) are to be captured and for how long those backups are to be retained. Thus, the protection scope defines the database retention policy. In some embodiments, the SLA 315 may define various protection parameters such as continuous, daily, weekly, monthly, quarterly, or yearly protection parameters for determining the protection scope of the database being created/registered. In other embodiments, the SLA 315 may define other or additional protection parameters.

Each database for which an instance of the time machine is created may be protected by capturing snapshots and/or transactional logs. The number of snapshots and transactional logs to be captured on each day may be defined by the user in the protection schedule 320. As used herein, a "day" may be any 24-hour period (e.g., from midnight to noon). In some embodiments, the protection schedule 320 may define default values to define the frequency of capturing snapshots and transactional logs, which the user may modify. Thus, based upon the frequency of capturing snapshots and transactional logs defined in the protection schedule 320, the user interface 300 of the time machine may be used to define capturing of one or more snapshots and one or more transactional logs each day. Generally speaking, the number of transactional logs that are captured each day may be higher than the number of snapshots that are captured on that day.

Since it is impractical and expensive to indefinitely store the captured snapshots and the transactional logs, the protection parameters in the SLA 315 may define the duration for how long those snapshots and transactional logs are stored.

For example, the SLA 315 may define a continuous protection parameter, which defines the duration in days for which all captured snapshots and transactional logs are retained. For example, if the continuous protection parameter is defined as 30 days, all snapshots and transactional logs that are captured within the last 30 days from the associated source database are retained. By retaining all snapshots and the transactional logs, the user may replicate any or substantially any state of the source database (down to a second or even a fraction of a second). The protection schedule 320 may define the frequency of capturing snapshots and transactional logs. For example, the protection schedule 320 may define a "snapshot per day" field 325 which may define the number of snapshots that are to be captured each day (e.g., in a 24 hour window) and a "log catch up" field 330 may define the number of transactional logs that are to be captured each day. For example, the "snapshot per day" field 325 in FIG. 3 defines that a single snapshot is to be captured each day and the "log catch up" field 330 defines that a transactional log is to be captured every hour. It is to be understood that these values are only an example and not intended to be limiting in any way.

The SLA 315 may also define a daily protection parameter, which defines the duration in days for which a daily snapshot is stored. For example, if the daily protection parameter is 90 days, the time machine may be configured to store a daily snapshot for 90 days. The protection schedule 320 may define the time of day in a "daily snapshot" field 335 to identify the snapshot that is designated as the daily snapshot. For example, if the user specifies in the "daily snapshot" field 335 that the snapshot captured at 1:00 PM every day is the daily snapshot and the SLA 315 defines the daily protection parameter for 90 days, the time machine stores a daily snapshot captured at or closest to 1:00 PM and store the daily snapshot for 90 days after the expiration of the continuous protection parameter (e.g., 30 days).

Similarly, the SLA 315 may define weekly, monthly, and quarterly protection parameters. A weekly protection parameter in the SLA 315 may define the duration in weeks for which a weekly snapshot is stored after the expiration of the daily protection parameter. The protection schedule 320 may define the day of the week in a "weekly snapshot on" field 340 to identify which snapshot is designated as the weekly snapshot. For example, if the user defines in the "weekly snapshot on" field 340 that the snapshot captured on Monday is to be designated as the weekly snapshot, and the weekly protection parameter in the SLA 315 specifies a duration of 8 weeks, the time machine may store the snapshot captured every week on Monday for 8 weeks after the expiration of the daily protection parameter (e.g., 90 days) and the continuous protection parameter (e.g., 30 days). If multiple snapshots are captured each day, the protection schedule 320 may also define which snapshot captured on the designated day of the week (e.g., Monday) serves as the weekly snapshot. In some embodiments, the time defined in the protection schedule 320 for capturing a daily snapshot (e.g., in the "daily snapshot on" field 335) may be used. For example, if the protection schedule 320 defines that the snapshot captured at 1:00 PM is the daily snapshot, and the weekly snapshot is to be captured on Monday, the time machine may store the snapshot captured at or closest to 1:00 PM every Monday as the weekly snapshot. In other embodiments, another time period may be used.

Likewise, a monthly protection parameter in the SLA 315 may define a duration in months for which a monthly snapshot is to be stored after the expiration of the daily, weekly, and continuous protection parameters. The user may specify the date within the protection schedule 320 for identifying which snapshot corresponds to the monthly snapshot. For example, the user may specify in a "monthly snapshot on" field 345 of the protection schedule 320 that the snapshot captured on the $22^{nd}$ of every month is the monthly snapshot. Thus, for a monthly protection parameter duration of 12 months, the time machine may store a monthly snapshot captured on the $22^{nd}$ of every month and may store that monthly snapshot for 12 months after the expiration of the continuous, daily, and weekly protection parameters. A quarterly protection parameter in the SLA 315 may define a duration in quarters for which a quarterly snapshot is to be stored and the user may specify in a "quarterly snapshot on" field 350 of the protection schedule 320 which months correspond to the various quarters. For example, the user may specify January, April, July, and October as the quarters. Thus, if the quarterly protection parameter specifies storing the quarterly snapshots for 20 quarters, the time machine may designate a snapshot captured on the first day of January, April, July, and October (e.g., January 1, April 1, July 1, and October 1) as the quarterly snapshot and store the quarterly snapshot for 20 quarters after the expiration of the continuous, daily, weekly, and monthly protection parameters.

Thus, for each protection parameter that is defined in the SLA 315, a corresponding value may be requested from the user in the protection schedule 320 to identify which snapshot corresponds to that protection parameter. It is to be understood that the various protection parameters and their respective schedules mentioned above are only examples and may vary from one embodiment to another as desired. Further, when the duration specified by a protection parameter expires, any snapshots or transactional logs that are expired (e.g., past their duration) may be deleted. As an example, if a snapshot is to be stored for 30 days, on the $31^{st}$ day, that snapshot may be deleted. Thus, each snapshot and transactional log is managed based on the SLA 315 and the protection schedule 320 independent from other snapshots and transactional logs.

Additionally, to simplify user selection, in some embodiments, various levels of the SLA 315 may be pre-defined within the database management system 200. Each level of the SLA 315 may have default values of the various protection parameters. For example, in some embodiments, the various levels of the SLA 315 may be GOLD, SILVER, BRONZE and the various protection parameters for these levels may be as follows:

| Name | Continuous | Daily | Weekly | Monthly | Quarterly |
| --- | --- | --- | --- | --- | --- |
| GOLD | 30 Days | 90 Days | 16 Weeks | 12 Months | 75 Quarters |
| SILVER | 14 Days | 60 Days | 12 Weeks | 12 Months | 0 Quarters |
| BRONZE | 7 Days | 30 Days | 8 Weeks | 6 Months | 0 Quarters |

It is to be understood that the nomenclature of the GOLD, SILVER, BRONZE levels of the SLA 315 is only an example and the levels may be given different names in other embodiments. Further, although three levels of the SLA 315 are described herein, in other embodiments, greater or fewer than three SLA levels may be used. Additionally, the values of the protection parameters in each level of the SLA 315 may vary from one embodiment to another. The database management system 200 may present the various pre-defined SLA levels to the user to select from. In some embodiments, the database management system 200 may allow the user to modify the values of one or more protection parameters in the pre-defined SLA levels. For example, if the user desires to select the GOLD level, but would like continuous protection for 45 days instead of the default value of 30 days shown in the table above, the user may modify the continuous protection parameter of the GOLD level. Thus, the pre-defined SLA levels provide the convenience and flexibility of tailoring the various protection parameters to suit the user's needs. Alternatively, the database management system 200 may allow the user to create a new SLA from scratch.

To create a new SLA, upon receiving input from the user indicating creation of a new SLA, the database management system 200 may present one or more user interfaces to the user requesting certain information. For example, the database management system 200 may request an SLA name, description, and values for the continuous, daily, weekly, monthly, and quarterly protection parameters. The database management system 200 may request other or additional details as well. Upon receiving the various inputs from the user for creating the new SLA, the database management system 200 may create the new SLA and allow the user to select that SLA when creating/setting up the time machine via the user interface 300.

Upon creating/setting up the time machine, the time machine starts automatically creating backups (e.g., snapshots and transactional logs) as soon as the source database is provisioned with the database management system 200.

Figure 4A:
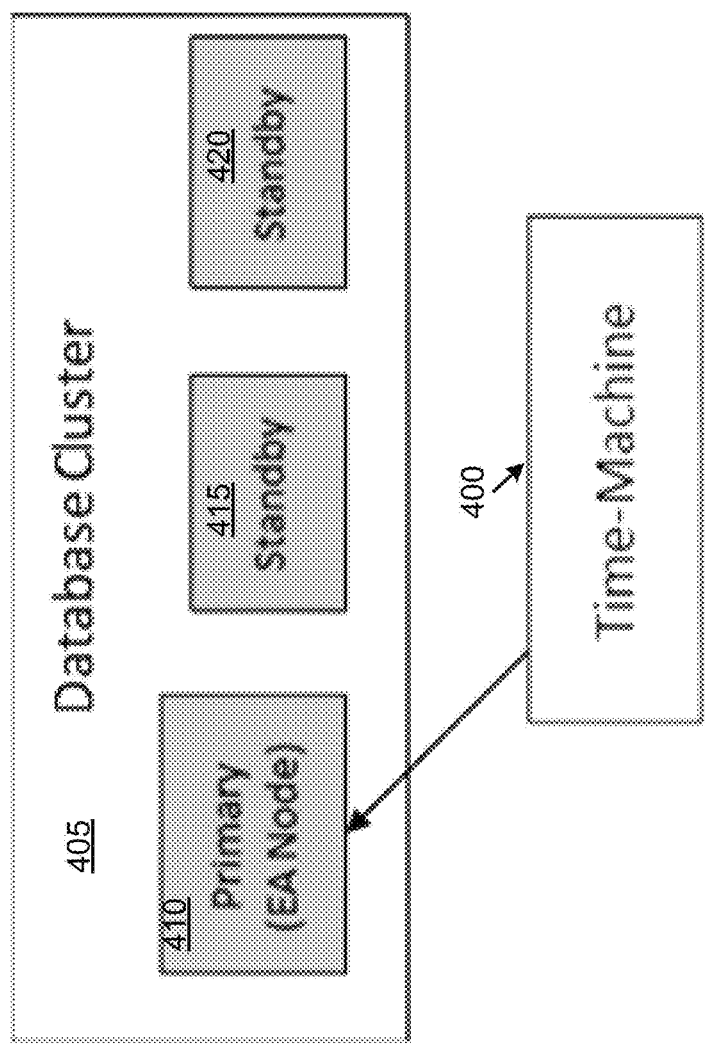
FIGS. 4A and 4B are example block diagrams showing a highly available time machine of the database management system of FIG. 2 for automatically capturing backups of the source database, in accordance with some embodiments of the present disclosure.
Figure 4B:
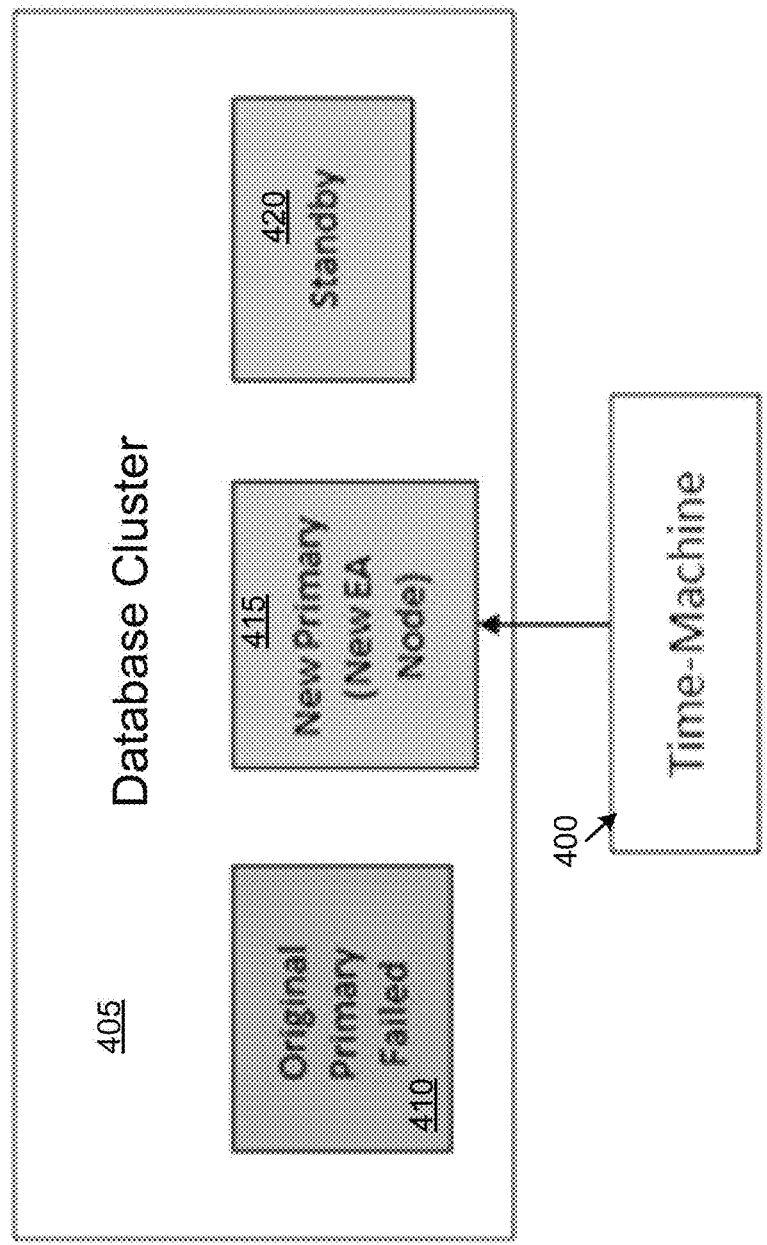

Referring to FIGS. 4A and 4B, an example block diagram of a highly available time machine 400 is shown, in accordance with some embodiments of the present disclosure. The highly available time machine is also referred to herein as a "clustered time machine." In some embodiments, a source database may be deployed (e.g., provisioned) on a single node of a cluster, on multiple nodes of a single cluster, or on node(s) of different clusters. A source database that resides on multiple nodes (of the same cluster or different clusters) forms a "database cluster." A database cluster may include multiple copies of the same source database that are located on multiple modes. Thus, in a database cluster, the same source database exists on multiple nodes. When a source database resides on a single node, that source database may be referred to as a single instance database. In other words, no additional copies of the source database exist in a single instance source database. It is to be understood that the copies of the source database in a database cluster are not considered "clones." Rather, each copy of the source database is considered an original database from which backups/clones may be created. By creating copies of a source database on different nodes, that source database may be considered "highly available." The advantage of a highly available database is that if the node on which the source database or a copy of the source database is located goes down, the source database may be accessed from other nodes on which the source database or copies thereof are located. Thus, by virtue of being stored on multiple nodes, a database cluster may be considered highly available.

For a single instance source database, the time machine associated with that source database only needs to capture backups from that source database. However, with a database cluster, to maintain the highly available nature of that database cluster and to ensure that backups of the source database are available even if a node associated with the database cluster goes down, the time machine associated with the source database needs to track all nodes of the database cluster. Specifically, if one of the nodes of the database cluster goes down, the time machine associated with the source database needs to able to continue taking backups of the source database from another node of the database cluster. Thus, the time machine of a source database that is part of a database cluster also needs to be highly available.

To make the time machine highly available in a database cluster, at least one of the nodes associated with the database cluster may be designated as a primary node (also referred to herein as master node or leader node depending upon the database engine) and the remaining nodes may be considered standby nodes (also referred to herein as secondary nodes or replica nodes or slave nodes or follower node depending upon the database engine). For example, in FIG. 4A, the time machine 400 may be highly available and may be configured to create backups of a database cluster 405. The database cluster 405 may include a primary node 410 and standby nodes 415 and 420. Thus, a source database that forms the database cluster 405 has three copies—one copy on each of the primary node 410 and the standby nodes 415 and 420.

Although the database cluster 405 is shown as having two standby nodes, in other embodiments, the database cluster may have greater than or fewer than two standby nodes. Additionally, in some embodiments, it may be preferable to have a single primary node (e.g., the primary node 410), while in other embodiments, the database cluster 405 may have multiple primary nodes. Further, the primary node 410 and the standby nodes 415 and 420 may be part of the same cluster (e.g., the cluster 100) or part of different clusters. In some embodiments, one or more of the primary node 410 and the standby nodes 415 and 420 may be analogous to one of the first node 105, the second node 110, or the third node 115 of FIG. 1. In other embodiments, one or more of the primary node 410 and the standby nodes 415, 420 may be part of the same node and different virtual machines on that node. In such cases, one or more of the primary node 410 and the standby nodes 415, 420 may be analogous to one of the database VMs 120, the database VMs 135, or the database VMs 150. In some embodiments and depending upon the database engine (e.g., Oracle RAC), the database cluster 405 may have nodes that are all treated equally. In other words, in such database clusters, all nodes may be primary nodes or all nodes may be secondary nodes.

When the primary node 410 fails, one of the standby nodes 415 or 420 may assume the role of the primary node, as shown in FIG. 4B. A node may be considered "primary" based upon a "state" of the node or other designated criteria. In some embodiments, the database controller 205 may select (e.g., elect) a primary node. For example, in some embodiments, the database controller 205 may designate (e.g., based upon selection by a user or other criteria) one of the nodes in the database cluster 405 as the primary node 410 during the provisioning of the source database and/or during converting the source database into a highly available source database. When the designated primary node (e.g., the primary node 410) fails, the database controller 205 automatically selects (e.g., elects) a new primary node based upon the primary node selecting criteria programmed therein. In some embodiments, each node in a database cluster 405 may be configured to assume either primary or standby statuses. Once at least one node in the database cluster 405 is determined to be a primary node (e.g., the primary node 410), the other nodes in the database cluster may be automatically designated as standby nodes (e.g., the standby nodes 415 and 420).

Additionally, in some embodiments, regular operations may be performed on the copy of the source database that is located on the primary node 410. However, when operations (e.g., read, write) are performed on the source database located on the primary node 410, the copies of the source database on the standby nodes 415 and 420 need to be updated to reflect the modifications on the source database on the primary node to maintain continuity of operation from the standby nodes in case the primary node becomes unavailable. To update the standby nodes 415 or 420, synchronous or asynchronous policies may be used. With a synchronous policy, the standby nodes 415 and 420 may be updated simultaneously or substantially simultaneously when an update occurs on the source database on the primary node 410. With an asynchronous policy, changes to the source database on the primary node 410 may be carried over to the standby nodes 415 and 420 in batches at predetermined time intervals.

In some embodiments, when a current primary node (e.g., the primary node 410) fails and the database controller 205 has to designate a new primary node, the database controller may determine which of the standby nodes (e.g., the standby nodes 415, 420) in the database cluster 405 have a synchronous policy. Since nodes having a synchronous policy are more likely to reflect the current state of the failed primary node (e.g., the primary node 410), in some embodiments, the database controller 205 may select the new primary node from the standby nodes (e.g., the standby nodes 415, 420) that have a synchronous policy. In other embodiments, the database controller 205 may use other criteria to select a new primary node. In some embodiments, the user may define an order in which the nodes in the database cluster 405 are to be designated the primary node.

Further, to keep the database cluster 405 highly available, the highly available time machine 400 needs to create backups of the source database associated with the database cluster 405. However, since each of the primary node 410 and the standby nodes 415 and 420 have the same copy of the source database, it may be redundant to create backups from each of those nodes when all of the nodes are operating normally without any failures. Thus, in some embodiments, the highly available time machine 400 may be configured to take backups from either the primary node 410 or the standby nodes 415 or 420. To take backups of the source database, the highly available time machine 400 may be configured (e.g., via the user interface 300) with an SLA (e.g., the SLA 315) and a protection schedule (e.g., the protection schedule 320). Based on the SLA and the protection schedule, the highly available time machine 400 may then capture snapshots and transactional logs from the copy of the source database that is on the primary node 410 or the standby nodes 415, 420.

In some embodiments, the highly available time machine 400 may be configured to capture backups (e.g., snapshots and transactional logs) from the node that is designated as an Era Active node (also referred to herein as an EA node or active node). For example, in FIG. 4A, the primary node 410 is shown as being designated the EA node. Thus, the highly available time machine 400 may capture backups from the primary node 410 since that node is designated the EA node. In other embodiments, one of the standby nodes 415 or 420 may be designated as the EA node. A user defined policy may determine which node in the database cluster 405 is designated as the EA node, as discussed further below. When the EA node fails, the highly available time machine 400 automatically switches over to another node in the database cluster 405 to capture backups from. For example, and as shown in FIG. 4B, when the primary node 410 fails, the standby node 415 is designated as the new primary node. The standby node 415 is also designated as the new EA node. Thus, when the primary node 410 fails, the highly available time machine 400 starts capturing backups from the standby node 415 since that node is now the EA node. Thus, when one EA node becomes unavailable, the highly available time machine 400 automatically switches to another EA node to capture backups from. Although in FIGS. 4A and 4B, the primary node (e.g., the primary node 410 or the standby node 415 designated as the new primary node when the original primary node fails) is shown as being as the EA node, as discussed below, in some embodiments, the EA node may be selected from a standby node as well.

In some embodiments, in addition to determining which node in the database cluster 405 is the primary node 410 and which nodes are the standby nodes 415 and 420, the database controller also determines the EA node. The highly available time machine 400 is configured to keep track of which node in the database cluster 405 is the EA node. In some embodiments, the database controller 205 may be configured to designate a node in the database cluster 405 as an EA node based upon a user defined policy. In some embodiments, the highly available time machine 400 may be configured to review the metadata of each of the primary node 410 and the standby nodes 415, 420 to identify the EA node. In other embodiments, the database controller 205 may inform the highly available time machine 400 of the EA node. In yet other embodiments, the highly available time machine 400 may use other mechanisms to identify the EA node. Thus, the highly available time machine 400 may be configured to track the EA node and capture backups from the EA node.

Once a user defines the user defined policy, the highly available time machine 400 continues to capture backups based upon the user policy without the user needing to worry about node failure and backup capture. The user defined policy may define the number and location of nodes in the database cluster 405, the states of the nodes that designate a node as a primary node or a standby node, and a switch over policy to designate EA nodes. The user defined policy is also referred to herein as "Era Active Policy" or "EA policy."

Specifically, in some embodiments, a user may define the EA policy when the source database is being provisioned and/or when the source database is being converted into a highly available source database. In the EA policy, the user may define the number of nodes that are needed in the database cluster 405 depending upon the number of copies of the source database that the user desires to keep the source database highly available. For example, the user may define the database cluster 405 as having three nodes. The user may also define the location of each of those nodes. Further, the user may specify preferences or "roles" for each of those nodes. By defining the roles of each of the nodes, the user may define "states" or conditions that enable the database controller 205 to designate a node as a primary node or a standby node. In some embodiments, the EA policy may designate an initial primary node. In some embodiments, the EA policy may also provide conditions/criteria to designate a new primary node if the current primary node fails.

Moreover, the EA policy may define a switch over policy such that when one EA node fails, another node in the database cluster 405 may be designated as the EA node to allow the highly available time machine 400 to switch over to capturing backups from the new EA node in the database cluster 405. For example, in some embodiments, the user may define a primary-only EA policy, a secondary-only EA policy, a prefer-primary EA policy, a prefer-secondary EA policy, or "Any" EA policy to determine the switch over policy.

A primary-only EA policy defines that the next eligible EA node is to be selected from a primary node (e.g., the primary node 410) and not a standby node. Thus, a primary node can only be designated as the next eligible EA node with a primary-only EA policy. When the current EA node becomes unavailable, the database controller 205 may designate another primary node as the next EA node. For example, if the currently designated primary node (e.g., the primary node 410) is the current EA node, when that primary node fails, the database controller designates another node (e.g., one of the standby nodes 415 or 420) as the new primary node. The database controller 205 may designate that new primary node as the next EA node and the highly available time machine 400 may automatically switch over to capturing backups from the newly designated primary node. Thus, the highly available time machine 400 may wait for a new node to be designated as the primary node for capturing snapshots and transactional logs. If all the nodes of the database cluster 405 become unavailable and there are no nodes remaining to be designated the primary node, the highly available time machine 400 may wait until either one of the nodes comes back and is designated the primary node and/or may issue an error notification.

A secondary-only EA policy defines that the next eligible EA node is to be a standby node and not a primary node. When the current EA node fails, the database controller 205 may designate another secondary node in the database cluster as the next EA node. Thus, the highly available time machine 400 captures snapshots and transactional logs only from one of the standby nodes (e.g., the standby nodes 415 or 420) and not from the primary node. For example, say the highly available time machine 400 is capturing backups from the standby node 415 under a secondary-only EA policy. If the primary node 410 becomes unavailable and the standby node 415 is designated as the new primary node, the database controller 205 cannot continue capturing backups from the standby node 415 without being in violation of the secondary-only EA policy. Thus, the database controller 2095 may be required to select a new EA node. If no standby nodes are available to assume the role of the EA node, the highly available time machine 400 waits until either one of the standby nodes comes back online and/or may issue an error notification.

The prefer-primary EA policy and prefer-secondary EA policy allow the highly available time machine 400 more flexibility in determining which node to capture snapshots and transactional logs from. For example, with the prefer-primary EA policy, the user may define that the database controller 205 may pick any of the available nodes as the next EA node. However, if a primary node (e.g., the primary node 410) is available, the database controller 205 is to pick the primary node as the next EA node. Thus, in such cases, if no primary node is available in the database cluster 405 to capture backups from, the database controller 205 may designate a standby node (e.g., the standby nodes 415 or 420) as the next EA node. If all the nodes of the database cluster 405 fail and there are no nodes remaining to be designated as the primary node or a standby node, the highly available time machine 400 may wait until either one of the nodes comes back and is designated the primary node or the standby node and/or may issue an error notification.

With a prefer-secondary EA policy, the user may define that the database controller 205 may pick any of the available nodes as the next EA node. However, if a standby node (e.g., the standby nodes 415, 420) is available, the database controller 205 is to pick the standby node as the next EA node. Thus, as long as either a primary node or a secondary node is available in the database cluster 405, the highly available time machine 400 may continue to capture snapshots and transactional logs similar to the prefer-primary EA policy.

In sum, with the primary-only EA policy, the highly available time machine 400 may continue to capture snapshots and transactional logs so long as there is a primary node available in the database cluster 405. With the secondary-only EA policy, the highly available time machine 400 may continue to capture snapshots and transactional logs so long as there is a standby node available in the database cluster 405. With the prefer-primary EA policy or the prefer-secondary EA policy, the highly available time machine 400 may continue to capture snapshots and transactional logs so long as there is at least one primary node or at least one standby node available in the database cluster 405 with preference being given to the primary node and the standby node, respectively.

Additionally, in some embodiments, the user may define the "Any" EA policy. With this policy, the database controller 205 may select any node in the database cluster 405 as the next EA node. Thus, with the "Any" EA policy, the highly available time machine 400 may continue to capture snapshots and transactional logs so long as there is at least one node available in the database cluster 405 regardless of the primary or standby designation.

In some embodiments, the "Any" policy may be used for database clusters in which all nodes are treated equally (e.g., for Oracle RAC clusters). When all nodes in the database cluster 405 are treated equally and there is no distinction between a primary node and a secondary node, read write operations may be performed on each node. In some embodiments, such a database cluster may include a shared storage that allows all the nodes to access data from other nodes. Without distinct designations of primary and secondary, in such database clusters, primary-only EA policy, the secondary-only EA policy, the prefer-primary EA policy may not apply. Thus, in database clusters that treat all nodes equally, the "Any" EA policy may be used.

In some embodiments, the user may select a default EA policy or not specify any EA policy in which case the default EA policy may be used. With the default EA policy, the database controller 205 may specify the EA policy to use (e.g., the primary-only EA policy, the secondary-only EA policy, the prefer-primary EA policy, the prefer-secondary EA policy, or the "Any" EA policy) based upon the database engine of the source database. For example, in some embodiments, for a source database having the Oracle database engine, the database controller 205 may specify the "Any" policy as the default EA policy, for a source database having the Postgres database engine, the database controller may specify the primary-only as the default EA policy, for a source database having the SQLServer database engine or the Oracle RAC database engine, the database controller may specify the "Any" EA policy as the default EA policy, and so on. It is to be understood that the default EA policies for the database engines mentioned above are only an example and not intended to be limiting in any way.

Thus, by virtue of defining the switch over policy in the EA policy for the database cluster 405, the EA policy provides a seamless user experience by hiding the underlying complexities of capturing backups from the user in case of failure conditions. When a node in the database cluster 450 from which the highly available time machine 400 is creating backups from goes down, the highly available time machine 400 seamlessly and intelligently switches to capturing backups from another node in the database cluster without any user involvement or input. Based upon the EA policy, so long as there is at least one node available from which the highly available time machine 400 may continue to capture backups from, no errors are issued. Even when no nodes are available to capture backups from, in some embodiments, the highly available time machine 400 may be configured to wait for a designated amount of time in case at least one of the nodes comes back up again. Only after the designated amount of time has passed and no node has come back up for the highly available time machine 400 to capture backups from is when the highly available time machine issues an error notification. Thus, the highly available time machine 400 greatly improves user experience while protecting a highly available source database in a reliable manner.

The switch over policies above may be considered "static" policies. An example of a static switch over EA policy may be as follows:

```
{
  "driverDriven": <boolean>,
  "staticEaPolicy": {
    "any": <boolean>,
    "primaryOnly": <boolean>,
    "secondaryOnly": <boolean>,
    "preferSecondary": <boolean>
    "preferPrimary": <boolean>
  }
}
```

It is to be understood that the switch over EA policy above is only an example and not intended to be limiting in any way. In some embodiments, different variable names may be used for the variables "driverDriven," "any," "primaryOnly," "secondaryOnly," "preferSecondary," and "preferPrimary". Further, the policy above is only a portion of the overall EA policy. The example above only describes the switch over policy portion of the overall EA policy. In the EA policy above, each of the variables, "driverDriven," "any," "primaryOnly," "secondaryOnly," "preferSecondary," and "preferPrimary" may assume Boolean values (e.g., True or False). The "any" variable may correspond to the "Any" EA policy, the "primaryOnly" variable may correspond to the primary-only EA policy, the "secondayrOnly" variable may correspond to the secondary-only EA policy, the "preferSecondary" variable may correspond to the prefer-secondary EA policy and the "preferPrimary" variable may correspond to the prefer-primary EA policy.

In some embodiments, the user may specify a Boolean value of "true" for the EA policy that the user wishes to use for the highly available time machine 400. For example, in some embodiments, the user may define the EA policy as follows;

```
{
  "driverDriven": false,
  "staticEaPolicy": {
    "any": false,
    "primaryOnly": false,
    "secondaryOnly": true,
    "preferSecondary": false,
    "preferPrimary": false
  }
}
```

Thus, in the example above, since the variable "preferSecondary" is set to "true," the user has selected the prefer-secondary EA policy for the highly available time machine 400.

The "driverDriven" variable determines whether a driver associated with the database controller 205 and the highly available time machine 400 notifies the database controller which node in the database cluster 405 is the primary node 410 and from which node to capture the backups from. For example, if the "driverDriven" variable is "true," the user need not define Boolean values for the "any," "primaryOnly," "secondaryOnly," "preferSecondary," and "preferPrimary" variables above and the driver associated with the database controller 205 informs the database controller which node is the EA node from which node the highly available time machine 400 needs to capture backups from. If the "driverDriven" variable is "false," the database controller 205 determines the EA node based upon the values specified in the "any," "primaryOnly," "secondaryOnly," "preferSecondary," and "preferPrimary" variables or if all the values are false, then assigns a default EA policy.

In some embodiments, the EA policy may specify additional priority specifications. For example, a user may select a database cluster having nodes A, B, C, D, and E in which node A is the primary node and nodes B, C, D, and E are standby nodes. With a prefer-secondary EA policy, for example, any of the nodes B, C, D, or E may be designated the EA node and the highly available time machine 400 may take backups from any of the nodes B, C, D, and E. In some embodiments, the database controller 205 may randomly designate one of the nodes B, C, D, and E as the EA node. In other embodiments, the EA policy may define a priority or order of the nodes B, C, D, and E in which the database controller 205 is to designate EA nodes. In some embodiments, the priority (e.g., weight) may assume an integer value, for example, an integer value between 0 and 100. In other embodiments, the priority may assume other values and/or formats.

When integer values are used, in some embodiments, higher the integer value of a node, higher is the priority or weight of that node. A higher priority or higher weight means that the database controller 205 designates the higher priority node as the EA node before designating a lower priority node as the EA node. For example, if the nodes B, C, D, and E have priorities defined as 0, 10, 20, and 50 respectively, then node E has the highest priority followed by nodes D, C, and B. Thus, node B has the lowest priority. Thus, the database controller 205 designates the highest priority node E as the EA node. When the node E fails, the database controller 205 designates node D as the EA node, which has the next highest priority. When the node D fails, the database controller 205 designates node C as the EA node and when the node C fails, the database controller designates node B as the EA node.

Thus, in some embodiments, integer value 0 may specify a lowest priority and an integer value of 100 may specify a highest priority. In other embodiments, integer value 0 may specify a highest priority and an integer value of 100 may specify a lowest priority. In some embodiments, the user may specify the priority (e.g., at the time of creating the EA policy), while in other embodiments, the database controller 205 may assign a default priority based on predetermined and preprogrammed criteria to each node in the database cluster 405. In some embodiments, if the user does not specify a priority, the database controller 205 may assign the same integer value to all the standby nodes (e.g., 0, 100, etc.), in which case the database controller 205 may randomly select the EA node.

In some embodiments, the primary node may also be assigned a priority. For example, if the primary node (e.g., node A in the example above) fails, the priority may decide which node is to be designated as the new primary node. If the original primary node (e.g., node A) comes back up again later, node A may now assume a standby node status. The priority assigned to node A may then be used along with the priorities of the other nodes to determine the next primary node and/or the next EA node.

It is to be understood that although the priority above is explained with respect to a prefer-secondary EA policy, the priorities may be used with any of the EA policies described above such that the priority may be used by the database controller 205 to determine the next EA node. Thus, priorities may be assigned to one or more standby nodes and one or more primary nodes to determine the next EA node.

An example portion of the EA policy showing the priority is shown below:

```
"dynamicEaPolicy": [
    {
        "dbserverId": "dbserver-id-string-1",
        "backupPriority": <integer (0 to 100)>,
    },
    {
        "dbserverId": "dbserver-id-string-2",
        "backupPriority": <integer (0 to 100)>,
    }
]
```

In the example above, "dbserver-id-string-1" and "dbserver-id-string-2" identify a particular node (e.g., the primary node 410, the standby nodes 415, 420, etc.) in a database cluster (e.g., the database cluster 405) to which a priority is to be assigned. The variable "backupPriority" defines the priority that is assigned to the node identified by the "dbserver-id-string-1" or "dbserver-id-string-2". The value of the priority is defined by the "<integer (0 to 100)>" in the example above. It is to be understood that the EA policy above is only an example and a portion of the overall EA policy. Further, the names of the variables used above may vary in other embodiments.

In some embodiments, instead of assigning a priority to each of the nodes (e.g., the nodes A, B, C, D, and E in the example above), priorities may be assigned to a subset of the nodes (e.g., the nodes A, B, C, D, and E in the example above). For example, in some embodiments, the user may wish to capture backups only from nodes B and C and never from nodes D and E. Thus, in such cases, the user may define a priority for nodes B and C that is a positive integer value (e.g., a value between 0 and 100). However, for nodes D and E, the user may define a priority having a negative value (e.g., −1). The database controller 205 may be programmed to skip nodes having a negative priority value in determining the next EA node. Thus, when the database controller 205 sees a negative value against the nodes D and E, the database controller may skip those nodes in determining the next EA node and only consider the nodes B and C.

Similarly, in some embodiments, if the database cluster 405 spans across multiple clusters (e.g., clusters X and Y) and the user wishes to only capture backups from a particular one or more clusters (e.g., cluster X), the user may configure the EA policy such that nodes in the cluster(s) from which backups may be captured from have positive integer value priorities and nodes in the cluster(s) from which backups cannot be captured from have negative integer value priorities. Thus, the EA policy may be configured in a variety of ways to suit a user's needs.

Figure 5:
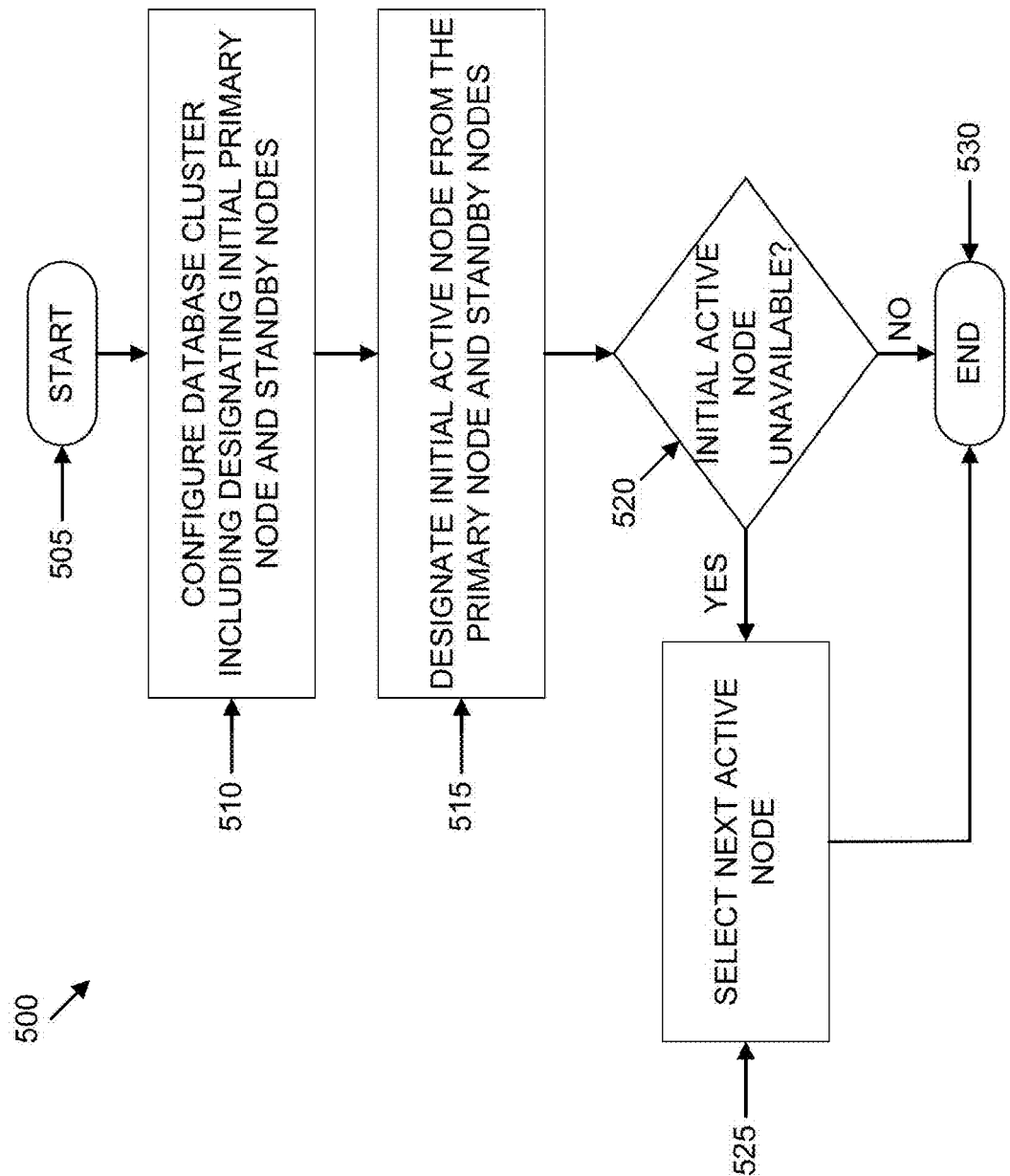
FIG. 5 is an example flowchart outlining operations for providing a highly available source database, in accordance with some embodiments of the present disclosure.

Turning now to FIG. 5, an example flowchart outlining a process 500 is shown, in accordance with some embodiments of the present disclosure. The process 500 may include additional or other operations depending upon the embodiment. The process 500 may be performed by the database controller 205, and particularly the highly available time machine 400 of the database controller, to protect a source database. Thus, the process 500 starts at operation 505 with the configuration of a database cluster (e.g., the database cluster 405). In some embodiments, the database cluster 405 may be configured during the provisioning of the source database. In other embodiments, the database cluster 405 may be configured for an existing source database (e.g., after the provisioning of the source database). By configuring the database cluster 405, a user may define (e.g., in the EA policy), the number of nodes in the database cluster, the identity (e.g., location) of the nodes in the database cluster, the initial primary node, any criteria to designate additional primary nodes when the initial primary node fails, the switch over policy, priority of selecting the next EA node, and any/or other details that may be desired or needed.

Upon receiving the EA policy, the database controller 205 may configure the database cluster 405 based upon the EA policy. Additionally, based upon the EA policy, the database controller 205 may designates one node from the database cluster as the primary node (e.g., the primary node 410) and the remaining nodes as the standby nodes (e.g., the standby nodes 415, 420) at operation 510. In some embodiments, the user may not define which node to designate as the initial primary node. In such embodiments, the database controller 205 may select (e.g., elect) a node from the database cluster 405 and designate that node as the initial primary node. In some embodiments, the database controller 205 may be configured with criteria to enable the database controller to select the initial primary node. In some embodiments, the database controller 205 may also be configured with criteria to select (e.g., elect) the next primary node when the initial primary node fails. Thus, when the initial primary node (e.g., the primary node 410) fails, the database controller 205 selects and designates another node (e.g., the standby node 415) from the database cluster 405 as the new primary node. If the initial primary node (e.g., the primary node 410) comes back up after failing, the initial primary node assumes the status of a standby node and the newly designated primary node (e.g., the standby node 415) continues as the primary node.

Therefore, in some embodiments, the database controller 205 manages the database cluster 405 such that the database cluster has at least one primary node and one or more standby nodes. In addition, at operation 515, the database controller 205 designates one of the nodes in the database cluster 405 as the initial EA node (e.g., initial active node). The initial EA node is the node in the database cluster 405 from which the highly available time machine 400 captures snapshots and transactional logs (e.g., backups) from. The highly available time machine 400, thus, tracks the database cluster 405, and particularly, the EA node in the database cluster. In some embodiments, the database controller 205 designates the EA node based upon the EA policy. In other embodiments, and particularly, if no switch over policy is defined in the EA policy for designating EA nodes, the database controller 205 may be configured to select a default switch over policy. Thus, based on the switch over policy, the database controller 205 designates the EA node.

For example, if the switch over policy is the primary-only EA policy or the prefer-primary EA policy, the database controller 205 designates the primary node selected at the operation 510 as the initial EA node. If the switch over policy is the secondary-only EA policy or the prefer-secondary EA policy, the database controller 205 selects one of the standby nodes as the initial EA node. For the secondary-only EA policy or the prefer-secondary EA policy, if the EA policy defines a priority for the standby nodes, the database controller 205 may select the highest priority standby node as the initial EA node. If the switch policy is the "Any" EA policy, the database controller 205 may select any one node from the nodes of the database cluster 405 as the initial EA node. The database controller 205 may consider any priorities assigned to the nodes in designating the EA node such that the highest priority node is the initial EA node. Thus, at the operation 515, the database controller 205 designates one node from the database cluster 405 as the initial EA node.

Upon designating the initial EA node, the highly available time machine 400 captures backups from the initial EA node. At operation 520, the database controller 205 determines if the initial EA node has become unavailable requiring an election of a new EA node. In some embodiments, the initial EA node may become "unavailable" for a variety of reasons. For example, in some embodiments, the initial EA node may not be able to serve as an EA node if communication between the database controller 205 and the initial EA node is hindered. For example, in some embodiments, each node in the database cluster 405 may have installed thereon a daemon program that allows the database controller 205 to communicate with that node. If the daemon of the initial EA node becomes unreachable, the database controller 205 may be unable to communicate with the initial EA node. When the database controller 205 is unable to communicate with the initial EA node, the database controller may deem the initial EA node as "unavailable."

In some embodiments, the database server (e.g., the source database virtual machine) on which the initial EA node resides may go down. For example, in some embodiments, the database server virtual machine may be powered off, deleted, or its settings changed, preventing the virtual machine from communicating with the database controller 205. In such instances, the database controller 205 may be unable to access the copy of the source database on the initial EA node for performing backups. In such cases, the database controller 205 may deem the initial EA node as "unavailable." In some embodiments, the communication channel (e.g., database service) between the database controller 205 and the initial EA node may itself may fail. Such instances may also lead the database controller 205 to consider the initial EA node as "unavailable." In some embodiments, the initial EA node may be able to normally communicate with the database controller 205, however, the current role of the initial EA node may change. For example, in some embodiments, if the switch over policy is the secondary-only EA policy such that Node A is the primary node and standby node B is the initial EA node, and Node A fails leading to Node B being designated as the new primary node, then node B may no longer serve as the EA node. Specifically, since the secondary-only policy defines that the EA node has to be a standby node and Node B is now the primary node, the database controller 205 needs to select the next EA node. In such cases, the database controller 205 may designate the initial EA node as "unavailable." In other embodiments, other or additional conditions may lead the database controller 205 to designate the initial EA node as "unavailable." Thus, the initial EA node may be considered "unavailable" in instances where the database controller 205 is unable to communicate normally with the initial EA node or the role of the initial EA node changes such that the node can no longer serve as an EA node.

Thus, the database controller 205 may need to select the next EA node for a variety of reasons. If, at the operation 520, the database controller 205 determines that a new EA node is needed, then at operation 525, the database controller selects the next EA node based upon the switch over policy and the priorities of the nodes defined in the EA policy. For example, in some embodiments, the database controller 205 may first determine if the "driverDriven" variable is set to "true" or "false." If the "driverDrivern" variable is set to "true," the database controller 205 does not elect the next EA node. Rather, the driver associated with the database controller 205 assigns the next EA node. On the other hand, if the "driverDriven" variable is set to "false," then the database controller 205 selects the next EA node based upon the variables "any," "primaryOnly," "secondaryOnly," "preferSecondary," and "preferPrimary" in the switch over portion of the EA policy.

Upon selecting the next EA active, the highly available time machine 400 may resume capturing backups (e.g., snapshots and transactional logs) from the next EA node. In some embodiments, the highly available time machine 400 may maintain a continuity of capturing backups even during a switch over. For example, say the highly available time machine 400 captured a snapshot at time A from the initial EA node and was scheduled to capture a transactional log from the initial EA node at time B, and the initial EA node becomes unavailable between times A and B. When the next EA node is selected at the operation 525, the highly available time machine 400 may start with the capturing of a transactional log at time B from the next EA node, thereby maintaining a continuity of backups, which in turn may ensure that cloned databases may continue to be created at any desired point in time. The process 500 then ends at operation 530.

On the other hand, if at the operation 520, the database controller 205 determines that the initial EA node is still available, then the database controller does not assign the next EA node and the highly available time machine 400 continues to capture the backups from the initial EA node. The process 500 ends at the operation 530. In some embodiments, the process 500 may be run continuously or periodically when certain criteria are satisfied. For example, in some embodiments, the database controller 205 may run the process 500 each time a snapshot capturing operation is issued by the highly available time machine 400 to the EA node to capture a backup of the source database from the EA node. In other embodiments, other defined criteria may be used.

Figure 6:
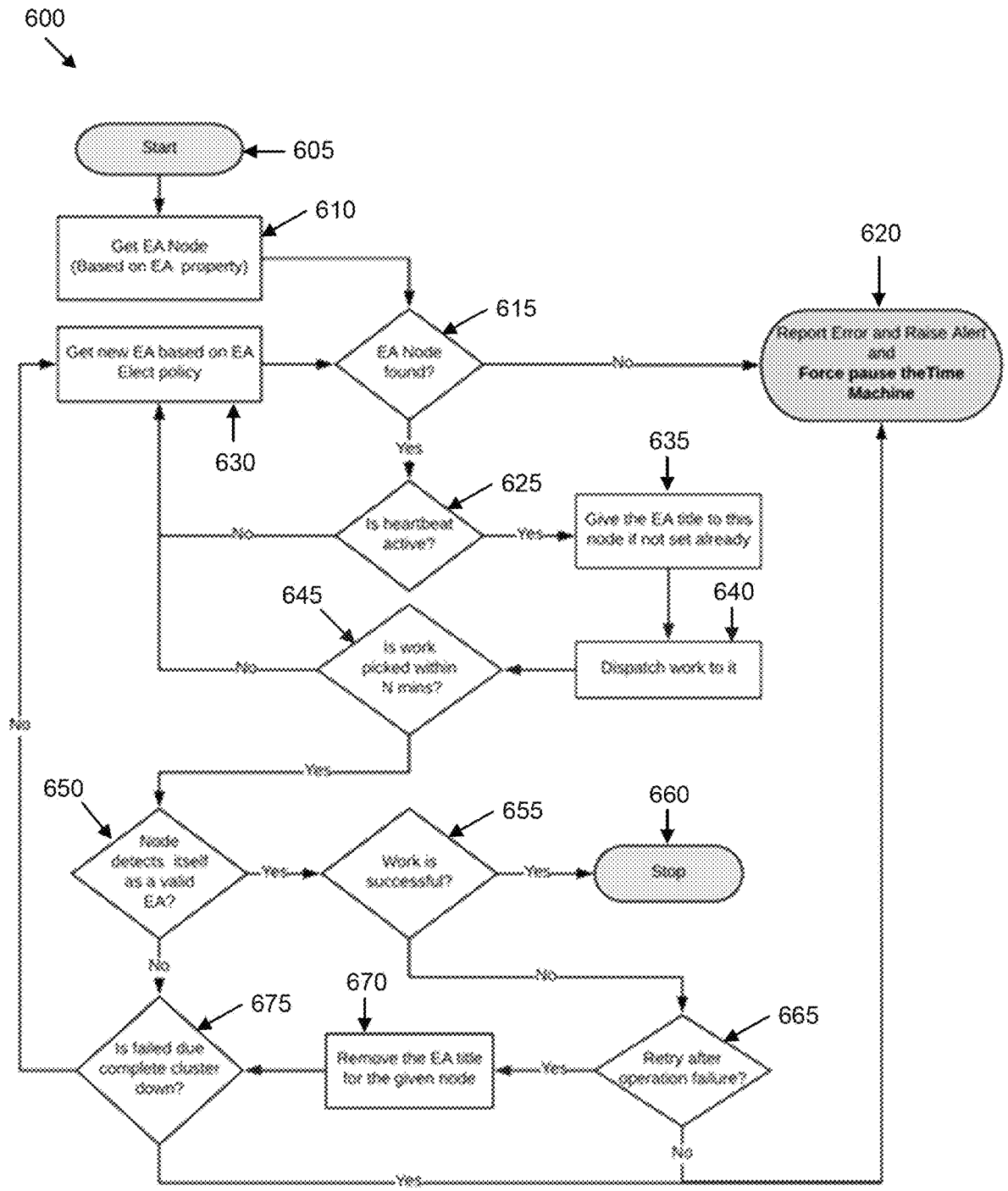
FIG. 6 is another example flowchart outlining certain operations of FIG. 5 in greater detail, particularly relating to implementing a switch over policy to provide the highly available source database, in accordance with some embodiments of the present disclosure.

Referring now to FIG. 6, another flowchart outlining operations of a process 600 is shown, in accordance with some embodiments of the present disclosure. The process 600 describes the operation 520 of FIG. 5 in greater detail.

The process 600 may include additional or other operations depending upon the embodiment. The process 600 may be performed by the database controller 205, and particularly the highly available time machine 400 of the database controller, to implement the switch over policy of the EA nodes. Thus, upon starting at operation 605, the database controller 205 determines if any node in the database cluster (e.g., the database cluster 405) is the initial EA node at operation 610. In some embodiments, the database controller 205 may retrieve metadata (e.g., EA property in FIG. 6) associated with the database cluster (e.g., the database cluster 405). If an EA node is currently designated, the metadata may identify the node of the database cluster that has been designated as the initial EA node. In some embodiments, the database controller 205 may also review the EA policy to determine the criteria for designating EA nodes. In some embodiments, an EA node may not be designated in the database cluster if, for example, none of the nodes satisfy the criteria in the switch over policy portion of the EA policy for designating EA nodes. For example, if the switch over policy is secondary-only and there are no secondary nodes in the database cluster, there may not be an EA node designated in that database cluster. As another example, if all of the nodes in the database cluster are unavailable, the database cluster may not have any currently designated EA node. There may be other reasons why the database cluster may not have a currently designated EA node. Thus, upon reviewing the metadata retrieved at the operation 610, the database controller 205 determines, at operation 615, if the database cluster has a currently designated EA node (e.g., initial EA node).

If the database controller 205 does not find any initial EA node at the operation 615, the process 600 proceeds to operation 620 where the database controller 205 reports an error and/or possibly raises an alert alerting a user that there is no EA node. Without a designated EA node, the highly available time machine 400 does not know which node to create backups from. Thus, the database controller 205 also pauses the highly available time machine 400 until an EA node is designated in the database cluster. The database controller 205 may take other or additional actions at the operation 620 if no EA node is found at the operation 615. As discussed below, the operation 620 may be reached from other operations of the process 600 as well when a node unavailability scenario (e.g., an EA node is unavailable, all the nodes in the database cluster are unavailable, etc.) is detected.

For example, consider a scenario when an EA node (e.g., the initial EA node) is unavailable. In such cases, the database controller 205 may select a new EA node (e.g., the next EA node) and attempt to run the highly available time machine 400 against the next EA node to capture backups. In some embodiments, the database controller 205 may be unable to select the next EA node (e.g., because all the nodes in the database cluster are down, etc.). In such instances, the database controller 205 may put the highly available time machine 400 in a halted state and raise an alert to the user at the operation 620. Upon receiving the alert, the user may intervene and resolve the problem.

In addition, in some embodiments, the database controller 205 may continue to monitor the database cluster in case one or more nodes of the database cluster become available. For example, in some embodiments, the database controller 205 may send a periodic "discovery" request to one or more nodes in the database cluster to check if any node is available again. Upon finding an available node, the database controller 205 may determine, based upon the switch over policy, if that available node may be designated as the next EA node. If the available node is able to be designated as the next EA node, the database controller 205 may designate that node as the next EA node and the highly available time machine 400 may continue to capture backups from the next EA node. Thus, depending upon the reason why the process 600 lands at the operation 620, the database controller 205 may take corrective action.

On the other hand, if at the operation 615, the database controller 205 does find a currently designated EA node (e.g., the initial EA node), the process 600 proceeds to operation 625. At the operation 625, the database controller 205 determines whether the initial EA node has an active "heartbeat." In other words, the database controller 205 determines whether communications between the initial EA node (e.g., the database server associated with the source database on the initial EA node) and the database controller 205 are occurring normally. As indicated above, in some cases, the initial EA node may become unavailable. For example, in some embodiments, the initial EA node may become unavailable if the database server virtual machine on the initial EA node on which the copy of the source database resides becomes unavailable or the database service (e.g., communication channel) between the database controller 205 and the database server is disrupted, or any other reason that prevents the database controller from normally communicating with the initial EA node.

Upon determining that the initial EA node does not have an active "heartbeat," or in other words, is unable to communicate properly with the database controller 205, the database controller selects a new node from the database cluster to designate as the EA node (e.g., the next EA node) at operation 630. In some embodiments, the database controller 205 may review the EA policy to determine the switch over policy. Based upon the switch over policy, the database controller 205 may select the next EA node. The operation 630 is analogous to the operation 525. On the other hand, if at the operation 625, the database controller 205 does find a "heartbeat" of the initial EA node, then the process 600 proceeds to operation 635 and designates (or confirms) that the initial EA node is the current EA node and that backups may continue to be generated from the initial EA node. The operations 610, 615, 625, and 635 may be considered "pre-discovery" operations in which the database controller 205 is attempting to identify/confirm the currently designated EA node (e.g., the initial EA node).

At operation 640, upon detecting the initial EA node and determining that the initial EA node is still available (e.g., has a heartbeat") and operating as an EA node, the database controller 205 sends work requests to the initial EA node. For example, the database controller 205 may receive a work request from a user to capture a snapshot (e.g., manual create_snapshot request) of the source database. In some embodiments, this manual request may be separate from the backups (e.g., snapshots and transactional logs) that the highly available time machine 400 automatically captures from the initial EA node. In other embodiments, the database controller 205, and particularly, the highly available time machine 400, may send work requests to the initial EA node to automatically capture the snapshots and transactional logs based upon the SLA and protection schedule. Thus, the work requests may be user initiated or time machine initiated. At operation 645, the database controller 205 determines if the initial EA node responds (e.g., picks up) to the work request within a designated amount of time (e.g., N minutes). By virtue of checking whether the work request is picked up by the initial EA node within the designated amount of time, the database controller 205 confirms that the initial EA node is still available and acting as an EA node when the work request is sent to the initial EA node. If the initial EA node does not respond (e.g., does not acknowledge the work request or does not respond to the work request) within the designated amount of time, the database controller 205 may assume that the initial EA node has become unavailable. The database controller 205 then proceeds to the operation 630 to select the next EA node if the initial EA node does not respond within the designated amount of time. If the initial EA node does respond to the work request at the operation 645 within the designated amount of time, at operation 650, the initial EA node also confirms to the database controller 205 whether the initial EA node is still the designated EA node.

In some embodiments, the initial EA node may be available and pick up the work request of the operation 640. However, the initial EA node may determine upon picking up the work request that the node is no longer an EA node. For example, in some embodiments, after the operation 645, the database controller 205 (or another component of the database management system 200 (e.g., when the driver-Driven value of the EA policy is true)) may have selected another EA node. Alternatively, in some embodiments, the status of the initial EA node may have changed since the work request was sent. For example, if the node that receives the work request of the operation 640 is a secondary node and the switch over policy is a secondary-only policy, and if that node's designation changes from secondary to primary (e.g., due to the previous primary node becoming unavailable) after the operation 635, that node can no longer serve as the initial EA node and still be in compliance with the switch over policy. In other embodiments, other events may cause the initial EA node to not be able to serve as an EA node. Thus, the status of the node designated as the initial EA node at the operation 635 may change by the time that node receives the work request of the operation 640. However, since that node is still available (e.g., has a heartbeat), that node may still pick up the work request. The operation 650 may be considered a "runtime discovery" operation. Thus, at the operation 650, the node that receives the work request of the operation 640 determines whether that node is still an EA node or not and notifies the database controller 205 of its current status.

If, at the operation 650, the initial EA node confirms that the node is still an EA node, the process 600 proceeds to operation 655 where the initial EA node attempts to complete the work request (e.g., capture a snapshot of the source database). Upon successful completion of the work request, the process 600 ends at operation 660. If the work request is not successfully completed at the operation 655, the database controller 205 determines if the work request is to be retried at the initial EA node. If the work request is to be retried at the initial EA node, the process 600 proceeds to operation 670 where the initial EA node retries completing the work request. In some embodiments, the initial EA node may try to complete the work request a designated number of times. If the initial EA node is unable to complete the work request in the designated number of times, the database controller 205 determines that the initial EA node is unable to complete the work request and removes the title of the "EA node" from the initial EA node at the operation 670. If, on the other hand, at the operation 665, the database controller 205 determines that the initial EA node is to not retry the work request, the process 600 proceeds to the operation 620.

In some embodiments, before removing the title of the "EA node" from the initial EA node at the operation 670, the database controller 205 determines, at operation 675, if the initial EA node was unable to complete the work request due to the database cluster being unavailable or for some other reason. The operation 675 is also reached from the operation 650 when the initial EA node does not detect itself as the initial EA node.

At the operation 675, the database controller 205 determines if the database cluster is unavailable or if another problem is causing the initial EA node to be unresponsive. If the database controller 205 determines that the entire database cluster is down (e.g., unavailable) or there is another problem that is preventing the initial EA node from completing the work request of the operation 640, the process 600 proceeds to the operation 620. Otherwise, the database controller 205 selects the next EA node at the operation 630. Upon selecting the next EA node, the database controller 205 may send the work request of the operation 640 to the next EA node.

In some embodiments, the database controller 205 may not select the next EA node if the initial EA node fails to complete the work request at the operation 665. In other words, the database controller 205 may not remove the title of EA node from the initial EA node at the operation 670. Rather, in some embodiments, the database controller 205 may decide that the issues with the initial EA node are likely temporary and do not need selection of a new EA node. In such cases, the database controller 205 may simply send the work request of the operation 640 to another node to complete while keeping the initial EA node as the current EA node. In some embodiments, the database controller 205 may perform the process 600 for each work request, at periodic intervals, and/or when other predetermined criteria is satisfied.

Referring still to FIG. 6, various scenarios of how the database controller 205 may handle failover cases (e.g., where the initial EA node becomes unavailable) are now described. As indicated above, in some cases, the initial EA node may receive the work request from the database controller 205 at the operations 640 and 645. Upon receiving the work request, the initial EA node may become unavailable. In such cases, if the work request has been picked up by the initial EA node (e.g., at the operation 645) and then the initial EA node determines at the operation 650 that it is not an EA node anymore, the database controller 205 may have two options for completing the work request based upon the database engine of the source database.

A first choice may include the database controller 205 instructing the highly available time machine 400 to perform a log catch up operation (e.g., capture transactional logs) from the initial EA node (e.g., the node which picked up the work request at the operation 645) and then exit from the work request (e.g., drop the work request) after the log catch up operation is completed at the initial EA node, and then select another EA node (e.g., the next EA node) at the operation 630. The database controller 205 may then resume the dropped work request at the next EA node. A second choice may include exiting from the work request without performing the log catch up operation at the initial EA node, selecting the next EA node at the operation 630, and performing the work request at the next EA node, including performing the log catch up operation at the next EA node. Thus, when the initial EA node becomes unavailable, the highly available time machine 400, based upon the state of the failed-over source database or the database server, may take a new snapshot and perform the log catch up operation on the next EA node or perform a log catch up operation on the next EA node.

Now, consider a case where multiple work requests are pending. For example, in some embodiments, say a work request includes one or more snapshot requests (e.g., create_snapshot requests) and/or one or more log catch up requests (e.g., log_catcup requests). In some embodiments, all of the multiple work requests (e.g., snapshot creation request 1 and snapshot creation request 2) may be sent to the initial EA node (e.g., Node A) at the operation 640. In some embodiments, the snapshot requests are handled serially. In other words, the snapshot creation request 2 is handled after the snapshot creation request 1 is completed. Thus, when Node A (e.g., the initial EA node) is working on the snapshot creation request 1, the snapshot creation request 2 remains in the queue of Node A. In some embodiments, before or after Node A starts work on the snapshot creation request 1, the database controller 205 may determine that Node A is no longer the initial EA node (e.g., due to that node being unavailable). If Node A has already started working on snapshot creation request 1 when Node A either becomes unavailable or is no longer the EA node, the database controller 205 may implement one of the two choices described above. Further, the database controller 205 may abandon the snapshot creation request 2 at Node A and reassign the snapshot creation request 2 to the next EA node that is selected. If Node A becomes unavailable or is no longer an EA node even before Node A starts working on the snapshot creation request 1, the database controller 205 may abandon both the snapshot creation request 1 and the snapshot creation request 2. The database controller 205 may reassign these requests to the next EA node when selected.

Thus, the database controller 205 may be configured to maintain a continuity of highly available time machine's point in time recovery capability after an EA switch. Depending upon when the EA switch happens (e.g., when a new EA node is selected), the database controller 205 may intelligently decide whether to capture a snapshot only from the new EA node, capture only transactional logs from the new EA node, or capture both snapshot and transactional logs from the new EA node. In general, if the database controller 205 determines that the new EA node is not up to date with the old EA node (e.g., due to asynchronous replication), the database controller may instruct the highly available time machine to start backup by capturing a snapshot of the new EA node. If the database controller 205 determines that the new EA node is up to date with the old EA node (e.g., due to synchronous replication) and the last captured backup from the old EA node was a snapshot, the highly available time machine may start with capturing transactional logs from the new EA node, thereby picking up replication at the new EA node where the replication was left off at the old EA node. If the database controller 205 determines that the new EA node is up to date with the old EA node (e.g., due to synchronous replication) and the last captured backup from the old EA node was a transactional log, the highly available time machine may start with capturing either the next transactional log or a snapshot from the new EA node, again picking up replication at the new EA node where the replication was left off at the old EA node.

Additionally, in some embodiments, a single node may be hosting multiple databases. When that node fails, in some embodiments, the database controller 205 may be configured to switch over all databases on that node. Depending upon whether a particular database instance is a primary or as secondary, the switch over may occur in accordance with the switchover policy applicable to that particular database instance.

Figure 7:
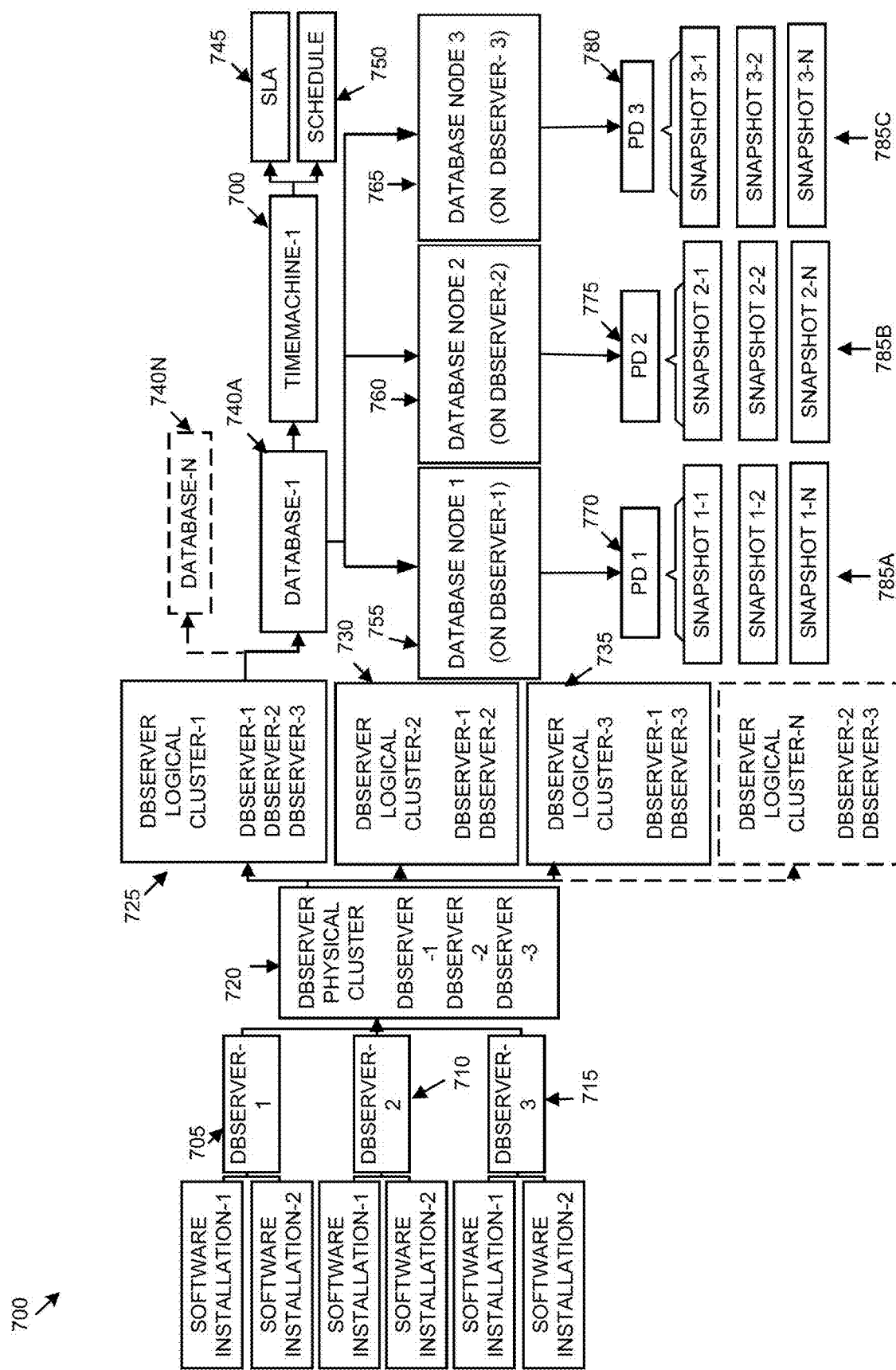
FIG. 7 is an example block diagram showing a clustered database protection system of the database management system of FIG. 2 in greater detail, in accordance with some embodiments of the present disclosure.

Referring now to FIG. 7, an example block diagram showing how a highly available time machine 700 manages/tracks multiple nodes of a highly available source database is shown, in accordance with some embodiments of the present disclosure. The highly available time machine 700 is configured to create backups from a highly available source database that has multiple copies stored on multiple databases spread across multiple nodes of a single cluster or multiple clusters. A single instance of the highly available time machine may be used to manage all the nodes on which copies of the source database are located. For example, a database cluster (also referred to herein as a "clustered database") may include three database servers 705, 710, 715. In some embodiments, each of the database servers 705-715 may be a source database virtual machine that resides on a separate node of a single cluster or multiple clusters. Each of the database servers 705-715 may host a copy of a source database. Thus, the source database may include a 3 node database cluster. Although three database servers are shown in FIG. 7, in other embodiments, greater or fewer than three database servers may be present.

A database server physical cluster 720 may be configured to capture the clustering of the source database. In other words, the database server physical cluster 720 may be configured to track the identities and locations of the database servers 705-715. In some embodiments, the database server physical cluster 720 may be configured as hardware, software, firmware, or combination thereof. The database server physical cluster 720 may then create one or more database server logical clusters using various combinations of the database servers 705-715. Thus, the database servers 705-715 may be configured to host multiple source databases. For example, the database server physical cluster 720 may create a first database server logical cluster 725 with the database servers 705-715, a second database server logical cluster 730 with the database servers 705 and 710, a third database server logical cluster 735 with the database servers 705 and 715, and so on.

Each of the database server logical clusters 725-735 may, in turn, host one or more source databases. For example, the first database server logical cluster 725 may host source databases 740A-740N. Thus, copies of each of the source databases 740A-740N may be stored on the database servers 705-715 since the first database server logical cluster 725 includes all of the database servers 705-715. Similarly, although not shown, one or more source databases may be stored on the second database server logical cluster 730, which may be stored on the database servers 705 and 710. Likewise, one or more source databases may be stored on the third database server logical cluster 735, which may be stored on the database servers 705 and 715, and so on.

Each source database may be associated with a time machine. For example, the source database 740A is shown as being associated with the highly available time machine 700. Similarly, although not shown, each of the other source databases may be associated with an instance of the highly available time machine 700. As discussed above, the highly available time machine 700 may be configured with an SLA 745, similar to the SLA 315, and a protection schedule 750 similar to the protection schedule 320. Since the source database 740A is part of the first database server logical cluster 725 having three database servers (e.g., the database servers 705-715), the source database forms a database cluster of 3 nodes, as shown by nodes 755, 760, and 765. Thus, each of the nodes 755-765 store a copy of the source database 740A.

The highly available time machine 700 tracks all of the nodes 755-765 for creating backups of the source database 740A, as discussed above. In some embodiments, each of the nodes 755-765 may include a protection domain 770-780, respectively, that is associated with the highly available time machine 700. In some embodiments, the nodes 755-765 may share a single protection domain. The protection domains 770-780 may be configured to store the snapshots and transactional logs that are captured from the node associated with the protection domain. For example, the protection domain 770 may store snapshots 785A captured of the source database from the node 755, the protection domain 775 may store snapshots 785B captured of the source database from the node 760, and the protection domain 780 may store snapshots 785C captured of the source database from the node 765. Although not shown, those protection domains may also store the transactional logs captured from their respective nodes.

Thus, the present disclosure provides a mechanism to protect a highly available source database that is adaptive, resilient to failures, highly available, and flexible/configurable, while providing a seamless user experience.

It is to be understood that any examples used herein are simply for purposes of explanation and are not intended to be limiting in any way. It is also to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:
1. A system comprising:
   a memory having computer-readable instructions stored thereon; and
   a processor that executes the computer-readable instructions to:

create a highly available database comprising a source database stored at a first location and a copy of the source database stored at each of one or more second locations;

associate a user defined switch over policy with the highly available database;

select the first location or one of the one or more second locations as an initial active location;

capture at least one of one or more snapshots or one or more logs from the source database or the copy of the source database that is stored on the initial active location;

determine that the initial active location has become unavailable;

in response to the initial active location becoming unavailable, select another location from the first location and the one or more second locations as a next active location based on the switch over policy, wherein the switch over policy assigns a priority to at least some of the first location and the one or more second locations, and wherein the next active location is selected based on the priority; and continue capture of the at least one of the one or more snapshots or one or more logs from the next active location.

2. The system of claim 1, wherein the first location and each of the one or more second locations comprises a cloud location.

3. The system of claim 1, wherein the first location and each of the one or more second locations comprises a different node of one or more clusters.

4. The system of claim 1, wherein the processor further executes computer-readable instructions to associate a service level agreement with the highly available database, wherein the at least one of the one or more snapshots or one or more logs are captured based on the service level agreement.

5. The system of claim 1, wherein the switch over policy is defined during provisioning of the source database.

6. The system of claim 1, wherein the switch over policy is part of a user defined active policy defining a number of locations based on a number of copies of the source database that are desired in the highly available database.

7. The system of claim 1, wherein the processor further executes computer-readable instructions to select the first location or one of the one or more second locations as a primary location, each remaining location being a secondary location, wherein updates made to the source database or the copy of the source database on the primary location are able to be copied to the source database or other copies of the source database on each of the secondary location.

8. The system of claim 7, wherein, in response to the primary location becoming unavailable, the processor further executes computer-readable instructions to select one of the remaining location as the primary location based on a user defined active policy that defines one or more conditions for selecting a new primary location when a current primary location becomes unavailable.

9. The system of claim 1, wherein the priority is an integer number.

10. The system of claim 1, wherein the processor further executes computer-readable instructions to:

associate a service level agreement with the highly available database, wherein the at least one of the one or more snapshots or one or more logs are captured based on the service level agreement; and associate a user defined active policy with the highly available database, wherein the active policy defines a number of copies of the source database that are desired, and wherein the switch over policy is part of the active policy.

11. A non-transitory computer-readable media comprising computer-readable instructions stored thereon that when executed by a processor cause the processor to:

create a highly available database comprising a source database stored at a first location and a copy of the source database stored at each of one or more second locations;

associate a user defined switch over policy with the highly available database;

select the first location or one of the one or more second locations as an initial active location;

capture at least one of one or more snapshots or one or more logs from the source database or the copy of the source database that is stored on the initial active location;

determine that the initial active location has become unavailable;

in response to the initial active location becoming unavailable, select another location from the first location and the one or more second locations as a next active location based on the switch over policy, wherein the switch over policy assigns a priority to at least some of the first location and the one or more second locations, and wherein the next active location is selected based on the priority; and continue capture of the at least one of the one or more snapshots or one or more logs from the next active location.

12. The non-transitory computer-readable media of claim 11, wherein the first location and each of the one or more second locations comprises a cloud location.

13. The non-transitory computer-readable media of claim 11, wherein the first location and each of the one or more second locations comprises a different node of one or more clusters.

14. The non-transitory computer-readable media of claim 11, wherein the processor further executes computer-readable instructions to associate a service level agreement with the highly available database, wherein the at least one of the one or more snapshots or one or more logs are captured based on the service level agreement.

15. The non-transitory computer-readable media of claim 11, wherein the switch over policy is defined during provisioning of the source database.

16. The non-transitory computer-readable media of claim 11, wherein the switch over policy is part of a user defined active policy defining a number of locations based on a number of copies of the source database that are desired in the highly available database.

17. The non-transitory computer-readable media of claim 11, wherein the processor further executes computer-readable instructions to select the first location or one of the one or more second locations as a primary location, each remaining location being a secondary location, wherein updates made to the source database or the copy of the source database on the primary location are able to be copied to the source database or other copies of the source database on each of the secondary location.

18. The non-transitory computer-readable media of claim 17, wherein, in response to the primary location becoming unavailable, the processor further executes computer-readable instructions to select one of the remaining location as the primary location based on a user defined active policy that defines one or more conditions for selecting a new primary location when a current primary location becomes unavailable.

19. The non-transitory computer-readable media of claim 11, wherein the priority is an integer number.

20. The non-transitory computer-readable media of claim 11, wherein the processor further executes computer-readable instructions to:
associate a service level agreement with the highly available database, wherein the at least one of the one or more snapshots or one or more logs are captured based on the service level agreement; and
associate a user defined active policy with the highly available database, wherein the active policy defines a number of copies of the source database that are desired, and wherein the switch over policy is part of the active policy.

21. A method comprising:
creating, by a processor executing computer-readable instructions stored on a memory, a highly available database comprising a source database stored at a first location and a copy of the source database stored at each of one or more second locations;
associating, by the processor, a user defined switch over policy with the highly available database;
selecting, by the processor, the first location or one of the one or more second locations as an initial active location;
capturing, by the processor, at least one of one or more snapshots or one or more logs from the source database or the copy of the source database that is stored on the initial active location;
determining, by the processor, that the initial active location has become unavailable;
in response to the initial active location becoming unavailable, selecting, by the processor, another location from the first location and the one or more second locations as a next active location based on the switch over policy, wherein the switch over policy assigns a priority to at least some of the first location and the one or more second locations, and wherein the next active location is selected based on the priority; and
continue capturing, by the processor, of the at least one of the one or more snapshots or one or more logs from the next active location.

22. The method of claim 21, wherein the first location and each of the one or more second locations comprises a cloud location.

23. The method of claim 21, wherein the first location and each of the one or more second locations comprises a different node of one or more clusters.

24. The method of claim 21, further comprising associating, by the processor, a service level agreement with the highly available database, wherein the at least one of the one or more snapshots or one or more logs are captured based on the service level agreement.

25. The method of claim 21, wherein the switch over policy is defined during provisioning of the source database.

26. The method of claim 21, wherein the switch over policy is part of a user defined active policy defining a number of locations based on a number of copies of the source database that are desired in the highly available database.

27. The method of claim 21, further comprising selecting, by the processor, the first location or one of the one or more second locations as a primary location, each remaining location being a secondary location, wherein updates made to the source database or the copy of the source database on the primary location are able to be copied to the source database or other copies of the source database on each of the secondary location.

28. The method of claim 27, wherein, in response to the primary location becoming unavailable, the method further comprises selecting, by the processor, one of the remaining location as the primary location based on a user defined active policy that defines one or more conditions for selecting a new primary location when a current primary location becomes unavailable.

29. The method of claim 21, wherein the priority is an integer number.

30. The method of claim 21, further comprising:
associating, by the processor, a service level agreement with the highly available database, wherein the at least one of the one or more snapshots or one or more logs are captured based on the service level agreement; and
associating, by the processor, a user defined active policy with the highly available database, wherein the active policy defines a number of copies of the source database that are desired, and wherein the switch over policy is part of the active policy.

* * * * *